United States Patent
Li et al.

(10) Patent No.: US 9,334,339 B2
(45) Date of Patent: May 10, 2016

(54) SUPPORTED NONMETALLOCENE CATALYSTS, PREPARATION AND USE THEREOF

(71) Applicants: CHINA PETROLEUM & CHEMICAL CORPORATION, Beijing (CN); SINOPEC YANGZI PETROCHEMICAL COMPANY LTD., Nanjing, Jiangsu Province (CN)

(72) Inventors: Chuanfeng Li, Nanjing (CN); Hongping Ren, Nanjing (CN); Lin Kan, Nanjing (CN); Feng Guo, Nanjing (CN); Wenrui Wang, Nanjing (CN); Yuming Yi, Nanjing (CN); Shaohui Chen, Nanjing (CN); Jiye Bai, Nanjing (CN)

(73) Assignees: CHINA PETROLEUM & CHEMICAL CORPORATION, Beijing (CN); SINOPEC YANGZI PETROCHEMICAL COMPANY LTD., Nanjing (CN)

( * ) Notice: Subject to any disclaimer, the term of this patent is extended or adjusted under 35 U.S.C. 154(b) by 0 days.

(21) Appl. No.: 14/299,973

(22) Filed: Jun. 9, 2014

(65) Prior Publication Data
US 2014/0364576 A1    Dec. 11, 2014

(30) Foreign Application Priority Data

Jun. 8, 2013  (CN) .......................... 2013 1 0227368
Jun. 8, 2013  (CN) .......................... 2013 1 0227830

(51) Int. Cl.
| *B01J 31/00* | (2006.01) |
| *B01J 37/00* | (2006.01) |
| *B01J 27/182* | (2006.01) |
| *B01J 21/00* | (2006.01) |
| *C08F 4/44* | (2006.01) |
| *C08F 4/642* | (2006.01) |
| *C08F 4/02* | (2006.01) |

(52) U.S. Cl.
CPC . *C08F 4/642* (2013.01); *C08F 4/02* (2013.01); *C08F 4/022* (2013.01)

(58) Field of Classification Search
CPC ............ B01J 31/00; B01J 37/00; B01J 27/82; B01J 21/00; C08F 4/441
USPC .......................... 502/232, 116, 133, 158, 214; 526/123.1, 124.2, 127, 161
See application file for complete search history.

(56) References Cited

U.S. PATENT DOCUMENTS 7,253,133 B2    8/2007    Sun et al.

FOREIGN PATENT DOCUMENTS

| CN | 1332182 A | 1/2002 | |
| CN | 1364818 A | 8/2002 | |
| CN | 1962702 A | 5/2007 | |
| CN | 101412765 A | * | 4/2009 |
| CN | 102039186 A | 5/2011 | |
| CN | 102039189 A | 5/2011 | |
| CN | 102399320 A | 4/2012 | |
| WO | WO 9513873 A1 | * 5/1995 | ........... B01J 31/0274 |
| WO | WO 03/010207 A1 | 2/2003 | |

OTHER PUBLICATIONS

English translation of CN 101412765 A.*
Huang et al., "Development in Olefin polymerization catalyst and our strategy in this regard," *Petrochemical Technology*, 30: 454-456 (2001).

* cited by examiner

*Primary Examiner* — Elizabeth Eng
(74) *Attorney, Agent, or Firm* — Finnegan, Henderson, Farabow, Garrett & Dunner, LLP

(57) ABSTRACT

Disclosed is a supported nonmetallocene catalyst and preparation thereof. The supported nonmetallocene catalyst is characterized by a high catalyst activity for olefin polymerization and a significant monomer effect. Further disclosed is use of the supported nonmetallocene catalyst in olefin homopolymerization/copolymerization. The polymer produced therewith is characterized by superior particle morphology, a high bulk density, and/or a narrow molecular weight distribution.

13 Claims, No Drawings

SUPPORTED NONMETALLOCENE CATALYSTS, PREPARATION AND USE THEREOF

Disclosed is a nonmetallocene catalyst. For example, disclosed is a supported nonmetallocene catalyst, preparation thereof, and use thereof in olefin homopolymerization/copolymerization.

The nonmetallocene catalyst, also called as the post-metallocene catalyst, was discovered in middle and late 1990's, whose central atom involves nearly all of the transition metal elements. The nonmetallocene catalyst can be comparative to, or exceeds, the metallocene catalyst in some aspects of performance, and has been classified as the fourth generation catalyst for olefin polymerization, following the Ziegler catalyst, the Ziegler-Natta catalyst and the metallocene catalyst. Polyolefin products produced with such catalysts can exhibit favorable properties and boast low production cost. The coordination atom of the nonmetallocene catalyst may comprise oxygen, nitrogen, sulfur and phosphor, without containing a cyclopentadiene group or a derivative thereof (for example, an indene group or a fluorene group). The nonmetallocene catalyst can be characterized in that its central atom may show comparatively strong electrophilicity and has a cis alkyl metal type or a metal halide type central structure, which can facilitate olefin insertion and σ-bond transfer. Therefore, the central atom can be easily subject to alkylation, and therefore can facilitate formation of a cationic active center. The resulting complex may have a restricted geometrical configuration, and can be stereoselective, electronegative and chiral adjustable. Further, the formed metal-carbon bond can be easy to be polarized, which can further facilitate homopolymerization and copolymerization of an olefin. For these reasons, it is possible to obtain an olefin polymer having a comparatively high molecular weight, even under a comparatively high polymerization temperature.

However, it is known that in the olefin polymerization, the homogeneous phase catalyst may suffer from problems such as short service life, fouling, high consumption of methyl aluminoxane, and undesirably low or high molecular weight in the polymer product, and thus may only find limited use in the solution polymerization process or the high-pressure polymerization process, which can hinder its wider application in industry.

The nonmetallocene catalyst can be made by a certain process, so as to improve the performance of the catalyst in polymerization and particle morphology of the polymer products. This is reflected by, moderate reduction of the initial activity of the catalyst, elongation of the serve life of the catalyst, alleviation or elimination of caking or flash reaction during the polymerization, improvement of the polymer morphology, and increase of the apparent density of the polymer, thus extending its use to other polymerization processes, for example, gas phase polymerization or slurry polymerization. Chinese patent Nos. 200910180602.9 and 200910180605.2 disclose a process for producing a supported nonmetallocene catalyst by using a magnesium compound as the carrier, which appear to surfer from poor polymer particle morphology.

Therefore, there still exists a need for a supported nonmetallocene catalyst, which can be produced in a simple way and in an industrial scale, free of the problems associated with earlier supported nonmetallocene catalyst.

Disclosed herein is a supported nonmetallocene catalyst produced by using a specific process, which can solve the problems identified as aforesaid.

The present process disclosed herein for producing a supported nonmetallocene catalyst can be conducted in the absence of any proton donor (for example, those conventionally used in this field). Further, the present process for producing a supported nonmetallocene catalyst can be conducted in the absence of any electron donor (for example, compounds such as mono-esters, di-esters, di-ethers, di-ketones and glycol esters, conventionally used in production of a Ziegler-Natta catalyst or a Ziegler catalyst). Still further, the present process for producing a supported nonmetallocene catalyst can be conducted without the need of severe reaction requirements and reaction conditions. For at least one of these reasons, the present process can be simple and suitable for industrial application.

Disclosed herein is a process for producing a supported nonmetallocene catalyst, comprising:

dissolving at least one magnesium compound in at least one first solvent in the presence of at least one alcohol, to obtain a magnesium compound solution;

obtaining a Mg-containing carrier by (1) mixing at least one porous carrier with the magnesium compound solution to obtain a first slurry, and drying the first slurry, or introducing into the first slurry at least one precipitating agent, to obtain the Mg-containing carrier, or (2) drying the magnesium compound solution, or introducing into the magnesium compound solution at least one precipitating agent, to obtain the Mg-containing carrier;

contacting the Mg-containing carrier with at least one silicon compound of the following formula (X) and at least one chemical treating agent selected from Group IVB metal compounds, to obtain a modified Mg-containing carrier, $$Si(OR)_m X_{4-m} \qquad (X)$$

wherein:

R may be identical to or different from one another, each independently selected from $C_1$-$C_8$ straight and branched alkyl, m is 0, 1, 2, 3, or 4, X may be identical to or different from one another, each independently selected from halogen atoms; and contacting the modified Mg-containing carrier with at least one nonmetallocene complex in the presence of at least one second solvent, to obtain the supported nonmetallocene catalyst;

optionally further comprising pre-contacting the Mg-containing carrier with at least one assistant chemical treating agent selected from aluminoxanes and alkylaluminum, before contacting the Mg-containing carrier with the at least one silicon compound and the at least one chemical treating agent.

In some embodiments, the at least one porous carrier is selected from olefin homopolymers and copolymers, vinyl alcohol homopolymers and copolymers, cyclodextrins, polyesters and co-polyesters, polyamides and co-polyamides, vinyl chloride homopolymers and copolymers, acrylic ester homopolymers and copolymers, methacrylic ester homopolymers and copolymers, styrene homopolymers and copolymers, partly crosslinked products of these homopolymers and copolymers, refractory oxides and refractory composite oxides of a Group IIA, IIIA, IVA or IVB metal in the Periodic Table of Elements, clay, molecular sieve, mica, montmorillonite, bentonite and kieselguhr, such as those selected from partly crosslinked styrene polymers, silica, alumina, magnesia, silica-alumina, magnesia-alumina, titanium oxide, molecular sieve and montmorillonite, further such as those selected from silica, the at least one porous carrier being optionally thermally activated and/or chemically activated by the at least one Group IVB metal compound, while the at least one magnesium compound is selected from magnesium halides, alkoxy magnesium halides, alkoxy magnesium, alkyl magnesium, alkyl magnesium halides and alkyl alkoxy magnesium, such as those selected from magnesium halides. In one embodiment, the at least one magnesium compound is magnesium chloride.

In some embodiments, the at least one first solvent is selected from $C_{6-12}$ aromatic hydrocarbons, halogenated $C_{6-12}$ aromatic hydrocarbons, esters and ethers, such as those selected from $C_{6-12}$ aromatic hydrocarbons and tetrahydrofuran. In one embodiment, the at least one first solvent is tetrahydrofuran. In some embodiments, the at least one second solvent is selected from $C_{6-12}$ aromatic hydrocarbons, halogenated $C_{6-12}$ aromatic hydrocarbons, halogenated $C_{1-10}$ alkanes and ethers, such as those selected from $C_{6-12}$ aromatic hydrocarbons, dichloromethane and tetrahydrofuran. In one embodiment, the at least one second solvent is dichloromethane. In some embodiments, the at least one alcohol is selected from aliphatic alcohols, aromatic alcohols and alicyclic alcohols, wherein the alcohol is optionally substituted by at least one substituent selected from halogen atoms and $C_{1-6}$ alkoxy groups. For example, the at least one alcohol is selected from aliphatic alcohols, such as ethanol and butanol.

In some embodiments, the at least one nonmetallocene complex is selected from compounds of the following formula:

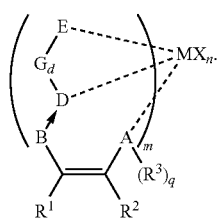

In some embodiments, the at least one nonmetallocene complex is selected from the following compound (A) and the following compound (B);

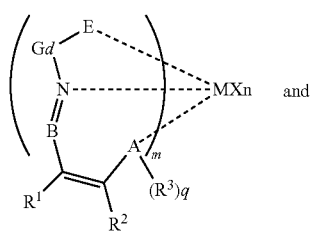

(A)

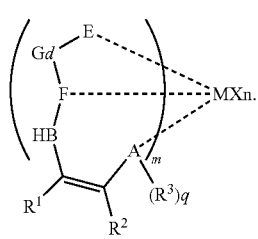

(B)

In some embodiments, the at least one nonmetallocene complex is selected from the following compound (A-1), the following compound (A-2), the following compound (A-3), the following compound (A-4), the following compound (B-1), the following compound (B-2), the following compound (B-3), and the following compound (B-4);

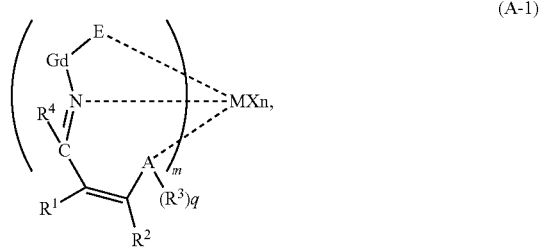

(A-1)

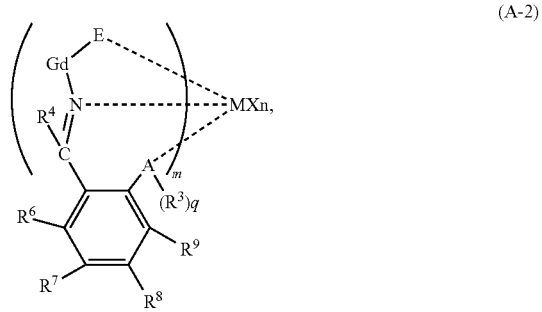

(A-2)

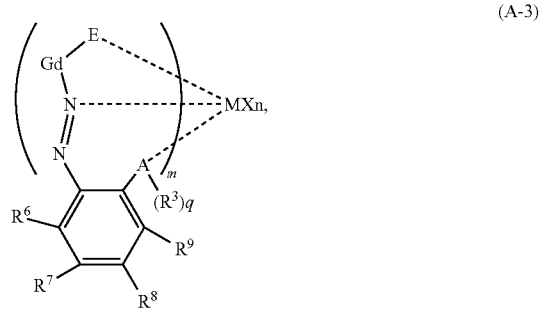

(A-3)

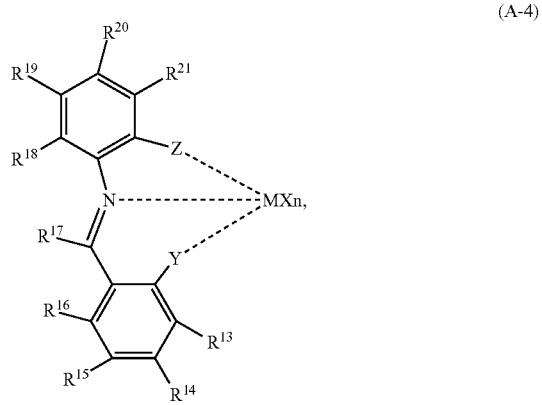

(A-4)

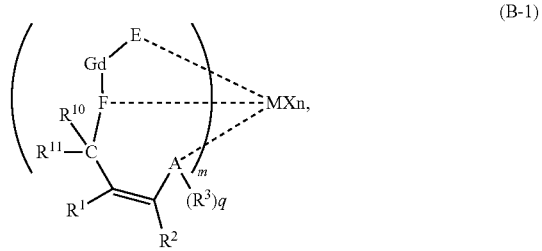

(B-1)

-continued (B-2) 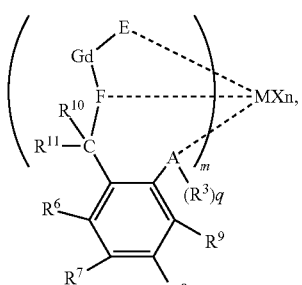

(B-3) 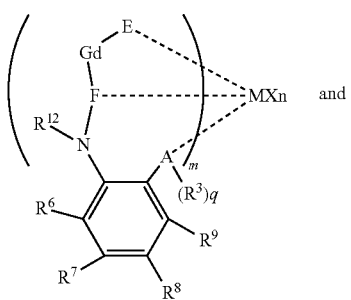  and (B-4) 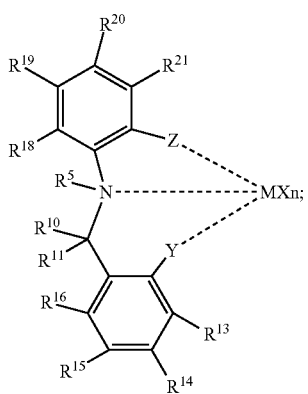

in all of the aforesaid formulae,
q is 0 or 1;
d is 0 or 1;
m is 1, 2 or 3;

M is a central metal atom selected from Group III to XI metal atoms in the Periodic Table of Elements, such as Group IVB metal atoms, further such as Ti(IV) and Zr(IV);

n is 1, 2, 3 or 4, depending on the valence of the central metal atom M;

X is selected from a halogen atom, a hydrogen atom, a $C_1$-$C_{30}$ hydrocarbyl, a substituted $C_1$-$C_{30}$ hydrocarbyl, an oxygen-containing group, a nitrogen-containing group, a sulfur-containing group, a boron-containing group, an aluminium-containing group, a phosphor-containing group, a silicon-containing group, a germanium-containing group, and a tin-containing group, when multiple X exist, X may be the same as or different from one another, and may form a bond or a ring with one another;

A is selected from an oxygen atom, a sulfur atom, a selenium atom,

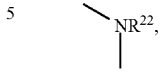

$-NR^{23}R^{24}$, $-N(O)R^{25}R^{26}$,

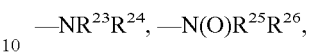

$-PR^{28}R^{29}$, $-P(O)R^{30}OR^{31}$, a sulfone group, a sulfoxide group, and $-Se(O)R^{39}$, wherein N, O, S, Se and P each represents a coordination atom;

B is selected from a nitrogen atom, a nitrogen-containing group, a phosphor-containing group and a $C_1$-$C_{30}$ hydrocarbyl;

D is selected from a nitrogen atom, an oxygen atom, a sulfur atom, a selenium atom, a phosphor atom, a nitrogen-containing group, a phosphor-containing group, a $C_1$-$C_{30}$ hydrocarbyl, a sulfone group, and a sulfoxide group, wherein N, O, S, Se and P each represents a coordination atom;

E is selected from nitrogen-containing group, an oxygen-containing group, a sulfur-containing group, a selenium-containing group, a phosphor-containing group and a cyano group, wherein N, O, S, Se and P each represents a coordination atom;

F is selected from a nitrogen atom, a nitrogen-containing group, an oxygen-containing group, a sulfur-containing group, a selenium-containing group and a phosphor-containing group, wherein N, O, S, Se and P each represents a coordination atom;

G is selected from a $C_1$-$C_{30}$ hydrocarbyl, a substituted $C_1$-$C_{30}$ hydrocarbyl and an inert functional group;

Y is selected from an oxygen atom, a nitrogen-containing group, an oxygen-containing group, a sulfur-containing group, a selenium-containing group and a phosphor-containing group, wherein N, O, S, Se and P each represents a coordination atom;

Z is selected from a nitrogen-containing group, an oxygen-containing group, a sulfur-containing group, a selenium-containing group, a phosphor-containing group and a cyano group, wherein N, O, S, Se and P each represents a coordination atom;

→ represents a single bond or a double bond;
— represents a covalent bond or an ionic bond;
--- represents a coordination bond, a covalent bond or an ionic bond;

$R^1$ to $R^4$, $R^6$ to $R^{21}$ are each independently selected from a hydrogen atom, a $C_1$-$C_{30}$ hydrocarbyl, a substituted $C_1$-$C_{30}$ hydrocarbyl and an inert functional group, and $R^{22}$ to $R^{36}$, $R^{38}$ and $R^{39}$ are each independently selected from a hydrogen atom, a $C_1$-$C_{30}$ hydrocarbyl and a substituted $C_1$-$C_{30}$ hydrocarbyl, wherein these groups may be identical to or different from one another, and any adjacent groups, together with the atoms to which they are attached, may form a ring (such as an aromatic ring);

the inert functional groups are selected from a halogen atom, an oxygen-containing group, a nitrogen-containing group, a silicon-containing group, a germanium-containing group, a sulfur-containing group, a tin-containing group, a $C_1$-$C_{10}$ ester group, and a nitro group, R[5] does not exist or is selected from a hydrogen atom, a $C_1$-$C_{30}$ hydrocarbyl, a substituted $C_1$-$C_{30}$ hydrocarbyl, an oxygen-containing group, a sulfur-containing group, a nitrogen-containing group, a selenium-containing group, and a phosphor-containing group, with the proviso that when R[5] is the oxygen-containing group, the sulfur-containing group, the nitrogen-containing group, the selenium-containing group or the phosphor-containing group, N, O, S, P and Se in the group R[5] each can act as a coordination atom;

the substituted $C_1$-$C_{30}$ hydrocarbyl is selected from $C_1$-$C_{30}$ hydrocarbyl having at least one substituent selected from halogen atoms and $C_1$-$C_{30}$ alkyl groups.

In some embodiments, the at least one nonmetallocene complex is selected from the following compounds,

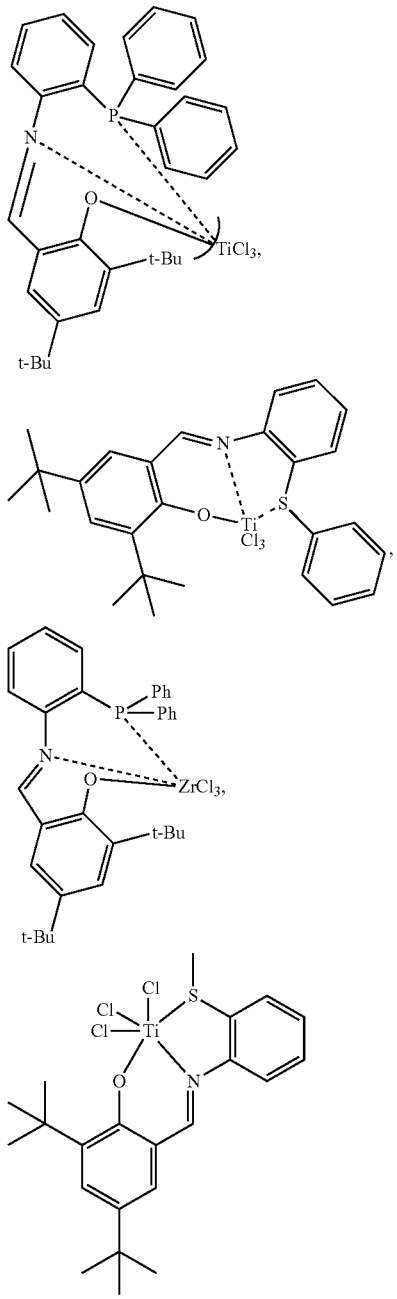

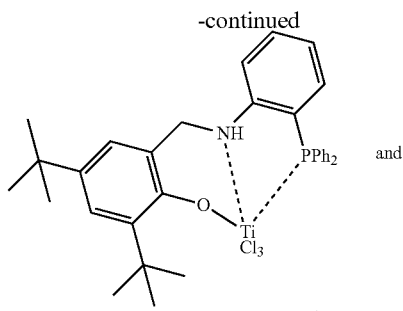

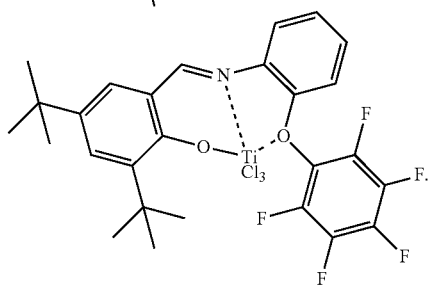

In some embodiments, the at least one metallocene is selected from the following compounds,

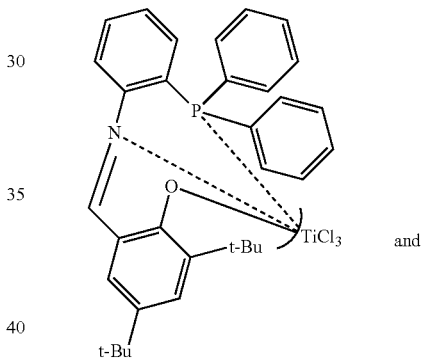

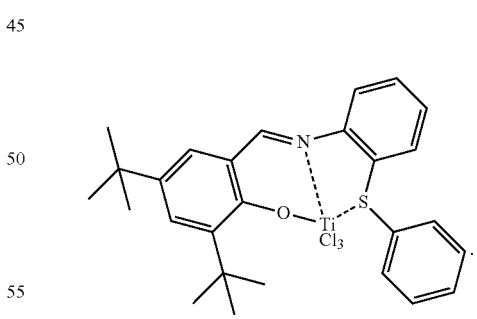

In some embodiments,
the halogen atom is selected from F, Cl, Br and I,
the nitrogen-containing group is selected from

—NR[23]R[24], -T-NR[23]R[24] and —N(O)R[25]R[26], the phosphor-containing group is selected from

—PR$^{28}$R$^{29}$, —P(O)R$^3$OR$^{31}$ and —P(O)R$^{32}$(OR$^{33}$), the oxygen-containing group is selected from hydroxy, —OR$^{34}$ and -T-OR$^{34}$, the sulfur-containing group is selected from —SR$^{35}$, -T-SR$^{35}$, —S(O)R$^{36}$ and -T-SO$_2$R$^{37}$, the selenium-containing group is selected from —SeR$^{38}$, -T-SeR$^{38}$, —Se(O)R$^{39}$ and -T-Se(O)R$^{39}$, the group T is selected from C$_1$-C$_{30}$ hydrocarbyl and substituted C$_1$-C$_{30}$ hydrocarbyl, R$^{37}$ is selected from a hydrogen atom, C$_1$-C$_{30}$ hydrocarbyl, and substituted C$_1$-C$_{30}$ hydrocarbyl, the C$_1$-C$_{30}$ hydrocarbyl is selected from C$_1$-C$_{30}$ alkyl groups, C$_7$-C$_{30}$ alkylaryl groups, C$_7$-C$_{30}$ aralkyl groups, C$_3$-C$_{30}$ cyclic alkyl groups, C$_2$-C$_{30}$ alkenyl groups, C$_2$-C$_{30}$ alkynyl groups, C$_6$-C$_{30}$ aryl groups, C$_8$-C$_{30}$ fused-ring groups and C$_4$-C$_{30}$ heterocycle groups, wherein the heterocycle group contains from 1 to 3 hetero atom(s) selected from a nitrogen atom, an oxygen atom, and a sulfur atom, the boron-containing group is selected from BF$_4^-$, (C$_6$F$_5$)$_4$B$^-$, and (R$^{40}$Ar$_3$)$^-$, the aluminium-containing group is selected from alkyl aluminium, AlPh$_4^-$, AlF$_4^-$, AlCl$_4^-$, AlBr$_4^-$, AlI$_4^-$ and R$^{41}$AlAr$_3^-$, the silicon-containing group is selected from —SiR$^{42}$R$^{43}$R$^{44}$, and -T-SiR$^{45}$, the germanium-containing group is selected from —GeR$^{46}$R$^{47}$R$^{48}$, and -T-GeR$^{49}$, the tin-containing group is selected from —SnR$^{50}$R$^{51}$R$^{52}$, -T-SnR$^{53}$, and -T-Sn(O)R$^{54}$, the Ar group is selected from C$_6$-C$_{30}$ aryl groups, R$^{40}$ to R$^{54}$ are each independently selected from a hydrogen atom, the C$_1$-C$_{30}$ hydrocarbyl and the substituted C$_1$-C$_{30}$ hydrocarbyl as defined above, wherein these groups may be identical to or different from one another, and any adjacent groups, together with the atoms to which they are attached, may form a ring with one another, and the group T is defined as aforesaid.

In some embodiments, ratio of the at least one magnesium compound to the at least one first solvent is 1 mol:75~400 ml, such as 1 mol:150~300 ml, further such as 1 mol:200~250 ml, ratio by molar of the at least one magnesium compound (based on Mg) to the at least one alcohol is 1:0.02~4.00, such as 1:0.05~3.00, further such as 1:0.10~2.50, ratio by weight of the at least one magnesium compound (on a solid basis) to the at least one porous carrier is 1:0.1-20, such as 1:0.5-10, ratio by volume of the at least one precipitating agent to the first solvent is 1:0.2~5, such as 1:0.5~2, further such as 1:0.8~1.5, ratio by molar of the Mg-containing carrier (based on Mg) to the at least one silicon compound (based on Si) is 1:0.01-1, such as 1:0.01-0.50, further such as 1:0.05-0.25, ratio by molar of the Mg-containing carrier (based on Mg) to the at least one chemical treating agent (based on the Group IVB metal) is 1:0.01-1, such as 1:0.01-0.50, further such as 1:0.10-0.30, ratio by molar of the Mg-containing carrier (based on Mg) to the at least one nonmetallocene complex is 1:0.01-1, such as 1:0.04-0.4, further such as 1:0.08-0.2, and ratio by molar of the Mg-containing carrier (based on Mg) to the at least one assistant chemical treating agent (based on Al) is 1:0-1.0, such as 1:0-0.5, further such as 1:0.1-0.5.

In some embodiments, the at least one precipitating agent is selected from an alkane, a cyclic alkane, a halogenated alkane and a halogenated cyclic alkane In some embodiments, the at least one precipitating agent is selected from pentane, hexane, heptane, octane, nonane, decane, cyclohexane, cyclopentane, cycloheptane, cyclodecane, cyclononane, dichloromethane, dichloro hexane, dichloro heptane, trichloro methane, trichloro ethane, trichloro butane, dibromo methane, dibromo ethane, dibromo heptane, tribromo methane, tribromo ethane, tribromo butane, chlorinated cyclopentane, chlorinated cyclohexane, chlorinated cycloheptane, chlorinated cyclooctane, chlorinated cyclononane, chlorinated cyclodecane, brominated cyclopentane, brominated cyclohexane, brominated cycloheptane, brominated cyclooctane, brominated cyclononane, and brominated cyclodecane. In some embodiments, the at least one precipitating agent is selected from hexane, heptane, decane and cyclohexane. In one embodiment, the at least one precipitating agent is hexane.

In some embodiments, the Group IVB metal compound is selected from a Group IVB metal halide, a Group IVB metal alkylate, a Group IVB metal alkoxylate, a Group IVB metal alkyl halide, and a Group IVB metal alkoxy halide, such as those selected from a Group IVB metal halide. In some embodiments, the Group IVB metal compound is selected from TiCl$_4$, TiBr$_4$, ZrCl$_4$, ZrBr$_4$, HfCl$_4$, and HfBr$_4$. In some embodiments, the Group IVB metal compound is selected from TiCl$_4$ and ZrCl$_4$. In some embodiments, the aluminoxane is selected from methyl aluminoxane, ethyl aluminoxane, isobutyl aluminoxane and n-butyl aluminoxane. For example, the aluminoxane is selected from methyl aluminoxane and isobutyl aluminoxane. In some embodiments, the alkylaluminum is selected from trimethyl aluminum, triethyl aluminum, tripropyl aluminum, triisobutyl aluminum, tri-n-butyl aluminum, triisoamyl aluminum, tri-n-amyl aluminum, trihexyl aluminum, tri-iso-hexyl aluminum, diethyl methyl aluminum, and ethyl dimethyl aluminum. For example, the alkylaluminum is selected from trimethyl aluminum, triethyl aluminum, tripropyl aluminum and triisobutyl aluminum. Further, for example, the alkylaluminum is selected from triethyl aluminum and triisobutyl aluminum.

Further disclosed herein is a supported nonmetallocene catalyst, produced by the process disclosed herein.

Further disclosed herein is an olefin homopolymerization/copolymerization process, comprising polymerizing the olefin in the presence of the supported nonmetallocene catalyst produced according to the process disclosed herein and at least one co-catalyst selected from an aluminoxane, an alkylaluminum, a halogenated alkyl aluminum, a fluoroborane, an alkylboron and an alkylboron ammonium salt.

The process for making a supported nonmetallocene catalyst according to this disclosure is simple and feasible. It is easy to adjust the load of the active components in the resultant catalyst so as to obtain different supported nonmetallocene catalysts in terms of performance.

With a catalyst system composed of the supported nonmetallocene catalyst disclosed herein and a co-catalyst, only a relatively low amount of the co-catalyst (for example methyl aluminoxane or triethyl aluminum) may be needed to achieve a relatively high olefin polymerization activity, and when used in a copolymerization, this catalyst system can show a significant comonomer effect, i.e. under relatively the same conditions, the activity for copolymerization is higher than that for homopolymerization.

According to this disclosure, the polyolefin (such as an ethylene polymer) produced according to the present olefin homopolymerization/copolymerization process can be characterized by at least one feature selected from superior particle morphology, a high bulk density, and a narrow molecular weight distribution, and it is possible to produce an ultra high molecular weight polyethylene having a relatively higher and freely adjustable molecular weight by homopolymerization in the absence of hydrogen gas.

The specific embodiments below are intended to be purely exemplary and should not be considered to be limiting in any way.

In the context of this disclosure, unless otherwise specified or identified as being unreasonable by a person skilled in the art, a hydrocarbon or hydrocarbon derivative group having 3 or more carbon atoms (for example propyl, propoxyl, butyl, butane, butene, butenyl, hexane, etc.), when appears without the prefix "normal" or "n-", generally refers to its corresponding n-isomeride. For example, propyl generally refers to n-propyl, while butane generally refers to n-butane.

In the context of this disclosure, to simplify the description, a group or substituent in a compound is generally defined, however not specified as to its valence, i.e. whether it is mono-valent, bi-valent, tri-valent, tetra-valent or else. Nevertheless, it is easy for a person skilled in the art to identify this after taking into consideration the position or substitution condition of said group or substituent (e.g. the groups G, D, B, A and F) on said compound.

According to a first embodiment of this disclosure, disclosed is a process for producing a supported nonmetallocene catalyst, comprising: dissolving at least one magnesium compound in at least one first solvent in the presence of at least one alcohol, to obtain a magnesium compound solution; mixing at least one porous carrier with the magnesium compound solution to obtain a first slurry; drying the first slurry, or introducing into the first slurry at least one precipitating agent, to obtain a Mg-containing carrier; contacting the Mg-containing carrier with at least one silicon compound of the formula (X) and at least one chemical treating agent selected from Group IVB metal compounds, to obtain a modified Mg-containing carrier; and contacting the modified Mg-containing carrier with at least one nonmetallocene complex in the presence of at least one second solvent, to obtain the supported nonmetallocene catalyst.

According to a second embodiment of this disclosure, disclosed is a process for producing a supported nonmetallocene catalyst, comprising: dissolving at least one magnesium compound in at least one first solvent in the presence of at least one alcohol, to obtain a magnesium compound solution; drying the magnesium compound solution, or introducing into the magnesium compound solution at least one precipitating agent, to obtain a Mg-containing carrier; contacting the Mg-containing carrier with at least one silicon compound of the formula (X) and at least one chemical treating agent selected from Group IVB metal compounds, to obtain a modified Mg-containing carrier; and contacting the modified Mg-containing carrier with at least one nonmetallocene complex in the presence of at least one second solvent, to obtain the supported nonmetallocene catalyst.

The at least one magnesium compound is further described as follows.

According to this disclosure, the term "magnesium compound" is known in this field, and refers to an organic or inorganic solid anhydrous Mg-containing compound conventionally used as a carrier for a supported catalyst for olefin polymerization.

According to this disclosure, the at least one magnesium compound is selected, for example, from a magnesium halide, an alkoxy magnesium halide, an alkoxy magnesium, an alkyl magnesium, an alkyl magnesium halide and an alkyl alkoxy magnesium.

Further, the magnesium halide, for example, can be selected from magnesium chloride ($MgCl_2$), magnesium bromide ($MgBr_2$), magnesium iodide ($MgI_2$), and magnesium fluoride ($MgF_2$). In one embodiment, the magnesium halide is magnesium chloride.

The alkoxy magnesium halide, for example, can be selected from methoxy magnesium chloride ($Mg(OCH_3)Cl$), ethoxy magnesium chloride ($Mg(OC_2H_5)Cl$), propoxy magnesium chloride ($Mg(OC_3H_7)Cl$), n-butoxy magnesium chloride ($Mg(OC_4H_9)Cl$), isobutoxy magnesium chloride ($Mg(i-OC_4H_9)Cl$), methoxy magnesium bromide ($Mg(OCH_3)Br$), ethoxy magnesium bromide ($Mg(OC_2H_5)Br$), propoxy magnesium bromide ($Mg(OC_3H_7)Br$), n-butoxy magnesium bromide ($Mg(OC_4H_9)Br$), isobutoxy magnesium bromide ($Mg(i-OC_4H_9)Br$), methoxy magnesium iodide ($Mg(OCH_3)I$), ethoxy magnesium iodide ($Mg(OC_2H_5)I$), propoxy magnesium iodide ($Mg(OC_3H_7)I$), n-butoxy magnesium iodide ($Mg(OC_4H_9)I$), and isobutoxy magnesium iodide ($Mg(i-OC_4H_9)I$). In some embodiments, the alkoxy magnesium halide is selected from methoxy magnesium chloride, ethoxy magnesium chloride and isobutoxy magnesium chloride.

The alkoxy magnesium, for example, can be selected from methoxy magnesium ($Mg(OCH_3)_2$), ethoxy magnesium ($Mg(OC_2H_5)_2$), propoxy magnesium ($Mg(OC_3H_7)_2$), butoxy magnesium ($Mg(OC_4H_9)_2$), isobutoxy magnesium ($Mg(i-OC_4H_9)_2$) and 2-ethyl hexyloxy magnesium ($Mg(OCH_2CH(C_2H_5)C_4H)_2$). In some embodiments, the alkoxy magnesium is selected from ethoxy magnesium and isobutoxy magnesium.

The alkyl magnesium, for example, can be selected from methyl magnesium ($Mg(CH_3)_2$), ethyl magnesium ($Mg(C_2H_5)_2$), propyl magnesium ($Mg(C_3H_7)_2$), n-butyl magnesium ($Mg(C_4H_9)_2$) and isobutyl magnesium ($Mg(i-C_4H_9)_2$). In some embodiments, the alkyl magnesium is selected from ethyl magnesium and n-butyl magnesium.

The alkyl magnesium halide, for example, can be selected from methyl magnesium chloride ($Mg(CH_3)Cl$), ethyl magnesium chloride ($Mg(C_2H_5)Cl$), propyl magnesium chloride ($Mg(C_3H_7)Cl$), n-butyl magnesium chloride ($Mg(C_4H_9)Cl$), isobutyl magnesium chloride ($Mg(i-C_4H_9)Cl$), methyl magnesium bromide ($Mg(CH_3)Br$), ethyl magnesium bromide ($Mg(C_2H_5)Br$), propyl magnesium bromide ($Mg(C_3H_7)Br$), n-butyl magnesium bromide ($Mg(C_4H_9)Br$), isobutyl magnesium bromide ($Mg(i-C_4H_9)Br$), methyl magnesium iodide ($Mg(CH_3)I$), ethyl magnesium iodide ($Mg(C_2H_5)I$), propyl magnesium iodide ($Mg(C_3H_7)I$), n-butyl magnesium iodide ($Mg(C_4H_9)I$) and isobutyl magnesium iodide ($Mg(i-C_4H_9)I$). In some embodiments, the alkyl magnesium halide is selected from methyl magnesium chloride, ethyl magnesium chloride and isobutyl magnesium chloride.

The alkyl alkoxy magnesium, for example, can be selected from methyl methoxy magnesium ($Mg(OCH_3)(CH_3)$), methyl ethoxy magnesium ($Mg(OC_2H_5)(CH_3)$), methyl propoxy magnesium ($Mg(OC_3H_7)(CH_3)$), methyl n-butoxy magnesium ($Mg(OC_4H_9)(CH_3)$), methyl isobutoxy magnesium ($Mg(i-OC_4H_9)(CH_3)$), ethyl methoxy magnesium ($Mg(OCH_3)(C_2H_5)$), ethyl ethoxy magnesium ($Mg(OC_2H_5)(C_2H_5)$), ethyl propoxy magnesium ($Mg(OC_3H_7)(C_2H_5)$), ethyl n-butoxy magnesium ($Mg(OC_4H_9)(C_2H_5)$), ethyl isobutoxy magnesium ($Mg(i-OC_4H_9)(C_2H_5)$), propyl methoxy magnesium ($Mg(OCH_3)(C_3H_7)$), propyl ethoxy magnesium ($Mg(OC_2H_5)(C_3H_7)$), propyl propoxy magnesium ($Mg(OC_3H_7)(C_3H_7)$), propyl n-butoxy magnesium ($Mg(OC_4H_9)(C_3H_7)$), propyl isobutoxy magnesium ($Mg(i-OC_4H_9)$ ($C_3H_7$)), n-butyl methoxy magnesium ($Mg(OCH_3)(C_4H_9)$), n-butyl ethoxy magnesium ($Mg(OC_2H_5)(C_4H_9)$), n-butyl propoxy magnesium ($Mg(OC_3H_7)(C_4H_9)$), n-butyl n-butoxy magnesium ($Mg(OC_4H_9)(C_4H_9)$), n-butyl isobutoxy magnesium ($Mg(i\text{-}OC_4H_9)(C_4H_9)$), isobutyl methoxy magnesium ($Mg(OCH_3)(i\text{-}C_4H_9)$), isobutyl ethoxy magnesium ($Mg(OC_2H_5)(i\text{-}C_4H_9)$), isobutyl propoxy magnesium ($Mg(OC_3H_7)(i\text{-}C_4H_9)$), isobutyl n-butoxy magnesium ($Mg(OC_4H_9)(i\text{-}C_4H_9)$), and isobutyl isobutoxy magnesium ($Mg(i\text{-}OC_4H_9)(i\text{-}C_4H_9)$). In some embodiments, the alkyl alkoxy magnesium is butyl ethoxy magnesium.

The at least one magnesium compound can be used with one kind or as a mixture of two or more kinds, but without any limitation thereto.

For example, if more than one magnesium compounds are used as a mixture, the ratio by molar of one magnesium compound to another magnesium compound in the mixture could be, for example, from 0.25:1 to 4:1, such as from 0.5:1 to 3:1, further such as from 1:1 to 2:1.

The operation of obtaining the magnesium compound solution is further described as follows.

For example, the at least one magnesium compound is dissolved in at least one first solvent (hereinafter also referred to as at least one solvent for dissolving the magnesium compound) in the presence of at least one alcohol, to obtain the magnesium compound solution.

Examples of the at least one first solvent include $C_{6-12}$ aromatic hydrocarbons, halogenated $C_{6-12}$ aromatic hydrocarbons, esters and ethers.

For example, the at least one first solvent is selected from a $C_{6-12}$ aromatic hydrocarbon, toluene, xylene, trimethyl benzene, ethyl benzene, and diethyl benzene.

Examples of the halogenated $C_{6-12}$ aromatic hydrocarbon include chlorinated toluene, chlorinated ethyl benzene, brominated toluene, and brominated ethyl benzene.

Examples of the ester include methyl formate, ethyl formate, propyl formate, butyl formate, methyl acetate, ethyl acetate, propyl acetate, butyl acetate, methyl propionate, ethyl propionate, propyl propionate, butyl propionate and butyl butyrate.

Examples of the ether include diethyl ether, ethyl methyl ether and tetrahydrofuran.

In some embodiments, the at least one first solvent is selected from $C_{6-12}$ aromatic hydrocarbons and tetrahydrofuran. In one embodiment, the at least one first solvent is tetrahydrofuran.

The at least one first solvent can be used with one kind or as a mixture of two or more kinds at any ratio therebetween.

According to this disclosure, the term "alcohol" is known in this field, and refers to a compound obtained by replacing at least one hydrogen atom on a hydrocarbon chain (e.g. a $C_{1-30}$ hydrocarbon chain) with an OH group.

Examples of the alcohol include $C_{1-30}$ aliphatic alcohols (such as $C_{1-30}$ aliphatic monobasic alcohols), $C_{6-30}$ aromatic alcohols (such as $C_{6-30}$ aromatic monobasic alcohols) and $C_{4-30}$ alicyclic alcohols (such as $C_{4-30}$ alicyclic monobasic alcohols). In some embodiments, the alcohol is selected from the $C_{1-30}$ aliphatic monobasic alcohols and $C_{2-8}$ aliphatic monobasic alcohols. In some embodiments, the alcohol is selected from ethanol and butanol. Further, the alcohol is optionally substituted by at least one substituent selected from halogen atoms and $C_{1-6}$ alkoxy groups.

For example, the $C_{1-30}$ aliphatic alcohol can be selected from methanol, ethanol, propanol, 2-propanol, butanol, pentanol, 2-methyl pentanol, 2-ethyl pentanol, 2-hexyl butanol, hexanol, and 2-ethyl hexanol. In some embodiments, the $C_{1-30}$ aliphatic alcohol is selected from ethanol, butanol, and 2-ethyl hexanol.

The $C_{6-30}$ aromatic alcohol can be selected, for example, from benzyl alcohol, benzene ethanol, and methyl benzyl alcohol. In one embodiment, the $C_{6-30}$ aromatic alcohol is phenyl ethanol.

The $C_{4-30}$ alicyclic alcohol can be selected, for example, from cyclohexanol, cyclopentanol, cyclooctanol, methyl cyclopentanol, ethyl cyclopentanol, propyl cyclopentanol, methyl cyclohexanol, ethyl cyclohexanol, propyl cyclohexanol, methyl cyclooctanol, ethyl cyclooctanol and propyl cyclooctanol. In some embodiments, the $C_{4-30}$ alicyclic alcohol is selected from cyclohexanol and methyl cyclohexanol.

The alcohol substituted by the halogen atom can be selected, for example, from trichloro methanol, trichloro ethanol and trichloro hexanol. In one embodiment, the alcohol substituted by the halogen atom is trichloro methanol.

The alcohol substituted by the alkoxy group can be selected, for example, from ethylene glycol ethyl ether, ethylene glycol n-butyl ether and 1-butoxy-2-propanol. In one embodiment, the alcohol substituted by the alkoxy group is ethylene glycol ethyl ether.

The at least one alcohol can be used with one kind or as a mixture of two or more kinds. If more than one alcohols are used as a mixture, the ratio of one alcohol to another alcohol in the mixture can be arbitrarily determined, without any limitation thereto.

For preparation of the magnesium compound solution, it is possible to meter the at least one magnesium compound into a mixture solvent consisting of the at least one first solvent and the at least one alcohol, and dissolve same therein, or meter the at least one magnesium compound into the at least one first solvent, and at the same time or thereafter, to add the at least one alcohol, and dissolve same therein, without any limitation thereto.

The duration for preparing the magnesium compound solution (i.e. the duration for dissolving the magnesium compound) is not specifically limited, usually, for example, from 0.5 to 24 hours, such as from 4 to 24 hours. During preparation of the magnesium compound solution, any stirring means, for example, a stirring paddle (whose rotational speed can be, for example, from 10 to 1000 r/min), can be used to facilitate dissolution of the magnesium compound. If needed, heat can be suitably applied to facilitate the dissolution.

According to the first embodiment of this disclosure, at least one porous carrier is mixed with the magnesium compound solution to obtain a first slurry.

The at least one porous carrier is further described as follows.

According to this disclosure, the at least one porous carrier can be selected, for example, from the organic and inorganic porous solids conventionally used in this field as the carrier for producing a supported catalyst.

For example, as the organic porous solid, olefin homopolymers or copolymers, vinyl alcohol homopolymers or copolymers, cyclodextrins, polyesters or co-polyesters, polyamides or co-polyamides, vinyl chloride homopolymers or copolymers, acrylic ester homopolymers or copolymers, methacrylic ester homopolymers or copolymers, styrene homopolymers or copolymers, and partly crosslinked products of these homopolymers or copolymers can be used. Further, for example, partly crosslinked styrene polymers (for example one having a crosslinking degree of from 2% to less than 100%) can be used.

According to a further embodiment of this disclosure, the organic porous solid has one or more active functional group(s) for example selected from a hydroxyl group, a primary amino group, a secondary amino group, a sulfonic acid group, a carboxyl group, an amido group, a N-mono substituted amido group, a sulfonamido group, a N-mono substituted sulfonamido group, a mercapto group, an imido group, and a hydrazide group, on its surface. For example, the active functional group is selected from a carboxyl group and a hydroxyl group.

According to a further embodiment of this disclosure, the organic porous solid is subjected to a thermal activation and/or a chemical activation before use.

For example, the organic porous solid is only subjected to the thermal activation before use, or the organic porous solid is only subjected to the chemical activation before use, or the organic porous solid is subjected to the thermal activation and the chemical activation in any order before use, without any specific limitation thereto.

The thermal activation can be conducted in a normal way. For example, the organic porous solid is treated by heat under a reduced pressure or under an inert gas atmosphere. The phrase "an inert gas atmosphere" herein means that there exists no component capable of reacting with the organic porous solid in the gas atmosphere, or if does exist, only at a rather minor amount. For example, the inert gas atmosphere may be a nitrogen gas or rare gas atmosphere. In one embodiment, the inert gas atmosphere is a nitrogen gas atmosphere. In view of the poor heat resistance, the thermal activation in connection with the organic porous solid should be conducted with the proviso that the inherent structure and composition of the organic porous solid will not be destroyed. Generally, the temperature at which the thermal activation is conducted ranges, for example, from 50 to 400° C., such as from 100-250° C., while the duration for the thermal activation ranges, for example, from 1 to 24 hours, such as from 2 to 12 hours.

After thermal/chemical activation, the organic porous solid should be stored under a positive pressure under an inert gas atmosphere before use.

Examples of the inorganic porous solid include a refractory oxide of a Group IIA, IIIA, IVA or IVB metal in the Periodic Table of Elements (for example silica (also known as silicon dioxide or silica gel), alumina, magnesia, titania, zirconia, or thorium oxide), or a refractory composite oxide of any of these metals (for example, silica-alumina, magnesia-alumina, titania-silica, titania-magnesia, or titania-alumina), and clay, molecular sieve (for example ZSM-5 or MCM-41), mica, montmorillonite, bentonite or kieselguhr. Examples of the inorganic porous solid include the oxide produced by high temperature hydrolysis of a gaseous metal halide or a gaseous silicon compound, for example silica produced by high temperature hydrolysis of silicon tetrachloride, or alumina produced by high temperature hydrolysis of AlCl3.

Examples of the inorganic porous solid include silica, alumina, magnesia, silica-alumina, magnesia-alumina, titania-silica, titanium oxide, molecular sieve, and montmorillonite. In some embodiments, the inorganic porous solid is silica.

According to this disclosure, suitable silica can be produced by any conventional process, or can be any commercially available one. For example, Grace 955, Grace 948, Grace SP9-351, Grace SP9-485, Grace SP9-10046, Daysion Syloid 245 and Aerosil 812 from the Grace company, ES70, ES70X, ES70Y, ES70W, ES757, EP10X and EP11 from the Ineos company, or CS-2133 and MS-3040 from the PQ company can be used.

According to a further embodiment of this disclosure, the inorganic porous solid has an active functional group on its surface, for example a hydroxyl group.

According to a further embodiment of this disclosure, the inorganic porous solid is subjected to a thermal activation and/or a chemical activation before use.

For example, the inorganic porous solid is only subjected to the thermal activation before use, or the inorganic porous solid is only subjected to the chemical activation before use, or the inorganic porous solid is subjected to the thermal activation and the chemical activation in any order before use, without any specific limitation thereto.

The thermal activation can be conducted in a normal way. For example, the inorganic porous solid is treated by heat under a reduced pressure or under an inert gas atmosphere. The phrase "an inert gas atmosphere" herein means that there exists no component capable of reacting with the inorganic porous solid in the gas atmosphere, or if does exist, only at a rather minor amount. The inert gas atmosphere may, for example, be a nitrogen gas or rare gas atmosphere. In one embodiment, the inert gas atmosphere is a nitrogen gas atmosphere. Generally, the temperature at which the thermal activation is conducted ranges, for example, from 200 to 800° C., such as from 400-700° C., further such as from 400-650° C., while the duration for the thermal activation ranges, for example, from 0.5 to 24 hours, such as from 2 to 12 hours, further such as from 4 to 8 hours.

After thermal/chemical activation, the inorganic porous solid should be stored under a positive pressure under an inert gas atmosphere before use.

According to this disclosure, the chemical activation intended for the organic porous solid or the inorganic porous solid can be conducted in a normal way. For example, a chemical activating agent can be used for chemically activating the organic porous solid or the inorganic porous solid.

The chemical activating agent is further described as follows.

According to this disclosure, a Group IVB metal compound is, for example, used as the chemical activating agent.

Examples of the Group IVB metal compound include Group IVB metal halides, Group IVB metal alkylates, Group IVB metal alkoxylates, Group IVB metal alkyl halides, and Group IVB metal alkoxy halides.

The Group IVB metal halide, the Group IVB metal alkylate, the Group IVB metal alkoxylate, the Group IVB metal alkyl halide and the Group IVB metal alkoxy halide can be selected, for example, from compounds of the following general formula:

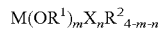

wherein, m is 0, 1, 2, 3, or 4, n is 0, 1, 2, 3, or 4,

M is a Group IVB metal in the Periodic Table of Elements, for example, titanium, zirconium, and hafnium, X is a halogen atom, for example, F, Cl, Br, and I, and $R^1$ and $R^2$ each independently is selected from a $C_1$-$C_{10}$ alkyl, for example, methyl, ethyl, propyl, n-butyl, and isobutyl, $R^1$ and $R^2$ can be identical to or different from each other.

The Group IVB metal halide can be selected, for example, from titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), and hafnium tetraiodide ($HfI_4$).

The Group IVB metal alkylate can be selected, for example, from tetramethyl titanium ($Ti(CH_3)_4$), tetraethyl titanium ($Ti(CH_3CH_2)_4$), tetraisobutyl titanium (Ti(i-$C_4$ $H_9)_4$), tetran-butyl titanium (Ti($C_4H_9$)$_4$), triethyl methyl titanium (Ti($CH_3$)($CH_3CH_2$)$_3$), diethyl dimethyl titanium (Ti($CH_3$)$_2$($CH_3CH_2$)$_2$), trimethyl ethyl titanium (Ti($CH_3$)$_3$($CH_3CH_2$)), triisobutyl methyl titanium (Ti($CH_3$)(i-$C_4H_9$)$_3$), diisobutyl dimethyl titanium (Ti($CH_3$)$_2$(i-$C_4H_9$)$_2$), trimethyl isobutyl titanium (Ti($CH_3$)$_3$(i-$C_4H_9$)), triisobutyl ethyl titanium (Ti($CH_3CH_2$)(i-$C_4H_9$)$_3$), diisobutyl diethyl titanium (Ti($CH_3CH_2$)$_2$(i-$C_4H_9$)$_2$), triethyl isobutyl titanium (Ti($CH_3CH_2$)$_3$(i-$C_4H_9$)), trin-butyl methyl titanium (Ti($CH_3$)($C_4H_9$)$_3$), din-butyl dimethyl titanium (Ti($CH_3$)$_2$($C_4H_9$)$_2$), trimethyl n-butyl titanium (Ti($CH_3$)$_3$($C_4H_9$)), trin-butyl methyl titanium (Ti($CH_3CH_2$)($C_4H_9$)$_3$), din-butyl diethyl titanium (Ti($CH_3CH_2$)$_2$($C_4H_9$)$_2$), and triethyl n-butyl titanium (Ti($CH_3CH_2$)$_3$($C_4H_9$)), tetramethyl zirconium (Zr($CH_3$)$_4$), tetraethyl zirconium (Zr($CH_3CH_2$)$_4$), tetraisobutyl zirconium (Zr(i-$C_4H_9$)$_4$), tetran-butyl zirconium (Zr($C_4H_9$)$_4$), triethyl methyl zirconium (Zr($CH_3$)($CH_3CH_2$)$_3$), diethyl dimethyl zirconium (Zr($CH_3$)$_2$($CH_3CH_2$)$_2$), trimethyl ethyl zirconium (Zr($CH_3$)$_3$($CH_3CH_2$)), triisobutyl methyl zirconium (Zr($CH_3$)(i-$C_4H_9$)$_3$), diisobutyl dimethyl zirconium (Zr($CH_3$)$_2$(i-$C_4H_9$)$_2$), trimethyl isobutyl zirconium (Zr($CH_3$)$_3$(i-$C_4H_9$)), triisobutyl ethyl zirconium (Zr($CH_3CH_2$)(i-$C_4H_9$)$_3$), diisobutyl diethyl zirconium (Zr($CH_3CH_2$)$_2$(i-$C_4H_9$)$_2$), triethyl isobutyl zirconium (Zr($CH_3CH_2$)$_3$(i-$C_4H_9$)), trin-butyl methyl zirconium (Zr($CH_3$)($C_4H_9$)$_3$), din-butyl dimethyl zirconium (Zr($CH_3$)$_2$($C_4H_9$)$_2$), trimethyl n-butyl zirconium (Zr($CH_3$)$_3$($C_4H_9$)), trin-butyl methyl zirconium (Zr($CH_3CH_2$)($C_4H_9$)$_3$), din-butyl diethyl zirconium (Zr($CH_3CH_2$)$_2$($C_4H_9$)$_2$), and triethyl n-butyl zirconium (Zr($CH_3CH_2$)$_3$($C_4H_9$)), tetramethyl hafnium (Hf($CH_3$)$_4$), tetraethyl hafnium (Hf($CH_3CH_2$)$_4$), tetraisobutyl hafnium (Hf(i-$C_4H_9$)$_4$), tetran-butyl hafnium (Hf($C_4H_9$)$_4$), triethyl methyl hafnium (Hf($CH_3$)($CH_3CH_2$)$_3$), diethyl dimethyl hafnium (Hf($CH_3$)$_2$($CH_3CH_2$)$_2$), trimethyl ethyl hafnium (Hf($CH_3$)$_3$($CH_3CH_2$)), triisobutyl methyl hafnium (Hf($CH_3$)(i-$C_4H_9$)$_3$), diisobutyl dimethyl hafnium (Hf($CH_3$)$_2$(i-$C_4H_9$)$_2$), trimethyl isobutyl hafnium (Hf($CH_3$)$_3$(i-$C_4H_9$)), triisobutyl ethyl hafnium (Hf($CH_3CH_2$)(i-$C_4H_9$)$_3$), diisobutyl diethyl hafnium (Hf($CH_3CH_2$)$_2$(i-$C_4H_9$)$_2$), triethyl isobutyl hafnium (Hf($CH_3CH_2$)$_3$(i-$C_4H_9$)), trin-butyl methyl hafnium (Hf($CH_3$)($C_4H_9$)$_3$), din-butyl dimethyl hafnium (Hf($CH_3$)$_2$($C_4H_9$)$_2$), trimethyl n-butyl hafnium (Hf($CH_3$)$_3$($C_4H_9$)), trin-butyl methyl hafnium (Hf($CH_3CH_2$)($C_4H_9$)$_3$), din-butyl diethyl hafnium (Hf($CH_3CH_2$)$_2$($C_4H_9$)$_2$), and triethyl n-butyl hafnium (Hf($CH_3CH_2$)$_3$($C_4H_9$)).

The Group IVB metal alkoxylate can be selected, for example, from tetramethoxy titanium (Ti($OCH_3$)$_4$), tetraethoxy titanium (Ti($OCH_3CH_2$)$_4$), tetraisobutoxy titanium (Ti(i-$OC_4H_9$)$_4$), tetran-butoxy titanium (Ti($OC_4H_9$)$_4$), triethoxy methoxy titanium (Ti($OCH_3$)($OCH_3CH_2$)$_3$), diethoxy dimethoxy titanium (Ti($OCH_3$)$_2$($OCH_3CH_2$)$_2$), trimethoxy ethoxy titanium (Ti($OCH_3$)$_3$($OCH_3CH_2$)), triisobutoxy methoxy titanium (Ti($OCH_3$)(i-$OC_4H_9$)$_3$), diisobutoxy dimethoxy titanium (Ti($OCH_3$)$_2$(i-$OC_4H_9$)$_2$), trimethoxy isobutoxy titanium (Ti($OCH_3$)$_3$(i-$OC_4H_9$)), triisobutoxy ethoxy titanium (Ti($OCH_3CH_2$)(i-$OC_4H_9$)$_3$), diisobutoxy diethoxy titanium (Ti($OCH_3CH_2$)$_2$(i-$OC_4H_9$)$_2$), triethoxy isobutoxy titanium (Ti($OCH_3CH_2$)$_3$(i-$OC_4H_9$)), tri-n-butoxy methoxy titanium (Ti($OCH_3$)($OC_4H_9$)$_3$), din-butoxy dimethoxy titanium (Ti($OCH_3$)$_2$($OC_4H_9$)$_2$), trimethoxy n-butoxy titanium (Ti($OCH_3$)$_3$($OC_4H_9$)), tri-n-butoxy methoxy titanium (Ti($OCH_3CH_2$)($OC_4H_9$)$_3$), din-butoxy diethoxy titanium (Ti($OCH_3CH_2$)$_2$($OC_4H_9$)$_2$), and triethoxy n-butoxy titanium (Ti($OCH_3CH_2$)$_3$($OC_4H_9$)), tetramethoxy zirconium (Zr($OCH_3$)$_4$), tetraethoxy zirconium (Zr($OCH_3CH_2$)$_4$), tetraisobutoxy zirconium (Zr(i-$OC_4H_9$)$_4$), tetran-butoxy zirconium (Zr($OC_4H_9$)$_4$), triethoxy methoxy zirconium (Zr($OCH_3$)($OCH_3CH_2$)$_3$), diethoxy dimethoxy zirconium (Zr($OCH_3$)$_2$($OCH_3CH_2$)$_2$), trimethoxy ethoxy zirconium (Zr($OCH_3$)$_3$($OCH_3CH_2$)), triisobutoxy methoxy zirconium (Zr($OCH_3$)(i-$OC_4H_9$)$_3$), diisobutoxy dimethoxy zirconium (Zr($OCH_3$)$_2$(i-$OC_4H_9$)$_2$), trimethoxy isobutoxy zirconium (Zr($OCH_3$)$_3$(i-$C_4H_9$)), triisobutoxy ethoxy zirconium (Zr($OCH_3CH_2$)(i-$OC_4H_9$)$_3$), diisobutoxy diethoxy zirconium (Zr($OCH_3CH_2$)$_2$(i-$OC_4H_9$)$_2$), triethoxy isobutoxy zirconium (Zr($OCH_3CH_2$)$_3$(i-$OC_4H_9$)), tri-n-butoxy methoxy zirconium (Zr($OCH_3$)($OC_4H_9$)$_3$), din-butoxy dimethoxy zirconium (Zr($OCH_3$)$_2$($OC_4H_9$)$_2$), trimethoxy n-butoxy zirconium (Zr($OCH_3$)$_3$($OC_4H_9$)), tri-n-butoxy methoxy zirconium (Zr($OCH_3CH_2$)($OC_4H_9$)$_3$), din-butoxy diethoxy zirconium (Zr($OCH_3CH_2$)$_2$($OC_4H_9$)$_2$), and triethoxy n-butoxy zirconium (Zr($OCH_3CH_2$)$_3$($OC_4H_9$)), tetramethoxy hafnium (Hf($OCH_3$)$_4$), tetraethoxy hafnium (Hf($OCH_3CH_2$)$_4$), tetraisobutoxy hafnium (Hf(i-$OC_4H_9$)$_4$), tetran-butoxy hafnium (Hf($OC_4H_9$)$_4$), triethoxy methoxy hafnium (Hf($OCH_3$)($OCH_3CH_2$)$_3$), diethoxy dimethoxy hafnium (Hf($OCH_3$)$_2$($OCH_3CH_2$)$_2$), trimethoxy ethoxy hafnium (Hf($OCH_3$)$_3$($OCH_3CHO$)), triisobutoxy methoxy hafnium (Hf($OCH_3$)(i-$OC_4H_9$)$_3$), diisobutoxy dimethoxy hafnium (Hf($OCH_3$)$_2$(i-$OC_4H_3$)$_2$), trimethoxy isobutoxy hafnium (Hf($OCH_3$)$_3$(i-$OC_4H_9$)), triisobutoxy ethoxy hafnium (Hf($OCH_3CH_2$)(i-$OC_4H_9$)$_3$), diisobutoxy diethoxy hafnium (Hf($OCH_3CH_2$)$_2$(i-$OC_4H_3$)$_2$), triethoxy isobutoxy hafnium (Hf($OCH_3CH_2$)$_3$(i-$OC_4H_9$)), tri-n-butoxy methoxy hafnium (Hf($OCH_3$)($OC_4H_9$)$_3$), din-butoxy dimethoxy hafnium (Hf($OCH_3$)$_2$($OC_4H_3$)$_2$), trimethoxy n-butoxy hafnium (Hf($OCH_3$)$_3$($OC_4H_9$)), tri-n-butoxy methoxy hafnium (Hf($OCH_3CH_2$)($OC_4H_9$)$_3$), din-butoxy diethoxy hafnium (Hf($OCH_3CH_2$)$_2$($OC_4H_9$)$_2$), and triethoxy n-butoxy hafnium (Hf($OCH_3CH_2$)$_3$($OC_4H_9$)).

The Group IVB metal alkyl halide can be selected, for example, from trimethyl chloro titanium (TiCl($CH_3$)$_3$), triethyl chloro titanium (TiCl($CH_3CH_2$)$_3$), triisobutyl chloro titanium (TiCl(i-$C_4H_9$)$_3$), trin-butyl chloro titanium (TiCl($C_4H_3$)$_3$), dimethyl dichloro titanium (TiCl$_2$($CH_3$)$_2$), diethyl dichloro titanium (TiCl$_2$($CH_3CH_2$)$_2$), diisobutyl dichloro titanium (TiCl$_2$(i-$C_4H_9$)$_2$), trin-butyl chloro titanium (TiCl($C_4H_3$)$_3$), methyl trichloro titanium (Ti($CH_3$)Cl$_3$), ethyl trichloro titanium (Ti($CH_3CH_2$)Cl$_3$), isobutyl trichloro titanium (Ti(i-$C_4H_3$)Cl$_3$), n-butyl trichloro titanium (Ti($C_4H_3$)Cl$_3$), trimethyl bromo titanium (TiBr($CH_3$)$_3$), triethyl bromo titanium (TiBr($CH_3CH_2$)$_3$), triisobutyl bromo titanium (TiBr(i-$C_4H_9$)$_3$), trin-butyl bromo titanium (TiBr($C_4H_9$)$_3$), dimethyl dibromo titanium (TiBr$_2$($CH_3$)$_2$), diethyl dibromo titanium (TiBr$_2$($CH_3CH_2$)$_2$), diisobutyl dibromo titanium (TiBr$_2$(i-$C_4H_9$)$_2$), trin-butyl bromo titanium (TiBr($C_4H_9$)$_3$), methyl tribromo titanium (Ti($CH_3$)Br$_3$), ethyl tribromo titanium (Ti($CH_3CH_2$)Br$_3$), isobutyl tribromo titanium (Ti(i-$C_4H_9$)Br$_3$), n-butyl tribromo titanium (Ti($C_4H_9$)Br$_3$), trimethyl chloro zirconium (ZrCl($CH_3$)$_3$), triethyl chloro zirconium (ZrCl($CH_3CH_2$)$_3$), triisobutyl chloro zirconium (ZrCl(i-$C_4H_9$)$_3$), trin-butyl chloro zirconium (ZrCl($C_4H_9$)$_3$), dimethyl dichloro zirconium (ZrCl$_2$($CH_3$)$_2$), diethyl dichloro zirconium (ZrCl$_2$($CH_3CH_2$)$_2$), diisobutyl dichloro zirconium (ZrCl$_2$(i-$C_4H_9$)$_2$), trin-butyl chloro zirconium (ZrCl($C_4H_9$)$_3$), methyl trichloro zirconium (Zr($CH_3$)Cl$_3$), ethyl trichloro zirconium (Zr($CH_3CH_2$)Cl$_3$), isobutyl trichloro zirconium (Zr(i-$C_4H_9$)Cl$_3$), n-butyl trichloro zirconium (Zr($C_4H_9$)Cl$_3$), trimethyl bromo zirconium (ZrBr($CH_3$)$_3$), triethyl bromo zirconium (ZrBr($CH_3CH_2$)$_3$), triisobutyl bromo zirconium (ZrBr(i-$C_4H_9$)$_3$), trin-butyl bromo zirconium (ZrBr($C_4H_9$)$_3$), dimethyl dibromo zirconium ($ZrBr_2(CH_3)_2$), diethyl dibromo zirconium ($ZrBr_2(CH_3CH_2)_2$), diisobutyl dibromo zirconium ($ZrBr_2(i-C_4H_9)_2$), tri-n-butyl bromo zirconium ($ZrBr(C_4H_9)_3$), methyl tribromo zirconium ($Zr(CH_3)Br_3$), ethyl tribromo zirconium ($Zr(CH_3CH_2)Br_3$), isobutyl tribromo zirconium ($Zr(i-C_4H_9)Br_3$), n-butyl tribromo zirconium ($Zr(C_4H_9)Br_3$), trimethyl chloro hafnium ($HfCl(CH_3)_3$), triethyl chloro hafnium ($HfCl(CH_3CH_2)_3$), triisobutyl chloro hafnium ($HfCl(i-C_4H_9)_3$), trin-butyl chloro hafnium ($HfCl(C_4H_9)_3$), dimethyl dichloro hafnium ($HfCl_2(CH_3)_2$), diethyl dichloro hafnium ($HfCl_2(CH_3CH_2)_2$), diisobutyl dichloro hafnium ($HfCl_2(i-C_4H_9)_2$), trin-butyl chloro hafnium ($HfCl(C_4H_9)_3$), methyl trichloro hafnium ($Hf(CH_3)Cl_3$), ethyl trichloro hafnium ($Hf(CH_3CH_2)Cl_3$), isobutyl trichloro hafnium ($Hf(i-C_4H_9)Cl_3$), n-butyl trichloro hafnium ($Hf(C_4H_9)Cl_3$), trimethyl bromo hafnium ($HfBr(CH_3)_3$), triethyl bromo hafnium ($HfBr(CH_3CH_2)_3$), triisobutyl bromo hafnium ($HfBr(i-C_4H_9)_3$), trin-butyl bromo hafnium ($HfBr(C_4H_9)_3$), dimethyl dibromo hafnium ($HfBr_2(CH_3)_2$), diethyl dibromo hafnium ($HfBr_2(CH_3CH_2)_2$), diisobutyl dibromo hafnium ($HfBr_2(i-C_4H_9)_2$), trin-butyl bromo hafnium ($HfBr(C_4H_9)_3$), methyl tribromo hafnium ($Hf(CH_3)Br_3$), ethyl tribromo hafnium ($Hf(CH_3CH_2)Br_3$), isobutyl tribromo hafnium ($Hf(i-C_4H_9)Br_3$), and n-butyl tribromo hafnium ($Hf(C_4H_9)Br_3$).

The Group IVB metal alkoxy halide can be selected, for example, from trimethoxy chloro titanium ($TiCl(OCH_3)_3$), triethoxy chloro titanium ($TiCl(OCH_3CH_2)_3$), triisobutoxy chloro titanium ($TiCl(i-OC_4H_9)_3$), tri-n-butoxy chloro titanium ($TiCl(OC_4H_9)_3$), dimethoxy dichloro titanium ($TiCl_2(OCH_3)_2$), diethoxy dichloro titanium ($TiCl_2(OCH_3CH_2)_2$), diisobutoxy dichloro titanium ($TiCl_2(i-OC_4H_9)_2$), tri-n-butoxy chloro titanium ($TiCl(OC_4H_9)_3$), methoxy trichloro titanium ($Ti(OCH_3)Cl_3$), ethoxy trichloro titanium ($Ti(OCH_3CH_2)Cl_3$), isobutoxy trichloro titanium ($Ti(i-C_4H_9)Cl_3$), n-butoxy trichloro titanium ($Ti(OC_4H_9)Cl_3$), trimethoxy bromo titanium ($TiBr(OCH_3)_3$), triethoxy bromo titanium ($TiBr(OCH_3CH_2)_3$), triisobutoxy bromo titanium ($TiBr(i-OC_4H_9)_3$), tri-n-butoxy bromo titanium ($TiBr(OC_4H_9)_3$), dimethoxy dibromo titanium ($TiBr_2(OCH_3)_2$), diethoxy dibromo titanium ($TiBr_2(OCH_3CH_2)_2$), diisobutoxy dibromo titanium ($TiBr_2(i-OC_4H_9)_2$), tri-n-butoxy bromo titanium ($TiBr(OC_4H_9)_3$), methoxy tribromo titanium ($Ti(OCH_3)Br_3$), ethoxy tribromo titanium ($Ti(OCH_3CH_2)Br_3$), isobutoxy tribromo titanium ($Ti(i-C_4H_9)Br_3$), n-butoxy tribromo titanium ($Ti(OC_4H_9)Br_3$), trimethoxy chloro zirconium ($ZrCl(OCH_3)_3$), triethoxy chloro zirconium ($ZrCl(OCH_3CH_2)_3$), triisobutoxy chloro zirconium ($ZrCl(i-OC_4H_9)_3$), tri-n-butoxy chloro zirconium ($ZrCl(OC_4H_3)_3$), dimethoxy dichloro zirconium ($ZrCl_2(OCH_3)_2$), diethoxy dichloro zirconium ($ZrCl_2(OCH_3CH_2)_2$), diisobutoxy dichloro zirconium ($ZrCl_2(i-OC_4H_9)_2$), tri-n-butoxy chloro zirconium ($ZrCl(OC_4H_9)_3$), methoxy trichloro zirconium ($Zr(OCH_3)Cl_3$), ethoxy trichloro zirconium ($Zr(OCH_3CH_2)Cl_3$), isobutoxy trichloro zirconium ($Zr(i-C_4H_9)Cl_3$), n-butoxy trichloro zirconium ($Zr(OC_4H_9)Cl_3$), trimethoxy bromo zirconium ($ZrBr(OCH_3)_3$), triethoxy bromo zirconium ($ZrBr(OCH_3CH_2)_3$), triisobutoxy bromo zirconium ($ZrBr(i-OC_4H_9)_3$), tri-n-butoxy bromo zirconium ($ZrBr(OC_4H_3)_3$), dimethoxy dibromo zirconium ($ZrBr_2(OCH_3)_2$), diethoxy dibromo zirconium ($ZrBr_2(OCH_3CH_2)_2$), diisobutoxy dibromo zirconium ($ZrBr_2(i-OC_4H_9)_2$), tri-n-butoxy bromo zirconium ($ZrBr(OC_4H_9)_3$), methoxy tribromo zirconium ($Zr(OCH_3)Br_3$), ethoxy tribromo zirconium ($Zr(OCH_3CH_2)Br_3$), isobutoxy tribromo zirconium ($Zr(i-C_4H_9)Br_3$), n-butoxy tribromo zirconium ($Zr(OC_4H_9)Br_3$), trimethoxy chloro hafnium ($HfCl(OCH_3)_3$), triethoxy chloro hafnium ($HfCl(OCH_3CH_2)_3$), triisobutoxy chloro hafnium ($HfCl(i-OC_4H_9)_3$), tri-n-butoxy chloro hafnium ($HfCl(OC_4H_9)_3$), dimethoxy dichloro hafnium ($HfCl_2(OCH_3)_2$), diethoxy dichloro hafnium ($HfCl_2(OCH_3CH_2)_2$), diisobutoxy dichloro hafnium ($HfCl_2(i-OC_4H_9)_2$), tri-n-butoxy chloro hafnium ($HfCl(OC_4H_9)_3$), methoxy trichloro hafnium ($Hf(OCH_3)Cl_3$), ethoxy trichloro hafnium ($Hf(OCH_3CH_2)Cl_3$), isobutoxy trichloro hafnium ($Hf(i-C_4H_9)Cl_3$), n-butoxy trichloro hafnium ($Hf(OC_4H_9)Cl_3$), trimethoxy bromo hafnium ($HfBr(OCH_3)_3$), triethoxy bromo hafnium ($HfBr(OCH_3CH_2)_3$), triisobutoxy bromo hafnium ($HfBr(i-OC_4H_9)_3$), tri-n-butoxy bromo hafnium ($HfBr(OC_4H_9)_3$), dimethoxy dibromo hafnium ($HfBr_2(OCH_3)_2$), diethoxy dibromo hafnium ($HfBr_2(OCH_3CH_2)_2$), diisobutoxy dibromo hafnium ($HfBr_2(i-OC_4H_9)_2$), tri-n-butoxy bromo hafnium ($HfBr(OC_4H_9)_3$), methoxy tribromo hafnium ($Hf(OCH_3)Br_3$), ethoxy tribromo hafnium ($Hf(OCH_3CH_2)Br_3$), isobutoxy tribromo hafnium ($Hf(i-C_4H_9)Br_3$), and n-butoxy tribromo hafnium ($Hf(OC_4H_9)Br_3$).

The Group IVB metal compound can further be selected, for example, from the Group IVB metal halides, such as $TiCl_4$, $TiBr_4$, $ZrCl_4$, $ZrBr_4$, $HfCl_4$ and $HfBr_4$, such as $TiCl_4$ and $ZrCl_4$.

The Group IVB metal compound can be used with one kind or as a mixture of two or more kinds at any ratio therebetween.

When the chemical activating agent presents as a liquid at the room temperature, the chemical activating agent can be used by directly dropwise adding a predetermined amount of the chemical activating agent to the organic porous solid or the inorganic porous solid to be activated by said chemical activating agent.

When the chemical activating agent presents as a solid at the room temperature, for ease of metering and handling, said chemical activating agent can be used, for example, in the form of a solution. Of course, when the chemical activating agent exists as a liquid at the room temperature, said chemical activating agent can be also used in the form of a solution if needed, without any specific limitation.

In preparation of the solution of the chemical activating agent, there is no limitation as to the solvent to be used herein, as long as the solvent is capable of dissolving the chemical activating agent.

Specifically, the solvent to be used herein can be selected, for example, from a $C_{5-12}$ alkane, a $C_{5-12}$ cyclic alkane, a halogenated $C_{5-12}$ alkane, a halogenated $C_{5-12}$ cyclic alkane, a $C_{6-12}$ aromatic hydrocarbon and a halogenated $C_{6-12}$ aromatic hydrocarbon, for example pentane, hexane, heptane, octane, nonane, decane, undecane, dodecane, cyclohexane, cyclopentane, cycloheptane, cyclooctane, toluene, ethyl benzene, xylene, chloro pentane, chloro hexane, chloro heptane, chloro octane, chloro nonane, chloro decane, chloro undecane, chloro dodecane, chloro cyclohexane, chloro toluene, chloro ethyl benzene, and chloro xylene. In some embodiments, the solvent is selected from pentane, hexane, decane, cyclohexane and toluene. In some embodiments, the solvent is selected from hexane and toluene.

The solvent can be used with one kind or as a mixture of two or more kinds at any ratio therebetween.

Further, there is no limitation as to the concentration of the chemical activating agent in the solution, which can be determined as needed, as long as it is sufficient for the solution to deliver the predetermined amount of the chemical activating agent for the chemical activation. As aforesaid, if the chemical activating agent presents as a liquid, it is convenient to use said chemical activating agent as such for the treatment, while it is also acceptable to convert it into a solution before use. For example, the molar concentration of the chemical activating agent in its solution ranges, for example, from 0.01 to 1.0 mol/L.

Examples of the process for conducing the chemical activation include a process wherein, when a solid chemical activating agent (for example $ZrCl_4$) is used, first of all, a solution of the chemical activating agent is prepared, then the solution (containing a predetermined amount of the chemical activating agent) is added (such as dropwise) to the organic porous solid or the inorganic porous solid to be activated, to conduct the chemical activation. When a liquid chemical activating agent (for example $TiCl_4$) is used, it is acceptable to add (such as dropwise) a predetermined amount of the chemical activating agent as such to the organic porous solid or the inorganic porous solid to be activated, or a solution of the chemical activating agent is prepared, then the solution (containing a predetermined amount of the chemical activating agent) is added (such as dropwise) to the organic porous solid or the inorganic porous solid to be activated, to conduct the chemical activation.

For example, the chemical activating reaction continues (facilitated by any stirring means, if necessary) at a reaction temperature ranging from −30° C. to 60° C. (such as from −20° C. to 30° C.) for 0.5 to 24 hours, for example, from 1 to 8 hours, further for example from 2 to 6 hours.

Upon completion of the reaction, the resultant is filtrated, washed and dried, to obtain a chemically activated organic porous solid or inorganic porous solid.

According to this disclosure, the filtrating, washing (for example for 1 to 8 times, such as 2 to 6 times, further such as 2 to 4 times) and drying can be conducted in a conventional manner, wherein the solvent for washing can, for example, be the same as that used for dissolving the chemical activating agent.

According to this disclosure, the drying can be of any conventional process, for example, drying under an inert gas atmosphere, vacuum drying or vacuum drying under heat, can be used. In some embodiments, drying under an inert gas atmosphere or vacuum drying under heat is used. In one embodiment, vacuum drying under heat is used. The drying is for example conducted at a temperature ranging from the room temperature to 140° C. for a duration ranging for example, from 2 to 20 hours.

According to this disclosure, the ratio of the at least one porous carrier to the chemical activating agent (based on the Group IVB metal, for example Ti) is, for example, 1 g:1-100 mmol, such as 1 g:2-50 mmol, further such as 1 g:10-25 mmol.

According to this disclosure, the surface area (measured by the BET method) of the at least one porous carrier ranges for example, from 10 to 1000 $m^2/g$, such as from 100 to 600 $m^2/g$. The pore volume (measured by the nitrogen adsorption method) of the porous carrier ranges, for example, from 0.1 to 4 $cm^3/g$, such as from 0.2 to 2 $cm^3/g$. The average particle size (measured by a laser particle size analyzer) of the porous carrier ranges, for example, from 1 to 500 μm, such as from 1 to 100 μm.

According to this disclosure, the at least one porous carrier can be present in any form, for example, fine powder, particulate, sphere, aggregate, or other form.

According to this disclosure, by mixing the at least one porous carrier (optionally after thermally and/or chemically activated) with the magnesium compound solution, the first slurry is obtained.

According to this disclosure, mixing of the at least one porous carrier with the magnesium compound solution could be conducted by using any conventional process, without any specific limitation. For example, the mixing could be conducted, for example, at a temperature ranging from the room temperature to the temperature at which the magnesium compound solution is prepared, metering the at least one porous carrier into the magnesium compound solution, or metering the magnesium compound solution into the at least one porous carrier, and then mixing with each other for a duration ranging from 0.1 to 8 hours, such as from 0.5 to 4 hours, further such as from 1 to 2 hours, if necessary, under stirring.

According to this disclosure, the ratio by weight of the at least one magnesium compound (based on the magnesium compound solid contained in the at least one magnesium compound solution) to the at least one porous carrier ranges from 1:0.1-20, such as from 1:0.5-10, further such as from 1:1-5.

The resultant first slurry is a slurry system. In some embodiments, the slurry stands in a sealed state for a determined duration after preparation, so as to secure uniformity of the system, wherein the duration can range from 2 to 48 hours, such as from 4 to 24 hours, further such as from 6 to 18 hours.

According to the first embodiment of this disclosure, by directly drying the first slurry, a freely flowable solid product can be obtained, which corresponds to the Mg-containing carrier of this disclosure.

According to this disclosure, any conventional process, for example, drying under an inert gas atmosphere, vacuum drying or vacuum drying under heat, can be used for the direct drying. In one embodiment, vacuum drying under heat is used. The drying can be conducted at a temperature ranging, for example, from 30 to 160° C., such as from 60 to 130° C., while the duration for the drying ranges, for example, from 2 to 24 hours.

Or, according to the second embodiment of this disclosure, by directly drying the magnesium compound solution, a freely flowable solid product can be obtained, which corresponds to the Mg-containing carrier of this disclosure.

According to this disclosure, any conventional process, for example, drying under an inert gas atmosphere, vacuum drying or vacuum drying under heat, can be used for the direct drying. In one embodiment, vacuum drying under heat is used. The drying can be conducted at a temperature ranging, for example, from 30 to 160° C., such as from 60 to 130° C., while the duration for the drying ranges, for example, from 2 to 24 hours.

Or, according to the first embodiment of this disclosure, by metering into the first slurry at least one precipitating agent, solid matter (solid product) can be precipitated out of the slurry, whereby obtaining the Mg-containing carrier of this disclosure.

Or, according to the second embodiment of this disclosure, by metering into the magnesium compound solution at least one precipitating agent, solid matter (solid product) can be precipitated out of the solution, whereby obtaining the Mg-containing carrier of this disclosure.

The at least one precipitating agent is further described as follows.

According to this disclosure, the term "precipitating agent" is known in this field, and refers to, for example, a chemically inert liquid capable of lowering the solubility of a solute (for example the magnesium compound and/or the porous carrier) in its solution to the degree that said solute precipitates from the solution as solid matter.

According to this disclosure, an example of the at least one precipitating agent can be a solvent that represents as a poor solvent for the magnesium compound while as a good solvent for the solvent for dissolving the magnesium compound. For example, the at least one precipitating agent is selected from $C_{5-12}$ alkanes, $C_{5-12}$ cyclic alkanes, halogenated $C_{1-10}$ alkanes, and halogenated $C_{5-12}$ cyclic alkanes.

The $C_{5-12}$ alkane is selected, for example, from pentane, hexane, heptane, octane, nonane and decane. In such embodiments, the $C_{5-12}$ alkane is selected from hexane, heptane and decane. In one embodiment, the $C_{5-12}$ alkane is hexane.

The $C_{5-12}$ cyclic alkane is selected, for example, from cyclohexane, cyclo pentane, cycloheptane, cyclodecane, and cyclononane. In one embodiment, the $C_{5-12}$ cyclic alkane is cyclohexane.

The halogenated $C_{1-10}$ alkane is selected, for example, from dichloro methane, dichloro hexane, dichloro heptane, trichloro methane, trichloro ethane, trichloro butane, dibromo methane, dibromo ethane, dibromo heptane, tribromo methane, tribromo ethane, and tribromo butane.

The halogenated $C_{5-12}$ cyclic alkane is selected, for example, from chlorinated cyclo pentane, chlorinated cyclo hexane, chlorinated cyclo heptane, chlorinated cyclo octane, chlorinated cyclo nonane, chlorinated cyclo decane, brominated cyclo pentane, brominated cyclo hexane, brominated cyclo heptane, brominated cyclo octane, brominated cyclo nonane, and brominated cyclo decane.

The at least one precipitating agent can be Used with one kind or as a mixture of two or more kinds at any ratio therebetween.

The at least one precipitating agent can be added all at once or dropwise. In one embodiment, the at least one precipitating agent is added all at once. During the precipitation, any stirring means can be used to facilitate uniform dispersion of the at least one precipitating agent, and eventually facilitate precipitation of the solid product. The stirring means could be in any form, for example, as a stirring paddle, whose rotational speed can range, for example, from 10 to 1000 r/min.

There is no limitation as to the amount of the at least one precipitating agent to be used. Generally, the ratio by volume of the at least one precipitating agent to the at least one solvent for dissolving the magnesium compound ranges, for example, from 1:0.2~5, such as from 1:0.5~2, further such as from 1:0.8~1.5.

There is no limitation as to the temperature at which the at least one precipitating agent is introduced, which for example ranges from the room temperature to a temperature below the boiling point of any solvent or precipitating agent involved herein (such as from 20 to 80° C., further such as from 40 to 60° C.), but not limiting thereto. Further, the precipitation process can be for example conducted at a temperature ranging from the room temperature to a temperature below the boiling point of any solvent or precipitating agent involved herein (such as 20 to 80° C. or 40 to 60° C.), for a duration of for example, not limiting to, from 0.3 to 12 hours, or until completion of the precipitation.

After completely precipitated, the resulting solid product is filtered, washed and dried. There is no limitation to the process for filtering, washing or drying, and any process conventionally used in this field can be used as needed.

If needed, the washing can be generally conducted for 1 to 6 times, such as 3 to 4 times. Herein, the solvent for washing can be the same as or different from the at least one precipitating agent.

The drying can be conducted in line with a conventional process, for example, drying under an inert gas atmosphere, vacuum drying or vacuum drying under heat. In some embodiments, drying under an inert gas atmosphere or vacuum drying under heat is used. In one embodiment, vacuum drying under heat is used.

The drying is for example conducted at a temperature ranging from the room temperature to 140° C. for a duration of 2 to 20 hours, which can also depend on the nature of the at least one first solvent for dissolving the magnesium compound. For example, in the case wherein tetrahydrofuran is used as the at least one first solvent for dissolving the magnesium compound, the drying is for example conducted at about 80° C. under vacuum for a duration of 2 to 12 hours, while toluene is used as the at least one first solvent for dissolving the magnesium compound, the drying is for example conducted at about 100° C. under vacuum for a duration of 4 to 24 hours.

According to this disclosure, the resulting Mg-containing carrier contacts at least one silicon compound and at least one chemical treating agent, to obtain a modified Mg-containing carrier.

The at least one silicon compound of the following formula (X), is further described as follows:

$$Si(OR)_m X_{4-m} \tag{X}$$

In the formula (X), R may be identical to or different from one another, each independently selected from a $C_1$-$C_8$ straight chain and branched alkyl, for example methyl, ethyl, n-propyl, iso-propyl, n-butyl, iso-butyl, n-pentyl, iso-pentyl, n-hexyl, iso-hexyl, n-heptyl, iso-heptyl, n-octyl, and iso-octyl, m is 0, 1, 2, 3, or 4, X may be identical to or different from one another, each independently selected from a halogen atom.

According to this disclosure, the halogen atom is selected from F, Cl, Br and I. In some embodiments, the halogen atom is Cl.

According to this disclosure, R may be identical to or different from one another, for example, each independently selected from a $C_1$-$C_4$ straight chain and branched alkyl, such as ethyl.

Examples of the at least one silicon compound of the formula (X) are selected from, but not limiting thereto, the following compounds:

Tetra $C_1$-$C_8$ straight chain and branched alkoxy silicons, such as tetramethoxy silicon, tetraethoxy silicon, tetra n-propoxy silicon, tetra iso-propoxy silicon, tetra n-butoxy silicon, tetra iso-butoxy silicon, tetra n-pentoxy silicon, tetra iso-pentoxy silicon, tetra n-octyloxy silicon, tetra iso-octyloxy silicon, monomethoxy triethoxy silicon, dimethoxy diethoxy silicon, trimethoxy monoethoxy silicon, monomethoxy tri-n-propoxy silicon, dimethoxy di-n-propoxy silicon, trimethoxy mono-n-propoxy silicon, monomethoxy tri-iso-propoxy silicon, dimethoxy di-iso-propoxy silicon, trimethoxy mono-iso-propoxy silicon, monomethoxy tri-n-butoxy silicon, dimethoxy di-n-butoxy silicon, trimethoxy mono-n-butoxy silicon, monomethoxy tri-iso-butoxy silicon, dimethoxy di-iso-butoxy silicon, trimethoxy mono-iso-butoxy silicon, monoethoxy tri-n-propoxy silicon, diethoxy di-n-propoxy silicon, triethoxy mono-n-propoxy silicon, monoethoxy tri-iso-propoxy silicon, diethoxy di-iso-propoxy silicon, triethoxy mono-iso-propoxy silicon, monoethoxy tri-n-butoxy silicon, diethoxy di-n-butoxy silicon, triethoxy mono-n-butoxy silicon, monoethoxy tri-iso-butoxy silicon, diethoxy di-iso-butoxy silicon, triethoxy mono-iso-butoxy silicon. In some embodiments, the silicon is selected from tetramethoxy silicon, tetraethoxy silicon, and tetra iso-butoxy silicon. In one embodiment, the silicon is tetraethoxy silicon;

$C_1$-$C_8$ straight chain and branched alkoxy halo silicons such as trimethoxy chloro silicon, dimethoxy chloro silicon, monomethoxy chloro silicon, triethoxy chloro silicon, diethoxy chloro silicon, monoethoxy chloro silicon, tri-iso-butoxy chloro silicon, di-iso-butoxy chlorosilicon, mono-iso-butoxy chlorosilicon, trimethoxy bromosilicon, dimethoxy bromosilicon, monomethoxy bromo-silicon, triethoxy bromosilicon, diethoxy bromosilicon, monoethoxy bromosilicon, tri-iso-butoxy bromosilicon, di-iso-butoxy bromosilicon, mono-iso-butoxy bromosilicon, further such as trimethoxy chlorosilicon, dimethoxy chlorosilicon, triethoxy chlorosilicon, diethoxy chlorosilicon, even further such as triethoxy chlorosilicon, a tetrahalo-silicon such as tetrafluorosilicon, tetrachlorosilicon, tetrabromo silicon, tetraiodosilicon, tribromo-chlorosilicon, trichloro-bromosilicon, further such as tetrachlorosilicon.

The at least one silicon compound can be used with one kind or as a mixture of two or more kinds at any ratio therebetween.

The at least one chemical treating agent is further described as follows.

According to this disclosure, a Group IVB metal compound is, for example, used as the at least one chemical treating agent.

The Group IVB metal compound is selected, for example, from a Group IVB metal halide, a Group IVB metal alkylate, a Group IVB metal alkoxylate, a Group IVB metal alkyl halide, and a Group IVB metal alkoxy halide.

The Group IVB metal halide, the Group IVB metal alkylate, the Group IVB metal alkoxylate, the Group IVB metal alkyl halide and the Group IVB metal alkoxy halide are selected, for example, from compounds of the following general formula:

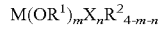

wherein, m is 0, 1, 2, 3, or 4, n is 0, 1, 2, 3, or 4,

M is a Group IVB metal in the Periodic Table of Elements, selected, for example, from titanium, zirconium, and hafnium, X is a halogen atom, selected, for example, from F, Cl, Br, and I, and $R^1$ and $R^2$ each independently is selected from a $C_1$-$C_{10}$ alkyl, for example, methyl, ethyl, propyl, n-butyl, and isobutyl, $R^1$ and $R^2$ could be identical to or different from each other.

The Group IVB metal halide is selected, for example, from titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), and hafnium tetraiodide ($HfI_4$).

The Group IVB metal alkylate is selected, for example, from tetramethyl titanium (Ti($CH_3$)$_4$), tetraethyl titanium (Ti($CH_3CH_2$)$_4$), tetraisobutyl titanium (Ti(i-$C_4H_9$)$_4$), tetran-butyl titanium (Ti($C_4H_9$)$_4$), triethyl methyl titanium (Ti($CH_3$)($CH_3CH_2$)$_3$), diethyl dimethyl titanium (Ti($CH_3$)$_2$($CH_3CH_2$)$_2$), trimethyl ethyl titanium (Ti($CH_3$)$_3$($CH_3CH_2$)), tri-isobutyl methyl titanium (Ti($CH_3$)(i-$C_4H_9$)$_3$), diisobutyl dimethyl titanium (Ti($CH_3$)$_2$(i-$C_4H_9$)$_2$), trimethyl isobutyl titanium (Ti($CH_3$)$_3$(i-$C_4H_9$)), triisobutyl ethyl titanium (Ti($CH_3CH_2$)(i-$C_4H_9$)$_3$), diisobutyl diethyl titanium (Ti($CH_3CH_2$)$_2$(i-$C_4H_9$)$_2$), triethyl isobutyl titanium (Ti($CH_3CH_2$)$_3$(i-$C_4H_9$)), trin-butyl methyl titanium (Ti($CH_3$)($C_4H_9$)$_3$), din-butyl dimethyl titanium (Ti($CH_3$)$_2$($C_4H_9$)$_2$), trimethyl n-butyl titanium (Ti($CH_3$)$_3$($C_4H_9$)), trin-butyl methyl titanium (Ti($CH_3CH_2$)($C_4H_9$)$_3$), din-butyl diethyl titanium (Ti($CH_3CH_2$)$_2$($C_4H_9$)$_2$), triethyl n-butyl titanium (Ti($CH_3CH_2$)$_3$($C_4H_9$)), tetramethyl zirconium (Zr($CH_3$)$_4$), tetraethyl zirconium (Zr($CH_3CH_2$)$_4$), tetraisobutyl zirconium (Zr(i-$C_4H_9$)$_4$), tetran-butyl zirconium (Zr($C_4H_9$)$_4$), triethyl methyl zirconium (Zr($CH_3$)($CH_3CH_2$)$_3$), diethyl dimethyl zirconium (Zr($CH_3$)$_2$($CH_3CH_2$)$_2$), trimethyl ethyl zirconium (Zr($CH_3$)$_3$($CH_3CH_2$)), triisobutyl methyl zirconium (Zr($CH_3$)(i-$C_4H_9$)$_3$), diisobutyl dimethyl zirconium (Zr($CH_3$)$_2$(i-$C_4H_9$)$_2$), trimethyl isobutyl zirconium (Zr($CH_3$)$_3$(i-$C_4H_9$)), triisobutyl ethyl zirconium (Zr($CH_3CH_2$)(i-$C_4H_9$)$_3$), diisobutyl diethyl zirconium (Zr($CH_3CH_2$)$_2$(i-$C_4H_9$)$_2$), triethyl isobutyl zirconium (Zr($CH_3CH_2$)$_3$(i-$C_4H_9$)), trin-butyl methyl zirconium (Zr($CH_3$)($C_4H_9$)$_3$), din-butyl dimethyl zirconium (Zr($CH_3$)$_2$($C_4H_9$)$_2$), trimethyl n-butyl zirconium (Zr($CH_3$)$_3$($C_4H_9$)), trin-butyl methyl zirconium (Zr($CH_3CH_2$)($C_4H_9$)$_3$), din-butyl diethyl zirconium (Zr($CH_3CH_2$)$_2$($C_4H_9$)$_2$), triethyl n-butyl zirconium (Zr($CH_3CH_2$)$_3$($C_4H_9$)), tetramethyl hafnium (Hf($CH_3$)$_4$), tetraethyl hafnium (Hf($CH_3CH_2$)$_4$), tetraisobutyl hafnium (Hf(i-$C_4H_9$)$_4$), tetran-butyl hafnium (Hf($C_4H_9$)$_4$), triethyl methyl hafnium (Hf($CH_3$)($CH_3CH_2$)$_3$), diethyl dimethyl hafnium (Hf($CH_3$)$_2$($CH_3CH_2$)$_2$), trimethyl ethyl hafnium (Hf($CH_3$)$_3$($CH_3CH_2$)), triisobutyl methyl hafnium (Hf($CH_3$)(i-$C_4H_9$)$_3$), diisobutyl dimethyl hafnium (Hf($CH_3$)$_2$(i-$C_4H_9$)$_2$), trimethyl isobutyl hafnium (Hf($CH_3$)$_3$(i-$C_4H_9$)), triisobutyl ethyl hafnium (Hf($CH_3CH_2$)(i-$C_4H_9$)$_3$), diisobutyl diethyl hafnium (Hf($CH_3CH_2$)$_2$(i-$C_4H_9$)$_2$), triethyl isobutyl hafnium (Hf($CH_3CH_2$)$_3$(i-$C_4H_9$)), trin-butyl methyl hafnium (Hf($CH_3$)($C_4H_9$)$_3$), din-butyl dimethyl hafnium (Hf($CH_3$)$_2$($C_4H_9$)$_2$), trimethyl n-butyl hafnium (Hf($CH_3$)$_3$($C_4H_9$)), trin-butyl methyl hafnium (Hf($CH_3CH_2$)($C_4H_9$)$_3$), din-butyl diethyl hafnium (Hf($CH_3CH_2$)$_2$($C_4H_9$)$_2$), triethyl n-butyl hafnium (Hf($CH_3CH_2$)$_3$($C_4H_9$)).

The Group IVB metal alkoxylate is selected, for example, from tetramethoxy titanium (Ti($OCH_3$)$_4$), tetraethoxy titanium (Ti($OCH_3CH_2$)$_4$), tetraisobutoxy titanium (Ti(i-$OC_4H_9$)$_4$), tetran-butoxy titanium (Ti($OC_4H_9$)$_4$), triethoxy methoxy titanium (Ti($OCH_3$)($OCH_3CH_2$)$_3$), diethoxy dimethoxy titanium (Ti($OCH_3$)$_2$($OCH_3CH_2$)$_2$), trimethoxy ethoxy titanium (Ti($OCH_3$)$_3$($OCH_3CH_2$)), triisobutoxy methoxy titanium (Ti($OCH_3$)(i-$OC_4H_9$)$_3$), diisobutoxy dimethoxy titanium (Ti($OCH_3$)$_2$(i-$OC_4H_9$)$_2$), trimethoxy isobutoxy titanium (Ti($OCH_3$)$_3$(i-$OC_4H_9$)), triisobutoxy ethoxy titanium (Ti($OCH_3CH_2$)(i-$OC_4H_9$)$_3$), diisobutoxy diethoxy titanium (Ti($OCH_3CH_2$)$_2$(i-$OC_4H_9$)$_2$), triethoxy isobutoxy titanium (Ti($OCH_3CH_2$)$_3$(i-$OC_4H_9$)), tri-n-butoxy methoxy titanium (Ti($OCH_3$)($OC_4H_9$)$_3$), din-butoxy dimethoxy titanium (Ti($OCH_3$)$_2$($OC_4H_9$)$_2$), trimethoxy n-butoxy titanium (Ti($OCH_3$)$_3$($OC_4H_9$)), tri-n-butoxy methoxy titanium (Ti($OCH_3CH_2$)($OC_4H_9$)$_3$), din-butoxy diethoxy titanium (Ti($OCH_3CH_2$)$_2$($OC_4H_9$)$_2$), triethoxy n-butoxy titanium (Ti($OCH_3CH_2$)$_3$($OC_4H_9$)), tetramethoxy zirconium (Zr($OCH_3$)$_4$), tetraethoxy zirconium (Zr($OCH_3CH_2$)$_4$), tetraisobutoxy zirconium (Zr(i-$OC_4H_9$)$_4$), tetran-butoxy zirconium (Zr($OC_4H_9$)$_4$), triethoxy methoxy zirconium (Zr($OCH_3$)($OCH_3CH_2$)$_3$), diethoxy dimethoxy zirconium (Zr($OCH_3$)$_2$($OCH_3CH_2$)$_2$), trimethoxy ethoxy zirconium (Zr($OCH_3$)$_3$($OCH_3CH_2$)), triisobutoxy methoxy zirconium (Zr($OCH_3$)(i-$OC_4H_9$)$_3$), diisobutoxy dimethoxy zirconium (Zr($OCH_3$)$_2$(i-$OC_4H_9$)$_2$), trimethoxy isobutoxy zirconium (Zr($OCH_3$)$_3$(i-$C_4H_9$)), triisobutoxy ethoxy zirconium (Zr($OCH_3CH_2$)(i-$OC_4H_9$)$_3$), diisobutoxy diethoxy zirconium (Zr($OCH_3CH_2$)$_2$(i-$OC_4H_9$)$_2$), triethoxy isobutoxy zirconium (Zr($OCH_3CH_2$)$_3$(i-$OC_4H_9$)), tri-n-butoxy methoxy zirconium (Zr($OCH_3$)($OC_4H_9$)$_3$), din-butoxy dimethoxy zirconium (Zr($OCH_3$)$_2$($OC_4H_9$)$_2$), trimethoxy n-butoxy zirconium (Zr($OCH_3$)$_3$($OC_4H_9$)), tri-n-butoxy methoxy zirconium (Zr($OCH_3CH_2$)($OC_4H_9$)$_3$), din-butoxy diethoxy zirconium (Zr(OCH$_3$CH$_2$)$_2$(OC$_4$H$_9$)$_2$), triethoxy n-butoxy zirconium (Zr(OCH$_3$CH$_2$)$_3$(OC$_4$H$_9$)), tetramethoxy hafnium (Hf(OCH$_3$)$_4$), tetraethoxy hafnium (Hf(OCH$_3$CH$_2$)$_4$), tetraisobutoxy hafnium (Hf(i-OC$_4$H$_3$)$_4$), tetran-butoxy hafnium (Hf(OC$_4$H$_9$)$_4$), triethoxy methoxy hafnium (Hf(OCH$_3$)(OCH$_3$CH$_2$)$_3$), diethoxy dimethoxy hafnium (Hf(OCH$_3$)$_2$(OCH$_3$CH$_2$)$_2$), trimethoxy ethoxy hafnium (Hf(OCH$_3$)$_3$(OCH$_3$CH$_2$)), triisobutoxy methoxy hafnium (Hf(OCH$_3$)(i-OC$_4$H$_9$)$_3$), diisobutoxy dimethoxy hafnium (Hf(OCH$_3$)$_2$(i-OC$_4$H$_9$)$_2$), trimethoxy isobutoxy hafnium (Hf(OCH$_3$)$_3$(i-OC$_4$H$_9$)), triisobutoxy ethoxy hafnium (Hf(OCH$_3$CH$_2$)(i-OC$_4$H$_9$)$_3$), diisobutoxy diethoxy hafnium (Hf(OCH$_3$CH$_2$)$_2$(i-OC$_4$H$_9$)$_2$), triethoxy isobutoxy hafnium (Hf(OCH$_3$CH$_2$)$_3$(i-C$_4$H$_9$)), tri-n-butoxy methoxy hafnium (Hf(OCH$_3$)(OC$_4$H$_9$)$_3$), din-butoxy dimethoxy hafnium (Hf(OCH$_3$)$_2$(OC$_4$H$_9$)$_2$), trimethoxy n-butoxy hafnium (Hf(OCH$_3$)$_3$(OC$_4$H$_9$)), tri-n-butoxy methoxy hafnium (Hf(OCH$_3$CH$_2$)(OC$_4$H$_9$)$_3$), din-butoxy diethoxy hafnium (Hf(OCH$_3$CH$_2$)$_2$(OC$_4$H$_9$)$_2$), triethoxy n-butoxy hafnium (Hf(OCH$_3$CH$_2$)$_3$(OC$_4$H$_9$)).

The Group IVB metal alkyl halide is selected, for example, from trimethyl chloro titanium (TiCl(CH$_3$)$_3$), triethyl chloro titanium (TiCl(CH$_3$CH$_2$)$_3$), triisobutyl chloro titanium (TiCl(i-C$_4$H$_9$)$_3$), trin-butyl chloro titanium (TiCl(C$_4$H$_9$)$_3$), dimethyl dichloro titanium (TiCl$_2$(CH$_3$)$_2$), diethyl dichloro titanium (TiCl$_2$(CH$_3$CH$_2$)$_2$), diisobutyl dichloro titanium (TiCl$_2$(i-C$_4$H$_9$)$_2$), trin-butyl chloro titanium (TiCl(C$_4$H$_9$)$_3$), methyl trichloro titanium (Ti(CH$_3$)Cl$_3$), ethyl trichloro titanium (Ti(CH$_3$CH$_2$)Cl$_3$), isobutyl trichloro titanium (Ti(i-C$_4$H$_9$)Cl$_3$), n-butyl trichloro titanium (Ti(C$_4$H$_9$)Cl$_3$), trimethyl bromo titanium (TiBr(CH$_3$)$_3$), triethyl bromo titanium (TiBr(CH$_3$CH$_2$)$_3$), triisobutyl bromo titanium (TiBr(i-C$_4$H$_9$)$_3$), trin-butyl bromo titanium (TiBr(C$_4$H$_9$)$_3$), dimethyl dibromo titanium (TiBr$_2$(CH$_3$)$_2$), diethyl dibromo titanium (TiBr$_2$(CH$_3$CH$_2$)$_2$), diisobutyl dibromo titanium (TiBr$_2$(i-C$_4$H$_9$)$_2$), trin-butyl bromo titanium (TiBr(C$_4$H$_9$)$_3$), methyl tribromo titanium (Ti(CH$_3$)Br$_3$), ethyl tribromo titanium (Ti(CH$_3$CH$_2$)Br$_3$), isobutyl tribromo titanium (Ti(i-C$_4$H$_9$)Br$_3$), n-butyl tribromo titanium (Ti(C$_4$H$_9$)Br$_3$), trimethyl chloro zirconium (ZrCl(CH$_3$)$_3$), triethyl chloro zirconium (ZrCl(CH$_3$CH$_2$)$_3$), triisobutyl chloro zirconium (ZrCl(i-C$_4$H$_9$)$_3$), trin-butyl chloro zirconium (ZrCl(C$_4$H$_9$)$_3$), dimethyl dichloro zirconium (ZrCl$_2$(CH$_3$)$_2$), diethyl dichloro zirconium (ZrCl$_2$(CH$_3$CH$_2$)$_2$), diisobutyl dichloro zirconium (ZrCl$_2$(i-C$_4$H$_9$)$_2$), trin-butyl chloro zirconium (ZrCl(C$_4$H$_9$)$_3$), methyl trichloro zirconium (Zr(CH$_3$)Cl$_3$), ethyl trichloro zirconium (Zr(CH$_3$CH$_2$)Cl$_3$), isobutyl trichloro zirconium (Zr(i-C$_4$H$_9$)Cl$_3$), n-butyl trichloro zirconium (Zr(C$_4$H$_9$)Cl$_3$), trimethyl bromo zirconium (ZrBr(CH$_3$)$_3$), triethyl bromo zirconium (ZrBr(CH$_3$CH$_2$)$_3$), triisobutyl bromo zirconium (ZrBr(i-C$_4$H$_9$)$_3$), trin-butyl bromo zirconium (ZrBr(C$_4$H$_9$)$_3$), dimethyl dibromo zirconium (ZrBr$_2$(CH$_3$)$_2$), diethyl dibromo zirconium (ZrBr$_2$(CH$_3$CH$_2$)$_2$), diisobutyl dibromo zirconium (ZrBr$_2$(i-C$_4$H$_9$)$_2$), trin-butyl bromo zirconium (ZrBr(C$_4$H$_9$)$_3$), methyl tribromo zirconium (Zr(CH$_3$)Br$_3$), ethyl tribromo zirconium (Zr(CH$_3$CH$_2$)Br$_3$), isobutyl tribromo zirconium (Zr(i-C$_4$H$_9$)Br$_3$), n-butyl tribromo zirconium (Zr(C$_4$H$_9$)Br$_3$), trimethyl chloro hafnium (HfCl(CH$_3$)$_3$), triethyl chloro hafnium (HfCl(CH$_3$CH$_2$)$_3$), triisobutyl chloro hafnium (HfCl(i-C$_4$H$_9$)$_3$), trin-butyl chloro hafnium (HfCl(C$_4$H$_9$)$_3$), dimethyl dichloro hafnium (HfCl$_2$(CH$_3$)$_2$), diethyl dichloro hafnium (HfCl$_2$(CH$_3$CH$_2$)$_2$), diisobutyl dichloro hafnium (HfCl$_2$(i-C$_4$H$_9$)$_2$), trin-butyl chloro hafnium (HfCl(C$_4$H$_9$)$_3$), methyl trichloro hafnium (Hf(CH$_3$)Cl$_3$), ethyl trichloro hafnium (Hf(CH$_3$CH$_2$)Cl$_3$), isobutyl trichloro hafnium (Hf(i-C$_4$H$_9$)Cl$_3$), n-butyl trichloro hafnium (Hf(C$_4$H$_9$)Cl$_3$), trimethyl bromo hafnium (HfBr(CH$_3$)$_3$), triethyl bromo hafnium (HfBr(CH$_3$CH$_2$)$_3$), triisobutyl bromo hafnium (HfBr(i-C$_4$H$_9$)$_3$), trin-butyl bromo hafnium (HfBr(C$_4$H$_9$)$_3$), dimethyl dibromo hafnium (HfBr$_2$(CH$_3$)$_2$), diethyl dibromo hafnium (HfBr$_2$(CH$_3$CH$_2$)$_2$), diisobutyl dibromo hafnium (HfBr$_2$(i-C$_4$H$_9$)$_2$), trin-butyl bromo hafnium (HfBr(C$_4$H$_9$)$_3$), methyl tribromo hafnium (Hf(CH$_3$)Br$_3$), ethyl tribromo hafnium (Hf(CH$_3$CH$_2$)Br$_3$), isobutyl tribromo hafnium (Hf(i-C$_4$H$_9$)Br$_3$), n-butyl tribromo hafnium (Hf(C$_4$H$_9$)Br$_3$).

The Group IVB metal alkoxy halide is selected, for example, from, trimethoxy chloro-titanium (TiCl(OCH$_3$)$_3$), triethoxy chloro titanium (TiCl(OCH$_3$CH$_2$)$_3$), triisobutoxy chloro titanium (TiCl(i-OC$_4$H$_9$)$_3$), tri-n-butoxy chloro titanium (TiCl(OC$_4$H$_9$)$_3$), dimethoxy dichloro titanium (TiCl$_2$(OCH$_3$)$_2$), diethoxy dichloro titanium (TiCl$_2$(OCH$_3$CH$_2$)$_2$), diisobutoxy dichloro titanium (TiCl$_2$(i-OC$_4$H$_9$)$_2$), tri-n-butoxy chloro titanium (TiCl(OC$_4$H$_9$)$_3$), methoxy trichloro titanium (Ti(OCH$_3$)Cl$_3$), ethoxy trichloro titanium (Ti(OCH$_3$CH$_2$)Cl$_3$), isobutoxy trichloro titanium (Ti(i-C$_4$H$_9$)Cl$_3$), n-butoxy trichloro titanium (Ti(OC$_4$H$_9$)Cl$_3$), trimethoxy bromo titanium (TiBr(OCH$_3$)$_3$), triethoxy bromo titanium (TiBr(OCH$_3$CH$_2$)$_3$), triisobutoxy bromo titanium (TiBr(i-OC$_4$H$_9$)$_3$), tri-n-butoxy bromo titanium (TiBr(OC$_4$H$_9$)$_3$), dimethoxy dibromo titanium (TiBr$_2$(OCH$_3$)$_2$), diethoxy dibromo titanium (TiBr$_2$(OCH$_3$CH$_2$)$_2$), diisobutoxy dibromo titanium (TiBr$_2$(i-OC$_4$H$_9$)$_2$), tri-n-butoxy bromo titanium (TiBr(OC$_4$H$_9$)$_3$), methoxy tribromo titanium (Ti(OCH$_3$)Br$_3$), ethoxy tribromo titanium (Ti(OCH$_3$CH$_2$)Br$_3$), isobutoxy tribromo titanium (Ti(i-C$_4$H$_9$)Br$_3$), n-butoxy tribromo titanium (Ti(OC$_4$H$_9$)Br$_3$), trimethoxy chloro zirconium (ZrCl(OCH$_3$)$_3$), triethoxy chloro zirconium (ZrCl(OCH$_3$CH$_2$)$_3$), triisobutoxy chloro zirconium (ZrCl(i-OC$_4$H$_9$)$_3$), tri-n-butoxy chloro zirconium (ZrCl(OC$_4$H$_9$)$_3$), dimethoxy dichloro zirconium (ZrCl$_2$(OCH$_3$)$_2$), diethoxy dichloro zirconium (ZrCl$_2$(OCH$_3$CH$_2$)$_2$), diisobutoxy dichloro zirconium (ZrCl$_2$(i-OC$_4$H$_9$)$_2$), tri-n-butoxy chloro zirconium (ZrCl(OC$_4$H$_9$)$_3$), methoxy trichloro zirconium (Zr(OCH$_3$)Cl$_3$), ethoxy trichloro zirconium (Zr(OCH$_3$CH$_2$)Cl$_3$), isobutoxy trichloro zirconium (Zr(i-C$_4$H$_9$)Cl$_3$), n-butoxy trichloro zirconium (Zr(OC$_4$H$_9$)Cl$_3$), trimethoxy bromo zirconium (ZrBr(OCH$_3$)$_3$), triethoxy bromo zirconium (ZrBr(OCH$_3$CH$_2$)$_3$), triisobutoxy bromo zirconium (ZrBr(i-OC$_4$H$_9$)$_3$), tri-n-butoxy bromo zirconium (ZrBr(OC$_4$H$_9$)$_3$), dimethoxy dibromo zirconium (ZrBr$_2$(OCH$_3$)$_2$), diethoxy dibromo zirconium (ZrBr$_2$(OCH$_3$CH$_2$)$_2$), diisobutoxy dibromo zirconium (ZrBr$_2$(i-OC$_4$H$_9$)$_2$), tri-n-butoxy bromo zirconium (ZrBr(OC$_4$H$_9$)$_3$), methoxy tribromo zirconium (Zr(OCH$_3$)Br$_3$), ethoxy tribromo zirconium (Zr(OCH$_3$CH$_2$)Br$_3$), isobutoxy tribromo zirconium (Zr(i-C$_4$H$_9$)Br$_3$), n-butoxy tribromo zirconium (Zr(OC$_4$H$_9$)Br$_3$), trimethoxy chloro hafnium (HfCl(OCH$_3$)$_3$), triethoxy chloro hafnium (HfCl(OCH$_3$CH$_2$)$_3$), triisobutoxy chloro hafnium (HfCl(i-OC$_4$H$_9$)$_3$), tri-n-butoxy chloro hafnium (HfCl(OC$_4$H$_9$)$_3$), dimethoxy dichloro hafnium (HfCl$_2$(OCH$_3$)$_2$), diethoxy dichloro hafnium (HfCl$_2$(OCH$_3$CH$_2$)$_2$), diisobutoxy dichloro hafnium (HfCl$_2$(i-OC$_4$H$_9$)$_2$), tri-n-butoxy chloro hafnium (HfCl(OC$_4$H$_9$)$_3$), methoxy trichloro hafnium (Hf(OCH$_3$)Cl$_3$), ethoxy trichloro hafnium (Hf(OCH$_3$CH$_2$)Cl$_3$), isobutoxy trichloro hafnium (Hf(i-C$_4$H$_9$)Cl$_3$), n-butoxy trichloro hafnium (Hf(OC$_4$H$_9$)Cl$_3$), trimethoxy bromo hafnium (HfBr(OCH$_3$)$_3$), triethoxy bromo hafnium (HfBr(OCH$_3$CH$_2$)$_3$), triisobutoxy bromo hafnium (HfBr(i-OC$_4$H$_9$)$_3$), tri-n-butoxy bromo hafnium (HfBr(OC$_4$H$_9$)$_3$), dimethoxy dibromo hafnium (HfBr$_2$(OCH$_3$)$_2$), diethoxy dibromo hafnium (HfBr$_2$(OCH$_3$CH$_2$)$_2$), diisobutoxy dibromo hafnium (HfBr$_2$(i-OC$_4$H$_9$)$_2$), tri-n-butoxy bromo hafnium (HfBr(OC$_4$H$_9$)$_3$), methoxy tribromo hafnium (Hf(OCH$_3$)Br$_3$), ethoxy tribromo hafnium (Hf(OCH$_3$CH$_2$)Br$_3$), isobutoxy tribromo hafnium (Hf(i-C$_4$H$_9$)Br$_3$), n-butoxy tribromo hafnium (Hf(OC$_4$H$_9$)Br$_3$).

The Group IVB metal compound is selected, for example, from Group IVB metal halides, such as TiCl$_4$, TiBr$_4$, ZrCl$_4$, ZrBr$_4$, HfCl$_4$ and HfBr$_4$, further such as TiCl$_4$ and ZrCl$_4$.

The Group IVB metal compound can be used with one kind or as a mixture of two or more kinds at any ratio therebetween.

When the at least one chemical treating agent presents as a liquid at the room temperature, the at least one chemical treating agent can be used as such for the chemical treatment. When the at least one chemical treating agent presents a solid at the room temperature, for ease of metering and handling, said at least one chemical treating agent can be used in the form of a solution. Of course, when the at least one chemical treating agent presents a liquid at the room temperature, said at least one chemical treating agent can be also used in the form of a solution if needed, without any specific limitation.

In preparation of the solution of the at least one chemical treating agent, there is no limitation as to the solvent to be used herein, as long as the solvent is capable of dissolving the at least one chemical treating agent and does not change (for example, dissolves) the formed structure of the Mg-containing carrier.

The solvent to be used herein is selected, for example, from a C$_{5-12}$ alkane, a C$_{5-12}$ cyclic alkane, a halogenated C$_{5-12}$ alkane, a halogenated C$_{5-12}$ cyclic alkane, for example, pentane, hexane, heptane, octane, nonane, decane, undecane, dodecane, cyclohexane, cyclopentane, cycloheptane, cyclooctane, chloro pentane, chloro hexane, chloro heptane, chloro octane, chloro nonane, chloro decane, chloro undecane, chloro dodecane, and chloro cyclohexane. In some embodiments, the solvent is selected, for example, from pentane, hexane, decane, and cyclohexane. In some embodiments, the solvent is hexane.

The solvent can be used with one kind or as a mixture of two or more kinds at any ratio therebetween.

Further, there is no limitation as to the concentration of the at least one chemical treating agent in the solution, which can be determined as needed, as long as it is sufficient for the solution to deliver the predetermined amount of the at least one chemical treating agent for the chemical treatment. As aforesaid, if the at least one chemical treating agent presents as a liquid, it is convenient to use said chemical treating agent as such for the treatment, while it is also acceptable to convert it into a solution before use. For example, the molar concentration of the at least one chemical treating agent in its solution is, but not limiting to, 0.01 to 1.0 mol/L.

According to this disclosure, as the way to conduct the chemical treating reaction, exemplified is one wherein the Mg-containing carrier contacts the at least one silicon compound and the at least one chemical treating agent in the presence of a solvent (hereinafter also referred to as solvent for chemical treatment).

According to this disclosure, there is no limitation as to the solvent for chemical treatment to be used herein, as long as the solvent is capable of dissolving the at least one chemical treating agent and the at least one silicon compound, and does not change (for example, dissolves) the formed structure of the Mg-containing carrier.

The solvent for chemical treatment is selected, for example, from a C$_{5-12}$ alkane, a C$_{5-12}$ cyclic alkane, a halogenated C$_{5-12}$ alkane, a halogenated C$_{5-12}$ cyclic alkane, for example pentane, hexane, heptane, octane, nonane, decane, undecane, dodecane, cyclohexane, cyclopentane, cycloheptane, cyclooctane, chloro pentane, chloro hexane, chloro heptane, chloro octane, chloro nonane, chloro decane, chloro undecane, chloro dodecane, and chloro cyclohexane, such as pentane, hexane, decane, and cyclohexane, further such as hexane.

The solvent for chemical treatment can be used with one kind or as a mixture of two or more kinds at any ratio therebetween.

According to this disclosure, as to the amount of the solvent for chemical treatment, ratio of the Mg-containing carrier to the solvent for chemical treatment is, for example, 1 g:1-100 ml, such as 1 g:2-40 ml, but not limiting thereto. Further, if a solution of the at least one chemical treating agent is used, the amount of the solvent for chemical treatment to be used may be reduced accordingly, if needed.

According to this disclosure, as to the amount of the silicon compound to be used, the ratio by molar of the Mg-containing carrier (based on Mg) to the at least one silicon compound (based on Si) is, for example, 1:0.01-1, such as 1:0.01-0.50, further such as 1:0.05-0.25.

According to this disclosure, as to the amount of the chemical treating agent to be used, the ratio by molar of the Mg-containing carrier (based on Mg) to the chemical treating agent (based on the Group IVB metal) is, for example, 1:0.01-1, such as 1:0.01-0.50, further such as 1:0.10-0.30.

It is known that, upon treatment of a carrier with a Group IVB metal compound, certain amount of the Group IVB metal compound will be supported onto the carrier. According to this disclosure, a relatively great part from the supported Group IVB metal compound is in an inactive state, that is, this part of Group IVB metal compound does not contribute to the catalyst activity for olefin polymerization of the resultant catalyst. Then, also according to this disclosure, if a silicon compound specified by this disclosure is co-used along with the Group IVB metal compound during the chemical treatment of the carrier, this part of Group IVB metal compound or the total amount of the Group IVB metal compound to be supported onto the carrier will be significantly reduced, and then the amount of the nonmetallocene complex to be supported or the ratio of the nonmetallocene complex to be supported with respect to the Group IVB metal compound will be significantly increased accordingly. As a result, when the silicon compound is co-used, the catalyst activity for olefin polymerization of the resultant supported nonmetallocene catalyst will be significantly increased, as compared with that produced without use of the silicon compound. Further, when the silicon compound is co-used, at least one effect selected from narrowing the molecular weight distribution of the resultant polymer, improving the mechanical properties of the resultant polymer, and regularizing the sequence distribution of a comonomer in the resultant polymer can be obtained.

According to this disclosure, there is no limitation as to the sequence for contacting the Mg-containing carrier, the at least one silicon compound, and the at least one chemical treating agent. A simultaneous contacting of the three or a successive contacting at any sequence can, for example, be used.

According to an embodiment of this disclosure, to conduct the chemical treating reaction, in the presence of the solvent for chemical treatment, the Mg-containing carrier contacts the at least one silicon compound (hereinafter referred to as "first contacting step"), and then the at least one chemical treating agent is added for a further contact (hereinafter referred to as "second contacting step").

As the way to conduct the first contacting step, exemplified is that under stirring, the Mg-containing carrier and the at least one silicon compound are metered into the solvent for chemical treatment, at the same time or one after another, the reaction continued at 0 to 100° C. (such as from 20 to 80° C.) for a duration of, for example, from 0 to 6 hours, such as from 0.5 to 4 hours, to form a slurry.

After the slurry is prepared as aforesaid, the slurry further contacts the at least one chemical treating agent (i.e. the second contacting step).

As the way to conduct the second contacting step, exemplified is that under stirring, at a temperature of 0 to 100° C. (such as from 20 to 80° C.), the at least one chemical treating agent or a solution of the at least one chemical treating agent is (for example, dropwise) introduced into the slurry. After completion of this introduction, the stirring is continued at a temperature of 0 to 100° C. (such as from 20 to 80° C.) for 0.5 to 8 hours, such as 1 to 4 hours, so as to obtain a reaction mixture.

After completion of the second contacting step, the reaction mixture is filtered, washed and dried, so as to obtain the modified Mg-containing carrier.

According to this disclosure, the filtering, washing and drying can be conducted with a conventional manner. If needed, the washing can be, for example, conducted for 1 to 8 times, such as from 2 to 6 times, further such as from 2 to 4 times. Herein, the solvent for washing can be the same as the solvent for chemical treatment.

The drying can be conducted in line with a conventional process, for example, drying under an inert gas atmosphere, vacuum drying or vacuum drying under heat, such as drying under an inert gas atmosphere or vacuum drying under heat, further such as vacuum drying under heat. The drying is for example conducted at a temperature ranging from room temperature to 140° C. for a duration of, for example, 2 to 20 hours, but not limiting to this.

According to this disclosure, the modified Mg-containing carrier contacts at least one nonmetallocene complex in the presence of at least one second solvent, to obtain the supported nonmetallocene catalyst of this disclosure.

According to this disclosure, the term "nonmetallocene complex" refers to a single-site catalyst for olefin polymerization, and completely different from a metallocene complex, to an organic metallic compound containing in its structure no cyclopentadienyl or any derivative thereof (e.g. a metallocene ring, a fluorene ring or an indene ring), and capable of exhibiting a catalysis activity for olefin polymerization when used in combination with a co-catalyst like that identified as below in this specification, which is hereinafter also referred to as a nonmetallocene complex for olefin polymerization. The nonmetallocene complex contains a central metal atom and at least one multi-dentate ligand (such as a tri or more -dentate ligand) bonding to the central metal atom by a coordination bond. The term "nonmetallocene ligand" corresponds to the aforesaid multi-dentate ligand.

According to this disclosure, the nonmetallocene complex is selected from the compounds having the following structure,

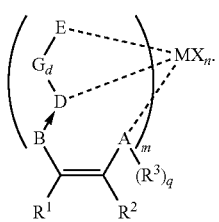

According to aforesaid chemical formula, the ligands which form a coordination bond with the central metal atom M refer to the groups X and the multi-dentate ligands (the structure in the parenthesis). According to the chemical formula of said multi-dentate ligand, the groups A, D and E (the coordination groups) form a coordination bond with the central metal atom M through the coordination atoms (for example, hetero atoms like N, O, S, Se and P) contained in these groups.

According to this disclosure, the absolute value of the total sum of the negative charges carried by all of the ligands (including the group X and the multi-dentate ligand) is equal to that of the positive charges carried by the central metal atom M.

According to a further embodiment of this disclosure, the nonmetallocene complex is selected from the following compound (A) and the following compound (B),

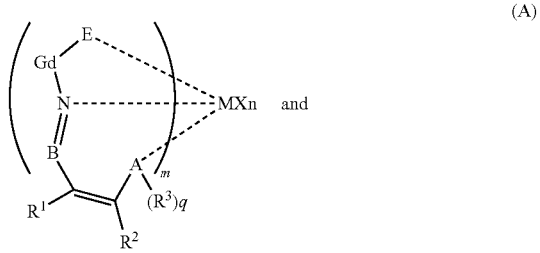

(A)

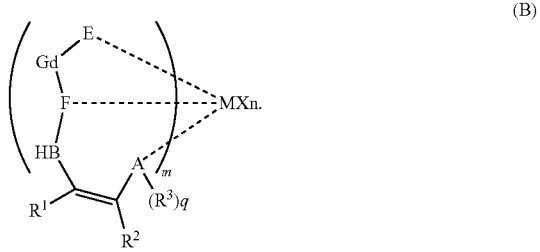

(B)

According to a further embodiment of this disclosure, the nonmetallocene complex is selected from the following compound (A-1), the following compound (A-2), the following compound (A-3), the following compound (A-4), the following compound (B-1), the following compound (B-2), the following compound (B-3), and the following compound (B-4),

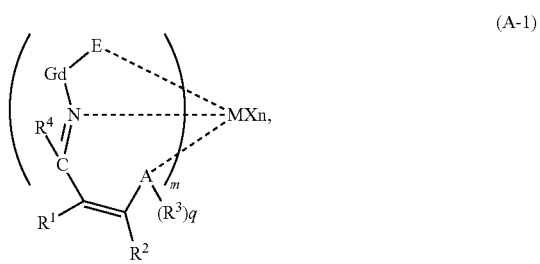

(A-1)

-continued (A-2)
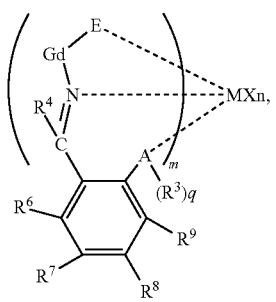

(A-3)
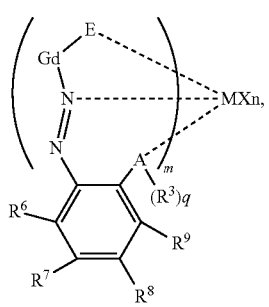

(A-4)
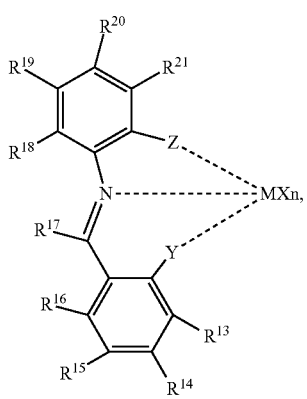

(B-1)
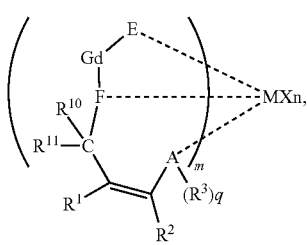

(B-2)
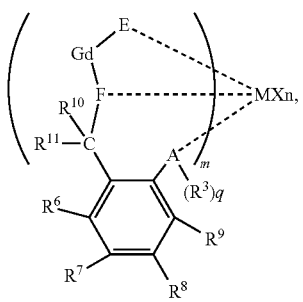

-continued (B-3)
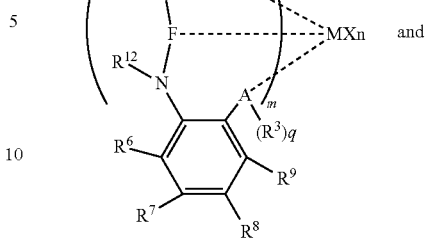
and (B-4)
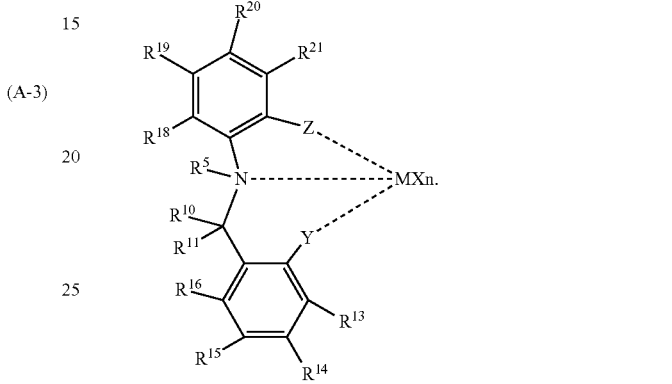

In all of the aforesaid formulae,
q is 0 or 1;
d is 0 or 1;
m is 1, 2 or 3;
M is a central metal atom selected from a Group III to XI metal atom in the Periodic Table of Elements, such as a Group IVB metal atom, for example, Ti(IV), Zr(IV), Hf(IV), Cr(III), Fe(III), Ni(II), Pd(II) or Co(II);
n is 1, 2, 3 or 4, depending on the valence of the central metal atom M;
X is selected from a halogen atom, a hydrogen atom, a $C_1$-$C_{30}$ hydrocarbyl, a substituted $C_1$-$C_{30}$ hydrocarbyl, an oxygen-containing group, a nitrogen-containing group, a sulfur-containing group, a boron-containing group, an aluminium-containing group, a phosphor-containing group, a silicon-containing group, a germanium-containing group, and a tin-containing group, when multiple X exist, the X may be the same as or different from one another, and may form a bond or a ring with one another;
A is selected from an oxygen atom, a sulfur atom, a selenium atom,

—$NR^{23}R^{24}$, —$N(O)R^{25}R^{26}$,

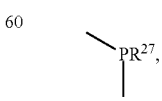

—$PR^{28}R^{29}$, —$P(O)R^{30}OR^{31}$, a sulfone group, a sulfoxide group and —$Se(O)R^{39}$, wherein N, O, S, Se and P each represents a coordination atom.

B is selected from a nitrogen atom, a nitrogen-containing group, a phosphor-containing group and a $C_1$-$C_{30}$ hydrocarbyl.

D is selected from a nitrogen atom, an oxygen atom, a sulfur atom, a selenium atom, a phosphor atom, a nitrogen-containing group, a phosphor-containing group, a $C_1$-$C_{30}$ hydrocarbyl, a sulfone group, and a sulfoxide group, wherein N, O, S, Se and P each represents a coordination atom.

E is selected from a nitrogen-containing group, an oxygen-containing group, a sulfur-containing group, a selenium-containing group, a phosphor-containing group, and a cyano group (—CN), wherein N, O, S, Se and P each represents a coordination atom.

F is selected from a nitrogen atom, a nitrogen-containing group, an oxygen-containing group, a sulfur-containing group, a selenium-containing group, and a phosphor-containing group, wherein N, O, S, Se and P each represents a coordination atom.

G is selected from a $C_1$-$C_{30}$ hydrocarbyl, a substituted $C_1$-$C_{30}$ hydrocarbyl, and an inert functional group.

Y is selected from an oxygen atom, a nitrogen-containing group, an oxygen-containing group, a sulfur-containing group, a selenium-containing group, and a phosphor-containing group, wherein N, O, S, Se and P each represents a coordination atom.

Z is selected from a nitrogen-containing group, an oxygen-containing group, a sulfur-containing group, a selenium-containing group, a phosphor-containing group, and a cyano group (—CN), for example, —$NR^{23}R^{24}$, —$N(O)R^{25}R^{26}$, —$PR^{28}R^{29}$, —$P(O)R^3OR^{31}$, —$OR^{34}$, —$SR^{35}$, —$S(O)R^{36}$, —$SeR^{38}$ or —$Se(O)R^{39}$, wherein N, O, S, Se and P each represents a coordination atom.

→ represents a single bond or a double bond;
— represents a covalent bond or an ionic bond;
--- represents a coordination bond, a covalent bond or an ionic bond;

$R^1$ to $R^4$, $R^6$ to $R^{21}$ are each independently selected from a hydrogen atom, a $C_1$-$C_{30}$ hydrocarbyl, a substituted $C_1$-$C_{30}$ hydrocarbyl (such as a halogenated hydrocarbyl, for example —$CH_2Cl$ and —$CH_2CH_2Cl$), and an inert functional group. $R^{22}$ to $R^{36}$, $R^{38}$ and $R^{39}$ are each independently selected from a hydrogen atom, a $C_1$-$C_{30}$ hydrocarbyl, a substituted $C_1$-$C_{30}$ hydrocarbyl (such as a halogenated hydrocarbyl, for example —$CH_2Cl$ and —$CH_2CH_2Cl$). These groups may be identical to or different from one another, and any adjacent groups (for example $R^1$ and $R^2$, $R^6$ and $R^7$, $R^7$ and $R^8$, $R^8$ and $R^9$, $R^{13}$ and $R^{14}$, $R^{14}$ and $R^{15}$, $R^{15}$ and $R^{16}$, $R^{18}$ and $R^{19}$, $R^{19}$ and $R^{20}$, $R^{20}$ and $R^{21}$, $R^{23}$ and $R^{24}$, or $R^{25}$ and $R^{26}$), together with the atoms to which they are attached, may form a ring (such as an aromatic ring, for example an unsubstituted benzene ring or a benzene ring substituted by one to four of a $C_1$-$C_{30}$ hydrocarbyl or a substituted $C_1$-$C_{30}$ hydrocarbyl (such as a halogenated hydrocarbyl, for example —$CH_2Cl$ and —$CH_2CH_2Cl$)) with one another.

$R^5$, when exists, is selected from a hydrogen atom, a $C_1$-$C_{30}$ hydrocarbyl, a substituted $C_1$-$C_{30}$ hydrocarbyl, an oxygen-containing group, a sulfur-containing group, a nitrogen-containing group, a selenium-containing group, and a phosphor-containing group, with the proviso that when $R^5$ is the oxygen-containing group, the sulfur-containing group, the nitrogen-containing group, the selenium-containing group, or the phosphor-containing group, N, O, S, P and Se in group $R^5$ each can act as a coordination atom (to coordinate with the central metal atom M).

In the context of this disclosure, as the inert functional group, one or more selected from a halogen atom, an oxygen-containing group, a nitrogen-containing group, a silicon-containing group, a germanium-containing group, a sulfur-containing group, a tin-containing group, a $C_1$-$C_{10}$ ester group, and a nitro group (—$NO_2$) can be exemplified, while a $C_1$-$C_{30}$ hydrocarbyl or a substituted $C_1$-$C_{30}$ hydrocarbyl is, for example, excluded.

In the context of this disclosure, restricted by the specific structure of the present nonmetallocene ligand, the inert functional group can be characterized as follows:

(1) it will not interfere with the coordination process between the aforesaid group A, D, E, F, Y or Z and the central metal atom M, and (2) its capability to form a coordination bond with the central metal atom M is inferior to the capability of the aforesaid group A, D, E, F, Y or Z to form a coordination bond with the central metal atom M, and will not displace the formed coordination between the central metal atom M and any of these groups A, D, E, F, Y and Z.

According to this disclosure, in all of the aforesaid formulae, if necessary, any two or more adjacent groups (for example $R^{21}$ and the group Z, or $R^{13}$ and the group Y), together with the atoms to which they are attached, may form a ring with one another, such as a $C_6$-$C_{30}$ aromatic hetero-ring containing the hetero atom originated from the group Z or Y, for example a pyridine ring, wherein the aromatic hetero-ring is optionally substituted by at least one substituent selected from a $C_1$-$C_{30}$ hydrocarbyl, and a substituted $C_1$-$C_{30}$ hydrocarbyl.

In the context of this disclosure, the halogen atom is selected from F, Cl, Br and I.

In the context of this disclosure, the nitrogen-containing group is selected from

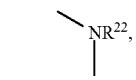

—$NR^{23}R^{24}$, -T-$NR^{23}R^{24}$, and —$N(O)R^{25}R^{26}$.

In the context of this disclosure, the phosphor-containing group is selected from

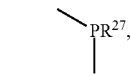

—$PR^{28}R^{29}$, —$P(O)R^{30}R^{31}$, and —$P(O)R^{32}(OR^{33})$.

In the context of this disclosure, the oxygen-containing group is selected from hydroxy, —$OR^{34}$, and -T-$OR^{34}$.

In the context of this disclosure, the sulfur-containing group is selected from —$SR^{35}$, -T-$SR^{35}$, —$S(O)R^{36}$, and -T-$SO_2R^{37}$.

In the context of this disclosure, the selenium-containing group is selected from —$SeR^{38}$, -T-$SeR^{38}$, —$Se(O)R^{39}$, and -T-$Se(O)R^{39}$.

In the context of this disclosure, the group T is selected from a $C_1$-$C_{30}$ hydrocarbyl and a substituted $C_1$-$C_{30}$ hydrocarbyl.

In the context of this disclosure, $R^{37}$ is selected from a hydrogen atom, a $C_1$-$C_{30}$ hydrocarbyl, and a substituted $C_1$-$C_{30}$ hydrocarbyl.

In the context of this disclosure, the $C_1$-$C_{30}$ hydrocarbyl is selected from a $C_1$-$C_{30}$ alkyl group (for example a $C_1$-$C_6$ alkyl group, for example isobutyl group), a $C_7$-$C_{30}$ alkylaryl group (for example tolyl, xylyl, diisobutyl phenyl), a $C_7$-$C_{30}$ aralkyl group (for example benzyl), a $C_3$-$C_{30}$ cyclic alkyl group, a $C_2$-$C_{30}$ alkenyl group, a $C_2$-$C_{30}$ alkynyl group, a $C_6$-$C_{30}$ aryl group (for example phenyl, naphthyl, anthracyl), a $C_8$-$C_{30}$ fused-ring group, and a $C_4$-$C_{30}$ heterocyclic group, wherein the heterocyclic group contains 1 to 3 hetero atom(s) selected from a nitrogen atom, an oxygen atom, and a sulfur atom, including for example a pyridyl group, a pyrrolyl group, a furanyl group, and a thienyl group.

In the context of this disclosure, depending on the nature of the groups to which the $C_1$-$C_{30}$ hydrocarbyl bond, the $C_1$-$C_{30}$ hydrocarbyl may intend a $C_1$-$C_{30}$ hydrocarbon-diyl (a bivalent group, or referred to as a $C_1$-$C_{30}$ hydrocarbylene group), or a $C_1$-$C_{30}$ hydrocarbon-triyl (a trivalent group).

In the context of this disclosure, the substituted $C_1$-$C_{30}$ hydrocarbyl intends the aforesaid $C_1$-$C_{30}$ hydrocarbyl having at least one inert substituent. By inert, it means that these inert substituents will not substantially interfere with the coordination process between the aforesaid coordination groups (i.e. the aforesaid groups A, D, E, F, Y and Z, or further, if applicable, the group $R^5$, no X??) and the central metal atom M (i.e. the aforesaid Group IVB metal atom). In other words, restricted by the specific chemical structure of the present nonmetallocene ligand, these substituents are incapable of or have no chance (due to for example steric hindrance) to coordinate with the Group IVB metal atom to form a coordination bond therewith. Generally, the inert substituent refers to the aforesaid halogen atom or $C_1$-$C_{30}$ alkyl group (for example a $C_1$-$C_6$ alkyl group, for example isobutyl group).

In the context of this disclosure, the boron-containing group is selected from $BF_4^-$, $(C_6F_5)_4B^-$, and $(R^{40}BAr_3)^-$, the aluminium-containing group is selected from an alkyl aluminium, $AlPh_4^-$, $AlF_4^-$, $AlCl_4^-$, $AlBr_4^-$, $AlI_4^-$, and $R^{41}AlAr_3^-$, the silicon-containing group is selected from —$SiR^{42}R^{43}R^{44}$ and -T-$SiR^{45}$, the germanium-containing group is selected from —$GeR^{46}R^{47}R^{48}$ and -T-$GeR^{49}$, the tin-containing group is selected from —$SnR^{50}R^{51}R^{52}$, -T-$SnR^{53}$, and -T-Sn(O)$R^{54}$, the Ar group represents a $C_6$-$C_{30}$ aryl group, $R^{40}$ to $R^{54}$ are each independently selected from a hydrogen atom, the $C_1$-$C_{30}$ hydrocarbyl, and the substituted $C_1$-$C_{30}$ hydrocarbyl, wherein these groups may be identical to or different from one another, and any adjacent groups, together with the atoms to which they are attached, may form a bond or a ring with one another. The group T is defined as aforesaid.

As the at least one nonmetallocene complex, the following compounds can be further exemplified.

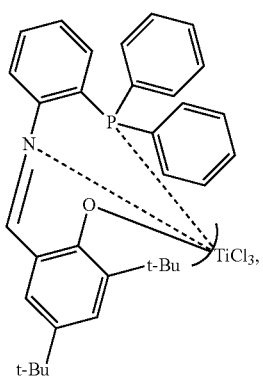

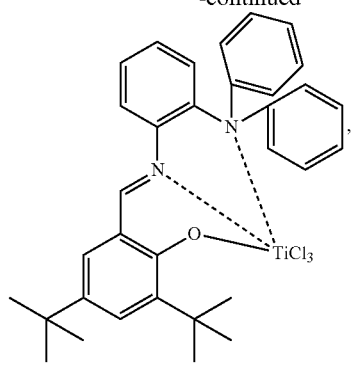

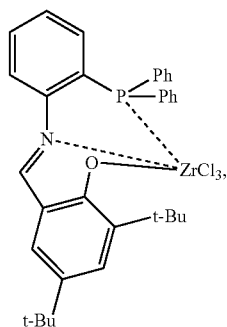

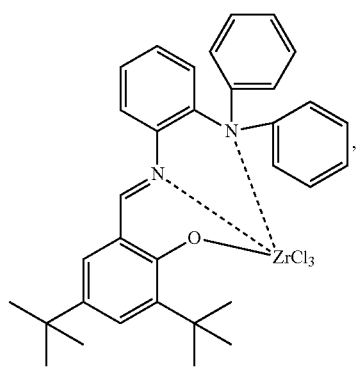

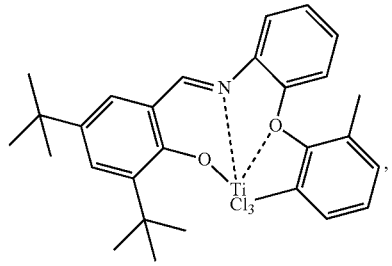

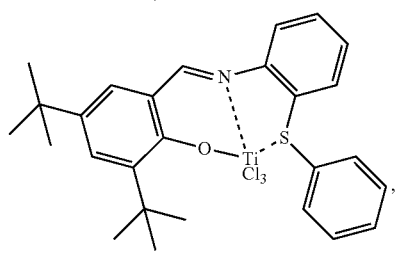

39
-continued
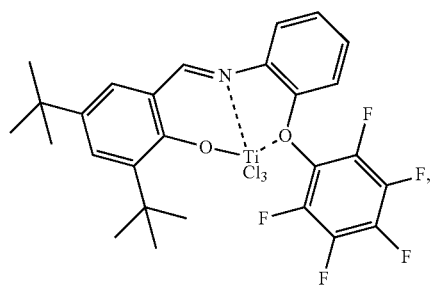
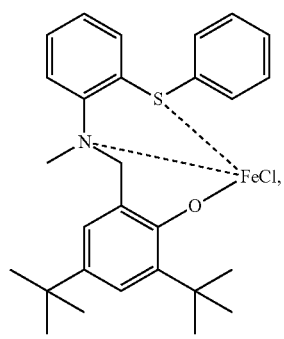
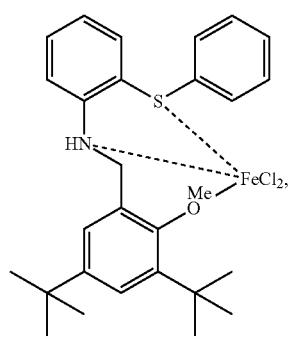
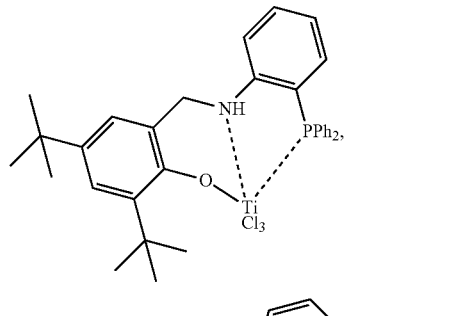
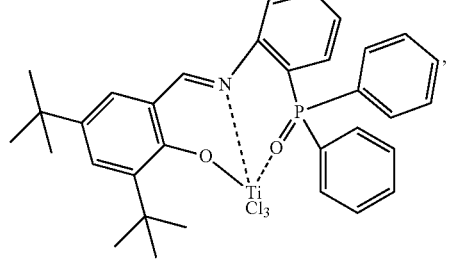
40
-continued
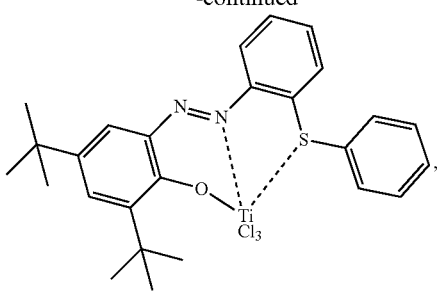
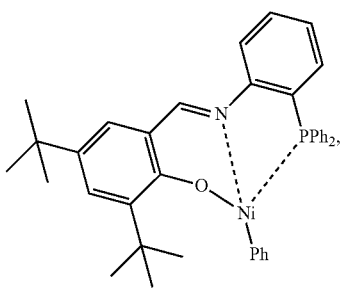
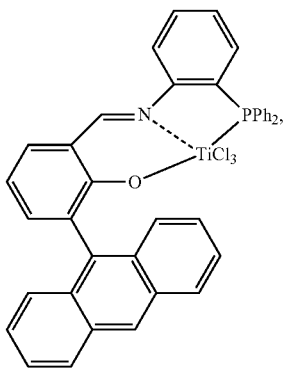
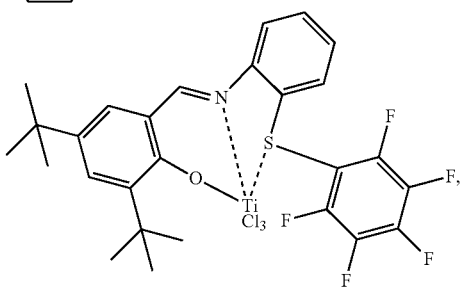
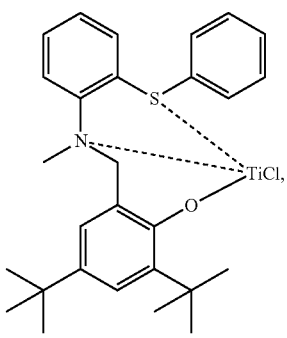

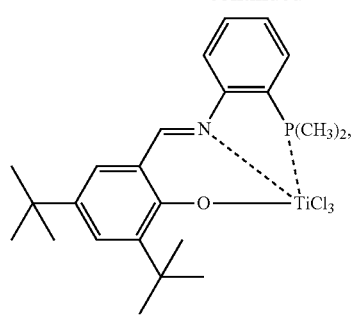
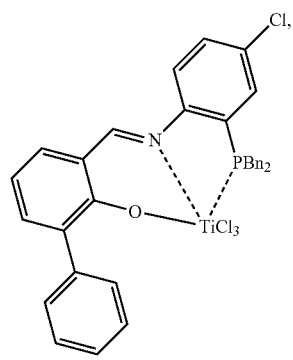
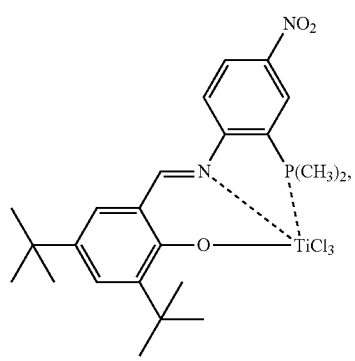
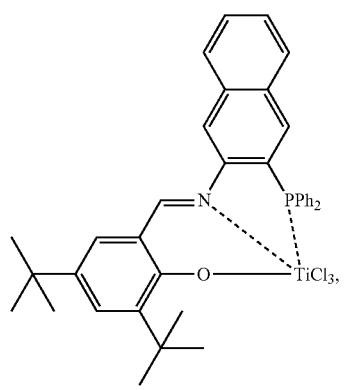
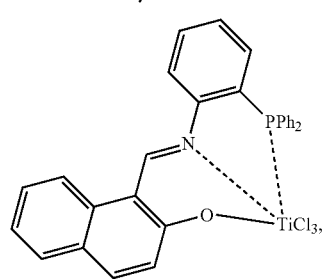
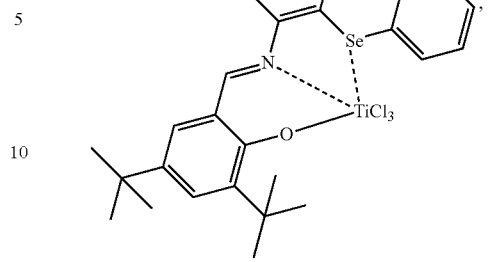
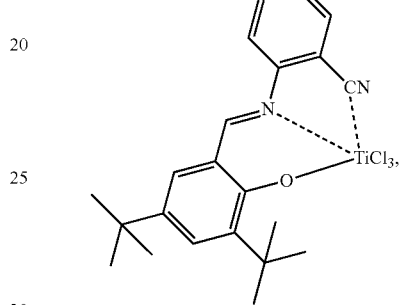
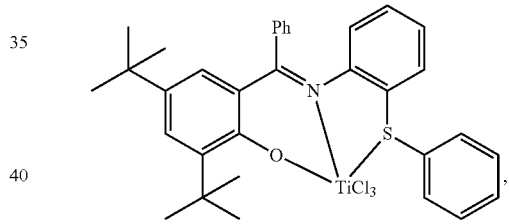
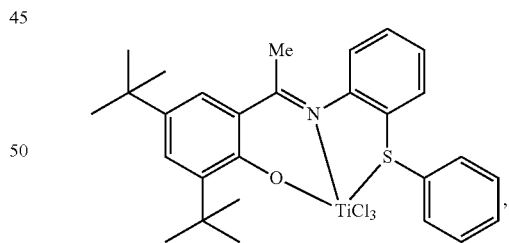
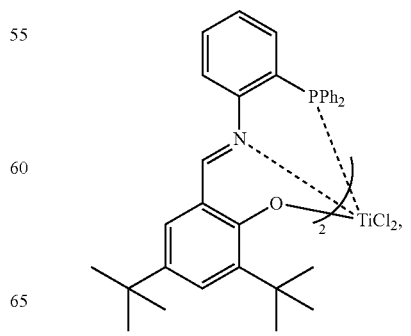

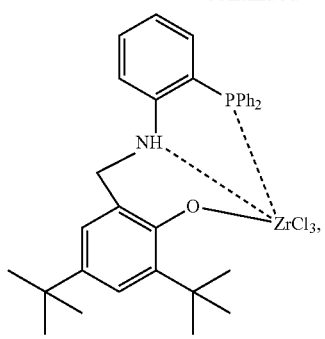
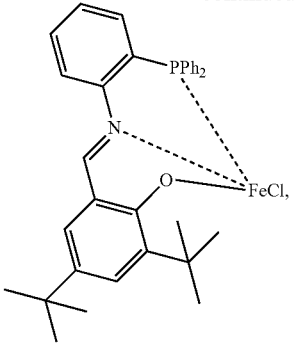
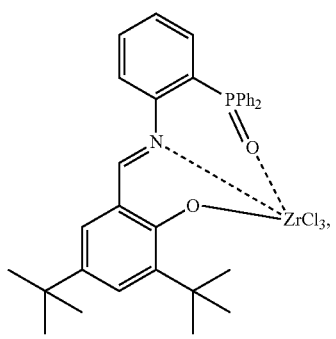
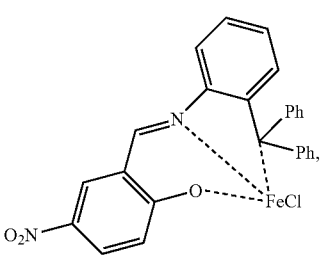
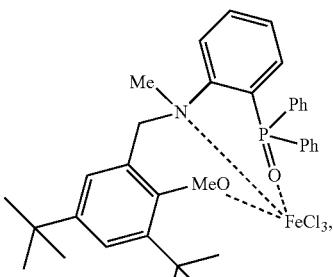
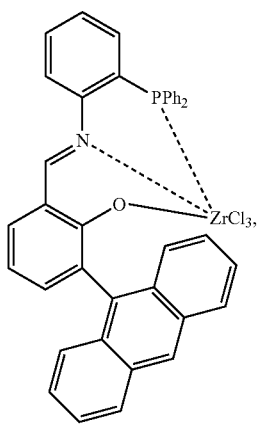
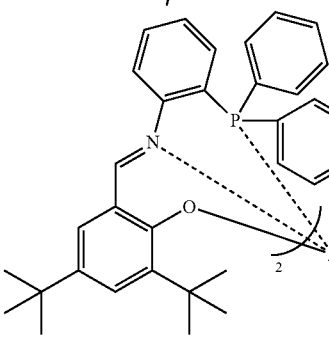
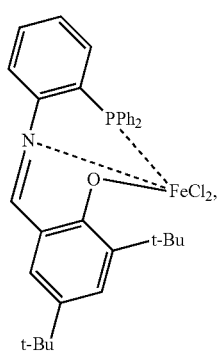
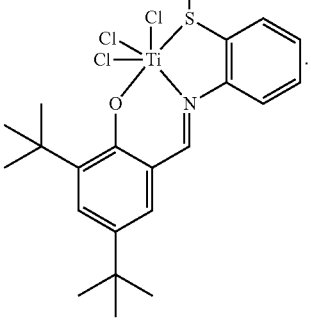

As the at least one nonmetallocene complex, the following compounds can be further exemplified.
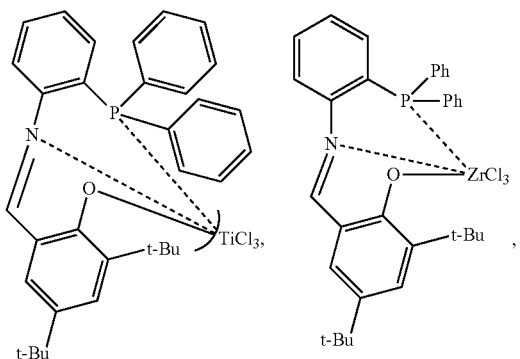
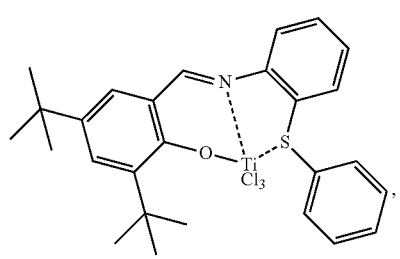
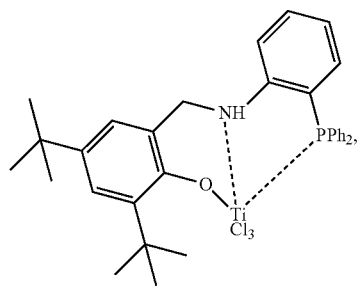
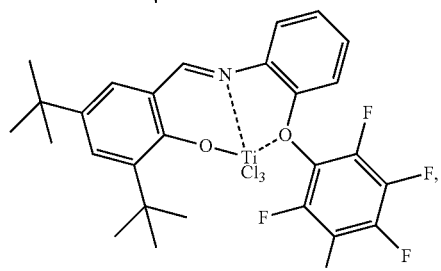
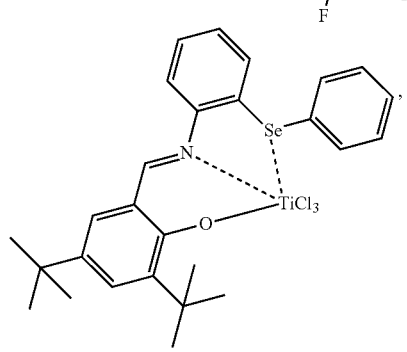
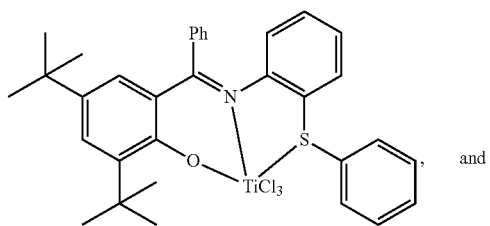
,and
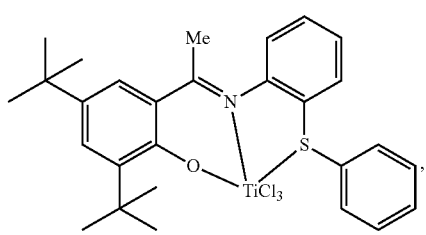
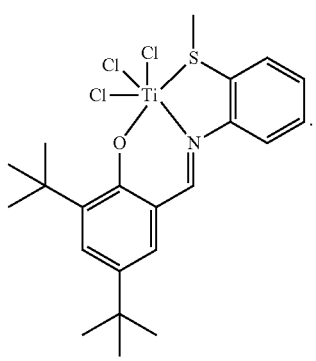
As the at least one nonmetallocene complex, the following compounds can be further exemplified.
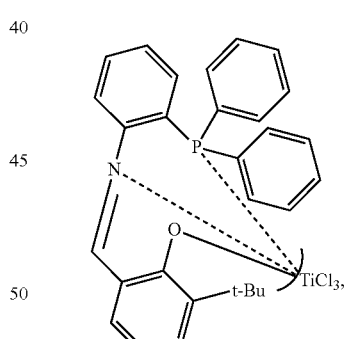
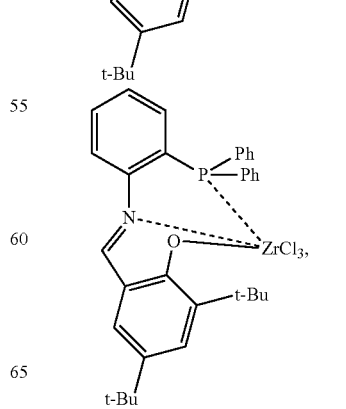

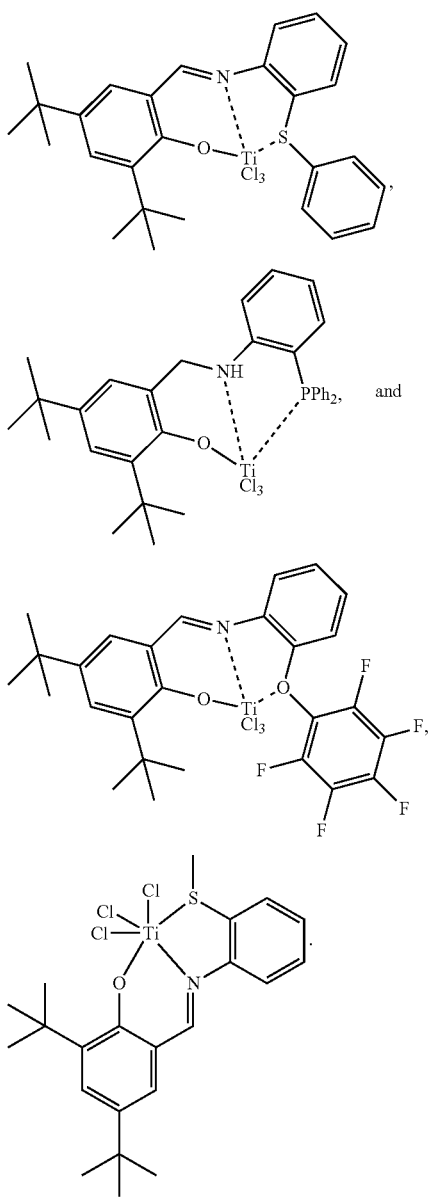

As the at least one nonmetallocene complex, the following compounds can be further exemplified.

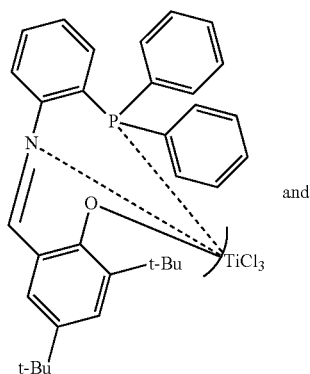

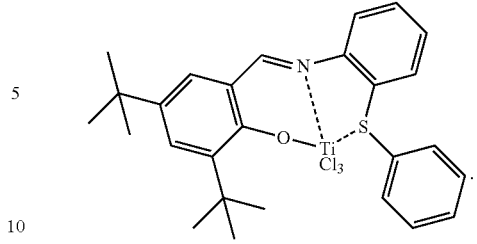

The at least one nonmetallocene complexes could be used with one kind or as a mixture of two or more kinds at any ratio therebetween.

According to this disclosure, the multi-dentate ligand in the at least one nonmetallocene complex does not correspond to or comprise the di-ether compound conventionally used in this field as an electron donor compound.

According to this disclosure, the multi-dentate ligand or the at least one nonmetallocene complex can be produced in line with any process known in this field. For the details of the process, one can refer to for example WO03/010207 or the Chinese Patent Nos. ZL01126323.7 and ZL02110844.7. All the references cited herein are incorporated by reference in their entireties.

According to this disclosure, for ease of metering and handling, the at least one nonmetallocene complex may used in the form of a solution, if needed.

To prepare said solution, there is no limitation as to the solvent to be used herein, as long as the solvent can dissolve the at least one nonmetallocene complex. For example, exemplified is a $C_{6-12}$ aromatic hydrocarbon, a halogenated $C_{6-12}$ aromatic hydrocarbon, a halogenated $C_{1-10}$ alkane, an ester and an ether. Further for example, exemplified is toluene, xylene, trimethyl benzene, ethyl benzene, diethyl benzene, chlorinated toluene, chlorinated ethyl benzene, brominated toluene, brominated ethyl benzene, dichloromethane, dichloroethane, ethyl acetate, and tetrahydrofuran, such as the $C_{6-12}$ aromatic hydrocarbon, dichloromethane, or tetrahydrofuran.

The solvent could be used with one kind or as a mixture of two or more kinds.

To facilitate dissolution of said at least one nonmetallocene complex in the solvent, heat could be applied during the dissolution, if necessary. Further, if needed, any stirring means could be used in the dissolution, whose rotational speed could be 10 to 500 r/min. According to this disclosure, for example, ratio of the at least one nonmetallocene complex to the solvent in the solution can be 0.02 to 0.30 g/ml, such as 0.05 to 0.15 g/ml, but not limiting thereto.

According to this disclosure, as the way to contact the modified Mg-containing carrier with the at least one nonmetallocene complex in the presence of the at least one second solvent, the following can be exemplified.

First of all, the modified Mg-containing carrier contacts the at least one nonmetallocene complex in the presence of the at least one second solvent (hereinafter referred to as "contacting reaction"), to obtain a second slurry.

In preparation of the second slurry, there is no limitation as to the sequence and way for contacting the modified Mg-containing carrier and the at least one nonmetallocene complex (and the second solvent), exemplified is that the modified Mg-containing carrier is mixed with the at least one nonmetallocene complex, and then added thereto the at least one second solvent, or that dissolves the at least one nonmetallocene complex into the at least one second solvent to prepare a nonmetallocene complex solution, and then the modified Mg-containing carrier is mixed with the solution, and so on.

As the process to prepare the second slurry, exemplified is that at a temperature ranging from room temperature to one below the boiling point of any solvent involved in this preparation, the contacting process (under stirring, if necessary) between the modified Mg-containing carrier and the at least one nonmetallocene complex in the presence of the at least one second solvent continues for a duration of 0.5 to 24 hours, such as 1 to 8 hours, further such as 2 to 6 hours.

The resultant second slurry is a slurry system. In some embodiments, the slurry is allowed to stand in a sealed state for a determined duration after preparation, so as to secure uniformity of the system, wherein the duration could be 2 to 48 hours, such as 4 to 24 hours, further such as 6 to 18 hours.

According to this disclosure, to prepare the second slurry or conduct the contacting process, there is no limitation as to the at least one second solvent (hereinafter referred to as "solvent for dissolving the at least one nonmetallocene complex"), as long as the solvent can dissolve the at least one nonmetallocene complex. For example, exemplified is a $C_{6-12}$ aromatic hydrocarbon, a halogenated $C_{6-12}$ aromatic hydrocarbon, a halogenated $C_{1-10}$ alkane and an ether. Further for example, exemplified is toluene, xylene, trimethyl benzene, ethyl benzene, diethyl benzene, chlorinated toluene, chlorinated ethyl benzene, brominated toluene, brominated ethyl benzene, dichloromethane, dichloroethane and tetrahydrofuran, preferably the $C_{6-12}$ aromatic hydrocarbon, dichloromethane, or tetrahydrofuran, such as dichloromethane.

The at least one second solvent could be used with one kind or as a mixture of two or more kinds.

To prepare the second slurry or the nonmetallocene complex solution, if needed, any stirring means could be used, whose rotational speed could be 10 to 500 r/min.

According to this disclosure, there is no limitation as to the amount of the at least one second solvent, as long as a sufficient contacting between the at least one nonmetallocene complex and the modified Mg-containing carrier can be achieved. For example, ratio of the at least one nonmetallocene complex to the at least one second solvent can be 0.01 to 0.25 g/ml, such as 0.05 to 0.16 g/ml, but not limiting thereto.

Then, by directly drying the second slurry, a freely flowable solid product can be obtained, which corresponds to the supported nonmetallocene catalyst of this disclosure.

According to this disclosure, any conventional process can be used to directly dry the slurry, for example, drying under an inert gas atmosphere, vacuum drying or vacuum drying under heat, can be used, preferably vacuum drying under heat. The drying is for example conducted at a temperature 5 to 15° C. lower than the boiling point of any solvent in the slurry (such as 30 to 160° C., further such as 60 to 130° C.), while the duration for the drying is for example, not limiting to, 2 to 24 hours.

According to a further embodiment of this disclosure, the present process for producing a supported nonmetallocene catalyst, if necessary, further comprises the step of pre-contacting the Mg-containing carrier with at least one assistant chemical treating agent selected from an aluminoxane and an alkylaluminum, before contacting the Mg-containing carrier with the at least one silicon compound and the at least one chemical treating agent, referred to as the pre-treating step hereinafter.

In the context of this disclosure, unless otherwise specified, the pre-treated Mg-containing carrier obtained from this pre-treating step is also simply referred to as "Mg-containing carrier".

The at least one assistant chemical treating agent is further described as follows.

According to this disclosure, as the at least one assistant chemical treating agent, exemplified is aluminoxane and alkylaluminum.

As the aluminoxane, exemplified is a linear aluminoxane $((R)(R)Al—(Al(R)—O)_n—O—Al(R)(R))$ having the following formula (I), and a cyclic aluminoxane $(—(Al(R)—O—)_{n+2}—)$ having the following formula (II).

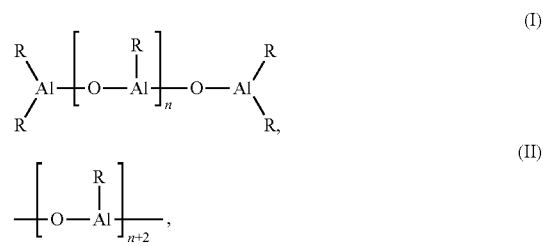

wherein the R are identical to or different from one another, such as identical to one another, and each independently is selected from a $C_1$-$C_8$ alkyl, such as methyl, ethyl, and iso-butyl, further such as methyl, n is an integer of 1 to 50, such as 10 to 30.

For example, the aluminoxane could be selected from methyl aluminoxane, ethyl aluminoxane, isobutyl aluminoxane and n-butyl aluminoxane, such as methyl aluminoxane (MAO) and isobutyl aluminoxane (IBAO).

The aluminoxane could be used with one kind or as a mixture of two or more kinds at any ratio therebetween.

As the alkylaluminum, exemplified is a compound having a general formula (III) as follows:

wherein the R is identical to or different from one another, such as identical to one another, and is each independently selected from a $C_1$-$C_8$ alkyl, such as methyl, ethyl and iso-butyl, such as methyl.

For example, the alkylaluminum could be selected from trimethyl aluminum $(Al(CH_3)_3)$, triethyl aluminum $(Al(CH_3CH_2)_3)$, tripropyl aluminum $(Al(C_3H_7)_3)$, triisobutyl aluminum $(Al(i-C_4H_3)_3)$, tri-n-butyl aluminum $(Al(C_4H_9)_3)$, triisoamyl aluminum $(Al(CH_5H_{11})_3)$, tri-n-amyl aluminum $(Al(C_5H_{11})_3)$, trihexyl aluminum $(Al(C_6H_{13})_3)$, tri-iso-hexyl aluminum $(Al(i-C_6H_{13})_3)$, diethyl methyl aluminum $(Al(CH_3)(CH_3CH_2)_2)$, and ethyl dimethyl aluminum $(Al(CH_3CH_2)(CH_3)_2)$, and the like, such as trimethyl aluminum, triethyl aluminum, triisobutyl aluminum and tripropyl aluminum, further such as triethyl aluminum and triisobutyl aluminum.

The alkylaluminum could be used with one kind or as a mixture of two or more kinds at any ratio therebetween.

According to this disclosure, as the at least one assistant chemical treating agent, it could be only the alkylaluminum or only the aluminoxane, or any mixture of the alkylaluminum and the aluminoxane. There is no limitation as to the ratio between any two or more components in the mixture, which could be determined as needed.

According to this disclosure, the at least one assistant chemical treating agent is for example used in the form of a solution. In preparation of the solution of the at least one assistant chemical treating agent, there is no limitation as to the solvent to be used herein, as long as the solvent can dissolve the at least one assistant chemical treating agent and does not change (for example, dissolves) the formed structure of the Mg-containing carrier.

For example, as the solvent to be used herein, exemplified is a $C_{5-12}$ alkane, a $C_{5-12}$ cyclic alkane, a halogenated $C_{5-12}$ alkane, and a halogenated $C_{5-12}$ cyclic alkane, for example pentane, hexane, heptane, octane, nonane, decane, undecane, dodecane, cyclohexane, cyclopentane, cycloheptane, cyclooctane, chloro pentane, chloro hexane, chloro heptane, chloro octane, chloro nonane, chloro decane, chloro undecane, chloro dodecane, and chloro cyclohexane, further for example, pentane, hexane, decane, and cyclohexane, even further for example hexane.

The solvent could be used with one kind or as a mixture of two or more kinds at any ratio therebetween.

Further, there is no limitation as to the concentration of the at least one assistant chemical treating agent in the solution, which could be determined as needed, as long as it is sufficient for the solution to deliver a predetermined amount of the at least one assistant chemical treating agent for the pre-treatment.

As a process for conducing the pre-treatment, exemplified is a process wherein, first of all, a solution of the at least one assistant chemical treating agent is prepared, then at a temperature ranging from −40° C. to 60° C. (such as −30° C. to 30° C.), the at least one assistant chemical treating agent solution (containing a predetermined amount of the at least one assistant chemical treating agent) is metering (such as dropwise) into the Mg-containing carrier to be pre-treated with said at least one assistant chemical treating agent, or the Mg-containing carrier is metering into the assistant chemical treating agent solution, so as to form a reaction mixture. Then, the reaction continues (facilitated by any stirring means, if necessary) for 1 to 8 hours, such as 2 to 6 hours, further such as 3 to 4 hours. Then, the pre-treated Mg-containing carrier is separated from the reaction mixture by filtrating, washing and drying. Then, the at least one chemical treating reaction is conducted by using the pre-treated Mg-containing carrier in the same way as aforesaid.

According to this disclosure, the filtrating, washing (for example for 1 to 8 times, further for example 2 to 6 times, even further for example 2 to 4 times) and drying can be conducted in a conventional manner, wherein the solvent for washing could be the same as that used for dissolving the at least one assistant chemical treating agent. The drying can be of any conventional process, for example, drying under an inert gas atmosphere, vacuum drying or vacuum drying under heat, can be used, such as drying under an inert gas atmosphere or vacuum drying under heat, further such as vacuum drying under heat. The drying is for example conducted at a temperature ranging from room temperature to 140° C. for a duration of, not limiting to, 2 to 20 hours.

According to this disclosure, as the amount of the at least one first solvent to be used, ratio of the at least one magnesium compound to the at least one first solvent, for example, is 1 mol:75~400 ml, such as 1 mol:150~300 ml, further such as 1 mol:200~250 ml (Please confirm that the ratio here is molar to volume).

According to this disclosure, as the amount of the alcohol to be used, ratio by molar of the magnesium compound (based on Mg) to the at least one alcohol is, for example, 1:0.02~4.00, such as 1:0.05~3.00, further such as 1:0.10~2.50.

According to this disclosure, as the amount of the at least one porous carrier to be used, ratio by weight of the at least one magnesium compound (on a solid basis) to the at least one porous carrier is, for example, 1:0.1-20, such as 1:0.5-10.

According to this disclosure, as the amount of the at least one precipitating agent to be used, ratio by volume of the at least one precipitating agent to the at least one first solvent is, for example, 1:0.2~5, such as 1:0.5~2, further such as 1:0.8~1.5.

According to this disclosure, as the amount of the at least one silicon compound to be used, ratio by molar of the Mg-containing carrier (based on Mg) to the at least one silicon compound (based on Si) is, for example, 1:0.01-1, such as 1:0.01-0.50, further such as 1:0.05-0.25.

According to this disclosure, as the amount of the at least one chemical treating agent to be used, ratio by molar of the Mg-containing carrier (based on Mg) to the at least one chemical treating agent (based on the Group IVB metal) is, for example, 1:0.01-1, such as 1:0.01-0.50, further such as 1:0.10-0.30.

According to this disclosure, as the amount of the at least one nonmetallocene complex to be used, ratio by molar of the Mg-containing carrier (based on Mg) to the at least one non-metallocene complex is, for example, 1:0.01-1, such as 1:0.04-0.4, further such as 1:0.08-0.2.

According to this disclosure, as the amount of the at least one assistant chemical treating agent to be used, ratio by molar of the Mg-containing carrier (based on Mg) to the at least one assistant chemical treating agent (based on Al) is, for example, 1:0-1.0, such as 1:0-0.5, further such as 1:0.1-0.5.

It is known that any of the aforementioned processes and steps is, for example, carried out under a substantial water-free and oxygen-free condition. By substantial water-free and oxygen-free condition, it means that water and oxygen in the system concerned is continuously controlled to be less than 100 ppm. Further, the support nonmetallocene catalyst according to this disclosure, after prepared, is usually stored under a sealed condition under a slightly positive pressure before use.

In one embodiment, this disclosure relates to a supported nonmetallocene catalyst produced in line with any of the aforesaid processes, also referred to as a supported nonmetallocene catalyst for olefin polymerization.

In a further embodiment, this disclosure relates to an olefin homopolymerization/copolymerization process, wherein the supported nonmetallocene catalyst of this disclosure is used as the catalyst for olefin polymerization, to homopolymerize or copolymerize olefin(s).

In the context of the olefin homopolymerization/copolymerization process of this disclosure, one can directly refer to references for any content or information that has not been expressively and specifically described hereinafter, for example, the reactor for polymerization, the amount of olefin(s), the way by which the catalyst or olefin is introduced, unnecessiating the need of detailing same further herein.

According to the present olefin homopolymerization/copolymerization process, the supported nonmetallocene catalyst of this disclosure is used as the main catalyst, at least one compound selected from an aluminoxane, an alkylaluminum, a halogenated alkyl aluminum, a fluoroborane, an alkylboron, and an alkylboron ammonium salt is used as the co-catalyst, to homopolymerize or copolymerize olefin.

As the way of adding the main catalyst and the co-catalyst to the polymerization system, exemplified is a way wherein the main catalyst is added prior to the co-catalyst, or vise versa, or the main catalyst and the co-catalyst contact with each other by mixing and then added altogether, or separately but simultaneously added. As the way of adding the main catalyst and the co-catalyst separately, exemplified is the case wherein the main catalyst and the co-catalyst are successively added to one feed line or multiple feed lines. When the main catalyst and the co-catalyst are to be added separately but simultaneously, multiple feed lines are required. For a continuous polymerization, exemplified is the way of simultaneously and continuously adding to multiple feed lines, while for a batch polymerization, exemplified is the way of mixing the main catalyst and the co-catalyst with each other and then adding to one feed line altogether, or adding to a feed line the co-catalyst and then adding the main catalyst to the same feed line.

There is no limitation as to how to conduct the olefin homopolymerization/copolymerization, any conventional process known in the art can be used, for example, a slurry process, a bulk process or a gas phase process, such as the slurry process or the gas phase process.

According to this disclosure, as the olefin to be used, exemplified is a $C_2$ to $C_{10}$ mono-olefin, a diolefin, a cyclic olefin, and other ethylenic unsaturated compounds.

For example, as the $C_2$ to $C_{10}$ mono-olefin, exemplified is ethylene, propylene, 1-butene, 1-hexene, 1-heptene, 4-methyl-1-pentene, 1-octene, 1-decene, 1-undecene, 1-dodecene, and styrene. As the cyclic olefin, exemplified is 1-cyclopentene and norbornene. As the diolefin, exemplified is 1,4-butadiene, 2,5-pentadiene, 1,6-hexadiene, norbornadiene, and 1,7-octadiene. As the other ethylenic unsaturated compound, exemplified is vinyl acetate and (meth)acrylate.

According to this disclosure, the homopolymerization of ethylene or the copolymerization of ethylene with at least one alpha-olefin (herein referred to as "commoner") selected from a $C_3$ to $C_{12}$ alpha-olefin is exemplified. As the $C_3$ to $C_{12}$ alpha-olefin, a $C_3$ to $C_8$ alpha-olefin is exemplified. As the alpha-olefin to be used herein, exemplified is propylene, 1-butene, 1-pentene, 1-hexene, 1-heptene, 1-octene, 4-methyl-1-pentene, 1-dodecene or 4-methyl-1-hexene, such as propylene, 1-butene, 1-hexene, 1-octene, or 4-methyl-1-pentene, further such as propylene, 1-hexene, 1-octene, or 4-methyl-1-pentene. The at least one alpha-olefin could be used with one kind or as a mixture of two or more kinds.

According to this disclosure, if presents, the comonomer could be used at an amount of 0.5 to 10 g per 1 mg of the main catalyst, such as 1 to 5 g per 1 mg of the main catalyst.

According to this disclosure, the co-catalyst is selected from an aluminoxane, an alkylaluminum, a halogenated alkyl aluminum, a fluoroborane, an alkylboron, and an alkylboron ammonium salt, such as the aluminoxane and the alkylaluminum.

As the aluminoxane, exemplified is a linear aluminoxane $((R)(R)Al\text{—}(Al(R)\text{—}O)_n\text{—}O\text{—}Al(R)(R))$ having the following formula (I-1), and a cyclic aluminoxane $(\text{—}(Al(R)\text{—}O\text{—})_{n+2}\text{—})$ having the following formula (II-1).

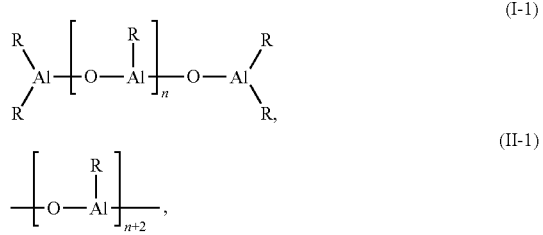

wherein the R is identical to or different from one another, such as identical to one another, and each independently is selected from a $C_1$-$C_8$ alkyl, preferably methyl, ethyl, and iso-butyl, such as methyl, n is an integer of 1 to 50, such as 10 to 30.

For example, the aluminoxane could be selected from methyl aluminoxane, ethyl aluminoxane, isobutyl aluminoxane, and n-butyl aluminoxane, such as methyl aluminoxane (MAO) and isobutyl aluminoxane (IBAO), further such as methyl aluminoxane (MAO).

The aluminoxane could be used with one kind or as a mixture of two or more kinds at any ratio therebetween.

The alkylaluminum is selected, for example, from compounds of general formula (III-1) as follows:

$$Al(R)_3 \qquad (III\text{-}1)$$

wherein the R are identical to or different from one another, such as identical to one another, and is each independently selected from $C_1$-$C_8$ alkyl. In some embodiments, R is selected from methyl, ethyl and iso-butyl. In some embodiments, R is methyl.

For example, the alkylaluminum can be selected from trimethyl aluminum ($Al(CH_3)_3$), triethyl aluminum ($Al(CH_3CH_2)_3$), tripropyl aluminum ($Al(C_3H_7)_3$), triisobutyl aluminum ($Al(i\text{-}C_4H_9)_3$), tri-n-butyl aluminum ($Al(C_4H_9)_3$), triisoamyl aluminum ($Al(i\text{-}C_5H_{11})_3$), tri-n-amyl aluminum ($Al(C_5H_3)$, tri-hexyl aluminum ($Al(C_6H_{13})_3$), tri-iso-hexyl aluminum ($Al(i\text{-}C_6H_{13})_3$), diethyl methyl aluminum ($Al(CH_3)(CH_3CH_2)_2$) and ethyl dimethyl aluminum ($Al(CH_3CH_2)(CH_3)_2$). In some embodiments, the alkylaluminum is selected from, trimethyl aluminum, triethyl aluminum, triisobutyl aluminum and tripropyl aluminum. In some embodiments, the alkylaluminum is selected from triethyl aluminum and triisobutyl aluminum. In some embodiments, the alkylaluminum is triethyl aluminum.

The alkylaluminum can be used with one kind or as a mixture of two or more kinds at any ratio therebetween.

The halogenated alkyl aluminum is selected, for example, from compounds of the general formula as follows:

$$Al(R)_nX_{3-n}$$

wherein the R is identical to or different from one another, such as identical to one another, and each independently selected from $C_1$-$C_8$ alkyl, such as methyl, ethyl, and iso-butyl, further such as methyl, X is halogen, such as Cl, n is 1 or 2.

For example, the halogenated alkyl aluminum can be selected from monochloro dimethyl aluminum ($Al(CH_3)_2Cl$), dichloro methyl aluminum ($Al(CH_3)Cl_2$)), monochloro diethyl aluminum ($Al(CH_3CH_2)_2Cl$), dichloro ethyl aluminum ($Al(CH_3CH_2)Cl_2$), monochloro dipropyl aluminum ($Al(C_3H_7)_2Cl$), dichloro propyl aluminum ($Al(C_3H_7)Cl_2$)), monochloro din-butyl aluminum ($Al(C_4H_8)_2Cl$), dichloro n-butyl aluminum ($Al(C_4H_8)Cl_2$), monochloro diisobutyl aluminum ($Al(i\text{-}C_4H_8)_2Cl$), dichloro isobutyl aluminum ($Al(i\text{-}C_4H_8)Cl_2$), monochloro din-pentylaluminum ($Al(C_5H_{11})_2Cl$), dichloro n-pentylaluminum ($Al(C_5H_{11})Cl_2$), monochloro diiso-pentylaluminum ($Al(i\text{-}C_5H_{11})_2Cl$), dichloro iso-pentylaluminum ($Al(i\text{-}C_5H_{11})Cl_2$), monochloro din-hexyl aluminum ($Al(C_6H_{13})_2Cl$), dichloro n-hexyl aluminum ($Al(i\text{-}C_6H_{13})Cl_2$), monochloro diiso-hexyl aluminum ($Al(i\text{-}C_6H_{13})_2Cl$), dichloro iso-hexyl aluminum ($Al(i\text{-}C_6H_{13})Cl_2$), monochloro methylethyl aluminum ($Al(CH_3)(CH_2CH_3)Cl$), monochloro methylpropyl aluminum ($Al(CH_3)(C_3H_7)Cl$), monochloro methyln-butyl aluminum ($Al(CH_3)(C_4H_9)Cl$), monochloro methylisobutyl aluminum ($Al(CH_3)(i\text{-}C_4H_9)Cl$), monochloro ethylpropyl aluminum ($Al(CH_2CH_3)(C_3H_7)Cl$), monochloro ethyln-butyl aluminum ($AlCH_2CH_3)(C_4H_9)Cl$), and monochloro methylisobutyl aluminum ($AlCH_2CH_3)(i\text{-}C_4H_9)Cl$). In some embodiments, the halogenated alkyl aluminum is selected from monochloro diethyl aluminum, dichloro ethyl aluminum, monochloro din-butyl aluminum, dichloro n-butyl aluminum, monochloro diisobutyl aluminum, dichloro isobutyl aluminum, monochloro din-hexyl aluminum, and dichloro n-hexyl aluminum. In some embodiments, the halogenated alkyl aluminum is selected from chloro diethyl aluminum, dichloro ethyl aluminum and monochloro din-hexyl aluminum. In some embodiment, the halogenated alkyl aluminum is monochloro diethyl aluminum.

The halogenated alkyl aluminum can be used with one kind or as a mixture of two or more kinds at any ratio therebetween.

As to the fluoroborane, the alkylboron, and the alkylboron ammonium salt, exemplified is one conventionally used in this field, but without any limitation thereto.

Further, according to this disclosure, the co-catalyst can be used with one kind or as a mixture of two or more kinds of the aforesaid co-catalysts at any ratio therebetween as needed, but without any limitation thereto.

According to this disclosure, depending on how the olefin homopolymerization/copolymerization is conducted (e.g. via a slurry polymerization), a solvent for polymerization may be involved.

As to the solvent for polymerization, one conventionally used in this field for olefin homopolymerization/copolymerization can be used, but without any limitation thereto.

The solvent for polymerization can be selected, for example, from a $C_{4-10}$ alkane (for example, butane, pentane, hexane, heptane, octane, nonane, or decane), a halogenated $C_{1-10}$ alkane (for example, dichloro methane), a $C_{6-12}$ cyclic alkane (for example, cyclohexane, cycloheptane, cyclooctane, cyclononane, or cyclodecane), and a $C_{6-20}$ aromatic hydrocarbon (for example toluene or xylene). In some embodiments, the solvent for polymerization is selected from hexane, pentane, heptane, and cyclohexane. In some embodiments, the solvent for polymerization is hexane.

The solvent for polymerization can be used with one kind or as a mixture of two or more kinds at any ratio therebetween.

According to this disclosure, the total polymerization pressure under which the olefin homopolymerization/copolymerization is conducted is for example between 0.1 to 10 MPa, such as from 0.1 to 4 MPa, further such as from 0.4 to 3 MPa, but without any limitation thereto. According to this disclosure, the polymerization temperature at which the olefin homopolymerization/copolymerization is conducted is for example from −40° C. to 200° C., such as from 10° C. to 100° C., further such as from 40° C. to 95° C., but without any limitation thereto.

Further, according to this disclosure, the olefin homopolymerization/copolymerization can be conduct in the presence of or in the absence of hydrogen gas. If presents, the partial pressure of hydrogen gas may for example account for 0.01 to 99% (such as from 0.01 to 50%) of the polymerization pressure, but without any limitation thereto.

According to the olefin homopolymerization/copolymerization process of this disclosure, the ratio by molar of the co-catalyst (based on Al or B) to the supported nonmetallocene catalyst (based on the central metal atom M) ranges, for example, from 1 to 1000:1, such as from 10 to 500:1, further such as from 15 to 300:1, but without any limitation thereto.

EXAMPLE

The present disclosure is further illustrated by using the following examples, without limiting the scope thereof.

The bulk density of the polymer was measured according to the Chinese Standard GB 1636-79 (unit: g/cm$^3$).

The content of the Group IVB metal (for example Ti) and the content of the Mg element in the supported nonmetallocene catalyst were determined by the ICP-AES method, while the content of the nonmetallocene ligand was determined by the element analysis method.

The polymerization activity of the catalyst was calculated as follows.

Upon completion of the polymerization, the polymer product in the reactor was filtered and dried, and then weighed for its weight (by mass). Then, the polymerization activity of the catalyst was expressed by a value obtained by dividing the weight of the polymer product by the weight (by mass) of the supported nonmetallocene catalyst u!sed (unit: kg polymer per 1 g Cat).

The molecular weights Mw, Mn, and the molecular weight distribution (Mw/Mn) of the polymer were determined at a temperature of 150° C. by using the GPC V2000 type gel permeation chromatographer (from WATERS Co., USA), with 1,2,4-trichlorobenzene as the solvent.

The viscosity averaged molecular weight of the polymer was calculated as follows.

The intrinsic viscosity of the polymer was determined according to the standard ASTM D4020-00 by using a high temperature dilution type Ubbelohde viscometer (with a capillary inner diameter of 0.44 mm, a thermostatic bath media of 300# silicon oil, the solvent for dilution of decalin and a temperature of 135° C.), and then the viscosity averaged molecular weight Mv of the polymer was calculated in line with the following formula.

$$Mv=5.37\times10^4\times[\eta]^{1.37}$$

wherein, η is the intrinsic viscosity.

Examples from the First Embodiment

Example 1

The magnesium compound was anhydrous magnesium chloride, the first solvent was tetrahydrofuran, the alcohol was ethanol, the porous carrier was silica gel (ES757 from the Ineos company), which had been thermally activated by a continuous calcination at 600° C. under a N2 atmosphere for 4 hours before use. The silicon compound was tetraethoxy silicon, the chemical treating agent was titanium tetrachloride (TiCl$_4$), the second solvent was dichloromethane, the nonmetallocene complex had the formula of

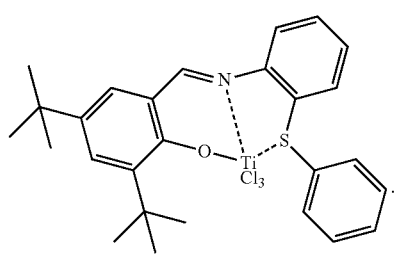

5 g of the magnesium compound was weighted and added to the first solvent, then the alcohol was further added thereto, after completely dissolved at the room temperature to obtain the magnesium compound solution, then, the porous carrier was added thereto, after stirred for 2 hours, the first slurry was obtained, which was then evenly heated to 90° C., directly vacuum dried to obtain the Mg-containing carrier.

The thus obtained Mg-containing carrier was added to hexane, then, at the room temperature, the silicon compound was dropwise added thereto over a period of 10 min and then the chemical treating agent was dropwise added thereto over a period of 30 min, then evenly heated to 60° C. to react at this temperature for 2 hours, then filtered, washed with hexane for 3 times with the same amount of hexane for each time, and eventually vacuum dried at 60° C., to obtain the modified Mg-containing carrier.

At the room temperature, the nonmetallocene complex was added to the second solvent, then the modified Mg-containing carrier was added thereto, after stirred for 4 hours and further stood under a sealed condition for 12 hours, directly vacuum dried at the room temperature, to obtain the supported nonmetallocene catalyst.

In this example, the ratio by weight of the magnesium compound to the porous carrier is 1:2, the ratio by molar of the magnesium compound (based on Mg) to the alcohol is 1:2, the ratio of the magnesium compound to the first solvent is 1 mol:210 ml, the ratio by molar of the Mg-containing carrier (based on Mg) to the chemical treating agent (based on the Group IVB metal) is 1:0.20, the ratio by molar of the Mg-containing carrier (based on Mg) to the nonmetallocene complex is 1:0.08, the ratio by molar of the Mg-containing carrier (based on Mg) to the silicon compound (based on Si) is 1:0.1, the ratio of the nonmetallocene complex to the second solvent is 0.1 g/ml.

The thus obtained supported nonmetallocene catalyst was named as CAT-1.

Example 2

Substantially the same as Example 1, except for the following changes:

Before contacting with the silicon compound and the chemical treating agent, the Mg-containing carrier was pre-treated by the assistant chemical treating agent (triethyl aluminum) to obtain the pre-treated Mg-containing carrier.

Specifically, the Mg-containing carrier was added to hexane, the assistant chemical treating agent triethyl aluminum (at a concentration of 0.88 mol/L, in a hexane solution) was slowly dropwise added thereto, after stirred at 60° C. for 2 hours, filtered, washed with hexane for 3 times with the same amount of hexane for each time, and eventually vacuum dried at 60° C., to obtain the pre-treated Mg-containing carrier.

The ratio by molar of the Mg-containing carrier (based on Mg) to the assistant chemical treating agent (based on Al) is 1:0.2.

The thus obtained supported nonmetallocene catalyst was named as CAT-2.

Example 3

Substantially the same as Example 1, except for the following changes:

Before contacting with the silicon compound and the chemical treating agent, the Mg-containing carrier was pre-treated by the assistant chemical treating agent (methyl aluminoxane) to obtain the pre-treated Mg-containing carrier.

Specifically, the Mg-containing carrier was added to toluene, the assistant chemical treating agent (methyl aluminoxane) (at a concentration of 10 wt %, in a toluene solution) was slowly dropwise added thereto, after stirred at 60° C. for 2 hours, filtered, washed with toluene for 3 times with the same amount of toluene for each time, and eventually vacuum dried at 100° C., to obtain the pre-treated Mg-containing carrier.

The ratio by molar of the Mg-containing carrier (based on Mg) to the assistant chemical treating agent (based on Al) is 1:0.4.

The thus obtained supported nonmetallocene catalyst was named as CAT-3.

Example 4

Substantially the same as Example 1, except for the following changes:

The magnesium compound was changed to iso-butoxy magnesium chloride (Mg(i-OC$_4$H$_9$)Cl), the alcohol was changed to n-butanol, the first solvent was changed to toluene, the porous carrier was changed to TiO$_2$, which has been thermally activated by a continuous calcination at 400° C. under a N$_2$ atmosphere for 4 hours before use. The silicon compound was changed to tetra iso-butoxy silicon, the chemical treating agent was changed to zirconium tetrachloride (ZrCl$_4$), the nonmetallocene complex was

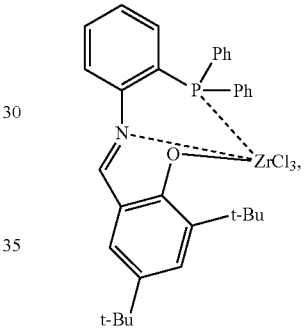

the second solvent was changed to toluene, the first slurry was prepared by introduction of the precipitating agent (hexane), after completely precipitated, filtered, washed with the precipitating agent for 3 times, and then vacuum dried at 60° C.

In this example, the ratio by weight of the magnesium compound to the porous carrier is 1:1, the ratio by molar of the magnesium compound (based on Mg) to the alcohol is 1:1, the ratio of the magnesium compound to the first solvent is 1 mol:150 ml, the ratio by molar of the Mg-containing carrier (based on Mg) to the chemical treating agent (based on the Group IVB metal) is 1:0.30, the ratio by molar of the Mg-containing carrier (based on Mg) to the nonmetallocene complex is 1:0.10, the ratio by molar of the Mg-containing carrier (based on Mg) to the silicon compound (based on Si) is 1:0.05, the ratio by volume of the precipitating agent to the first solvent is 1:1, the ratio of the nonmetallocene complex to the second solvent is 0.06 g/ml.

The thus obtained supported nonmetallocene catalyst was named as CAT-4.

Example 5

Substantially the same as Example 1, except for the following changes:

The magnesium compound was changed to anhydrous magnesium bromide (MgBr$_2$), the alcohol was changed to 2-ethyl hexanol, the first solvent and the second solvent were changed to hexane, the porous carrier was alumina, which has been thermally activated by a continuous calcination at 700° C. under a N2 atmosphere for 6 hours before use, the silicon compound was changed to triethoxy chloro silicon, the chemical treating agent was changed to titanium tetrabromide (TiBr$_4$), the nonmetallocene complex was

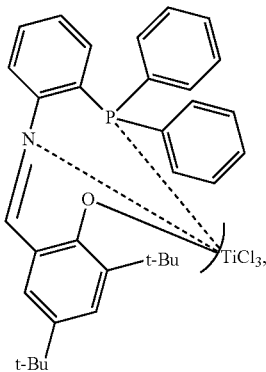

the first slurry was obtained as directly vacuum dried at 105° C.

In this example, the ratio by weight of the magnesium compound to the porous carrier is 1:5, the ratio by molar of the magnesium compound (based on Mg) to the alcohol is 1:0.7, the ratio of the magnesium compound to the first solvent is 1 mol:280 ml, the ratio by molar of the Mg-containing carrier (based on Mg) to the chemical treating agent (based on the Group IVB metal) is 1:0.10, the ratio by molar of the Mg-containing carrier (based on Mg) to the nonmetallocene complex is 1:0.05, the ratio by molar of the Mg-containing carrier (based on Mg) to the silicon compound (based on Si) is 1:0.25, the ratio of the nonmetallocene complex to the second solvent is 0.05 g/ml.

The thus obtained supported nonmetallocene catalyst was named as CAT-5.

Example 6

Substantially the same as Example 1, except for the following changes:

The magnesium compound was changed to ethoxy magnesium (Mg(OC$_2$H$_5$)$_2$), the first solvent was changed to xylene, the porous carrier was silica-magnesia composite oxide (at a weight ratio of 1:1), which has been thermally activated by a continuous calcination at 600° C. under an Ar atmosphere for 4 hours before use, the nonmetallocene complex was

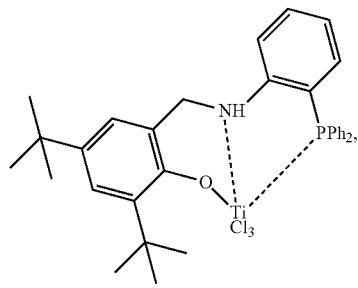

the alcohol was changed to trichloro methanol, the silicon compound was changed to silicon tetrachloride, the chemical treating agent was changed to tetraethyl titanium (Ti(CH$_3$CH$_2$)$_4$), the first slurry was prepared by introduction of the precipitating agent (hexane), after completely precipitated, filtered, washed with the precipitating agent for 3 times, and then vacuum dried at 80° C.

In this example, the ratio by weight of the magnesium compound to the porous carrier is 1:10, the ratio by molar of the magnesium compound (based on Mg) to the alcohol is 1:0.7, the ratio of the magnesium compound to the first solvent is 1 mol:200 ml, the ratio by molar of the Mg-containing carrier (based on Mg) to the chemical treating agent (based on the Group IVB metal) is 1:0.15, the ratio by molar of the Mg-containing carrier (based on Mg) to the nonmetallocene complex is 1:0.04, the ratio by molar of the Mg-containing carrier (based on Mg) to the silicon compound (based on Si) is 1:0.14, the ratio by volume of the precipitating agent to the first solvent is 1:1.5, the ratio of the nonmetallocene complex to the second solvent is 0.16 g/ml.

The thus obtained supported nonmetallocene catalyst was named as CAT-6.

Example 7

Substantially the same as Example 1, except for the following changes:

The magnesium compound was changed to ethyl magnesium (Mg(C$_2$H$_5$)$_2$), the first solvent was changed to diethyl benzene, the alcohol was changed to phenyl ethanol, the porous carrier was montmorillonite, which has been thermally activated by a continuous calcination at 400° C. under a N2 atmosphere for 8 hours before use. The silicon compound was changed to tetramethoxy silicon, the chemical treating agent was changed to tetra n-butyl titanium (Ti(C$_4$H$_9$)$_4$), the nonmetallocene complex was

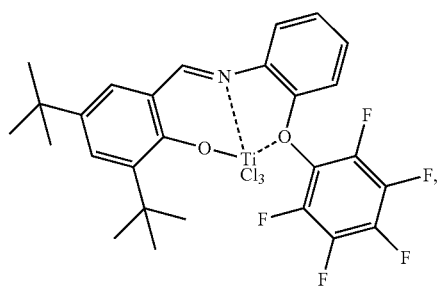

the first slurry was obtained as directly vacuum dried at 130° C.

In this example, the ratio by weight of the magnesium compound to the porous carrier is 1:3, the ratio by molar of the magnesium compound (based on Mg) to the alcohol is 1:1.5, the ratio by molar of the Mg-containing carrier (based on Mg) to the chemical treating agent (based on the Group IVB metal) is 1:0.50, the ratio of the magnesium compound to the first solvent is 1 mol:400 ml, the ratio by molar of the Mg-containing carrier (based on Mg) to the nonmetallocene complex is 1:0.01, the ratio by molar of the Mg-containing carrier (based on Mg) to the silicon compound (based on Si) is 1:0.45.

The thus obtained supported nonmetallocene catalyst was named as CAT-7.

Example 8

Substantially the same as Example 1, except for the following changes:

The magnesium compound was changed to ethyl magnesium chloride (Mg($C_2H_5$)Cl), the alcohol was changed to cyclohexanol, the first solvent was changed to cyclohexane, the porous carrier was a partially crosslinked (with a crosslinking degree of 30%) polystyrene, which has been continuously dried at 85° C. under a N2 atmosphere for 12 h. The nonmetallocene complex was

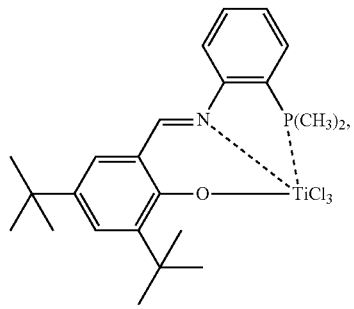

the silicon compound was changed to a mixture consisting of tetraethoxy silicon and tetrachloro silicon with a ratio by molar of 1:1, the chemical treating agent was changed to triiso-butoxy chloro titanium (TiCl(i-$OC_4H_9$)$_3$).

In this example, the ratio by weight of the magnesium compound to the porous carrier is 1:0.5, the ratio by molar of the magnesium compound (based on Mg) to the alcohol is 1:2.5, the ratio of the magnesium compound to the first solvent is 1 mol:210 ml, the ratio by molar of the Mg-containing carrier (based on Mg) to the chemical treating agent (based on the Group IVB metal) is 1:0.20, the ratio by molar of the Mg-containing carrier (based on Mg) to the nonmetallocene complex is 1:0.20. the ratio by molar of the Mg-containing carrier (based on Mg) to the silicon compound (based on Si) is 1:0.02.

The thus obtained supported nonmetallocene catalyst was named as CAT-8.

Comparative Example A

Substantially the same as Example 1, except for the following changes:

During preparation of the catalyst, the Mg-containing carrier was not treated by the silicon compound, but merely treated by the chemical treating agent.

The thus obtained catalyst was named as CAT-A.

Comparative Example B

Substantially the same as Example 1, except for the following changes:

The ratio by molar of the Mg-containing carrier (based on Mg) to the silicon compound (based on Si) is 1:0.05.

The thus obtained catalyst was named as CAT-B.

Comparative Example C

Substantially the same as Example 1, except for the following changes:

The ratio by molar of the Mg-containing carrier (based on Mg) to the silicon compound (based on Si) is 1:0.20.

The thus obtained catalyst was named as CAT-C.

Comparative Example D

Substantially the same as Example 1, except for the following changes:

No nonmetallocene complex was supported.
The thus obtained catalyst was named as CAT-D.

Application Example

The catalysts CAT-1 to CAT-8, CAT-A to CAT-D obtained were used for ethylene homopolymerization and copolymerization under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. After heated to 60° C., ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 2.

TABLE 1

The results of the olefin polymerization obtained with the supported nonmetallocene catalysts

| Experiment No. | Catalyst No. | Content of the active metal in Catalyst (wt %) | Co-catalyst | Ratio by molar of co-catalyst to active metal in Catalyst | Type | Polymerization activity (kgPE/gCat) | Bulk density (g/cm$^3$) | Molecular weight distribution |
|---|---|---|---|---|---|---|---|---|
| 1 | CAT-1 | 2.75 | triethyl aluminum | 70 | homopolymerization | 9.52 | 0.39 | 2.47 |
| 2 | CAT-1 | 2.75 | triethyl aluminum | 70 | copolymerization | 15.67 | 0.38 | 2.70 |
| 3 | CAT-1 | 2.75 | triethyl aluminum | 200 | copolymerization | 16.84 | 0.39 | 2.84 |
| 4 | CAT-1 | 2.75 | methyl aluminoxane | 70 | homopolymerization | 10.65 | 0.40 | 2.23 |
| 5 | CAT-2 | 2.66 | triethyl aluminum | 70 | homopolymerization | 12.48 | 0.40 | 2.59 |
| 6 | CAT-2 | 2.66 | triethyl aluminum | 70 | copolymerization | 18.23 | 0.40 | 2.72 |
| 7 | CAT-2 | 2.66 | triethyl aluminum | 200 | homopolymerization | 13.24 | 0.39 | 2.75 |
| 8 | CAT-3 | 3.01 | triethyl aluminum | 70 | homopolymerization | 11.22 | 0.40 | 2.83 |
| 9 | CAT-3 | 3.01 | triethyl aluminum | 70 | copolymerization | 17.47 | 0.40 | 2.75 |
| 10 | CAT-3 | 3.01 | triethyl aluminum | 200 | homopolymerization | 11.18 | 0.40 | 2.81 |
| 11 | CAT-4 | 2.98 | triethyl aluminum | 70 | homopolymerization | 14.22 | 0.37 | 2.80 |
| 12 | CAT-5 | 2.24 | triethyl aluminum | 70 | homopolymerization | 5.97 | 0.39 | 2.65 |
| 13 | CAT-6 | 2.05 | triethyl aluminum | 70 | homopolymerization | 4.45 | 0.40 | 2.83 |
| 14 | CAT-7 | — | triethyl aluminum | 70 | homopolymerization | 10.03 | 0.34 | 2.91 |
| 15 | CAT-8 | — | triethyl aluminum | 70 | homopolymerization | 10.54 | 0.37 | 2.15 |
| 16 | CAT-A | 4.05 | triethyl aluminum | 70 | homopolymerization | 6.54 | 0.35 | 3.84 |
| 17 | CAT-B | 3.26 | triethyl aluminum | 70 | homopolymerization | 8.27 | 0.37 | 3.17 |
| 18 | CAT-C | 2.32 | triethyl aluminum | 70 | homopolymerization | 10.62 | 0.39 | 2.26 |
| 19 | CAT-D | 2.24 | triethyl aluminum | 70 | homopolymerization | 6.73 | 0.33 | 5.19 |

TABLE 2

The results of the ultra high molecular weight polyethylene preparation obtained with the supported nonmetallocene catalysts

| Experiment No. | Catalyst No. | Content of the active metal in Catalyst (wt %) | Co-catalyst | Ratio by molar of co-catalyst to active metal in Catalyst | Polymerization activity (kgPE/gCat) | Bulk density (g/cm$^3$) | Mv ($10^4$ g/mol) |
|---|---|---|---|---|---|---|---|
| 1 | CAT-1 | 2.75 | triethyl aluminum | 70 | 12.64 | 0.42 | 450 |
| 2 | CAT-1 | 2.75 | methyl aluminoxane | 70 | 14.15 | 0.43 | 505 |
| 3 | CAT-2 | 2.66 | triethyl aluminum | 70 | 16.55 | 0.43 | 470 |
| 4 | CAT-2 | 2.66 | triethyl aluminum | 200 | 17.56 | 0.42 | 455 |
| 5 | CAT-3 | 3.01 | triethyl aluminum | 70 | 14.80 | 0.43 | 430 |
| 6 | CAT-A | 4.05 | triethyl aluminum | 70 | 8.66 | 0.38 | 360 |
| 7 | CAT-B | 3.26 | triethyl aluminum | 70 | 10.92 | 0.40 | 405 |
| 8 | CAT-C | 2.32 | triethyl aluminum | 70 | 14.00 | 0.42 | 520 |

TABLE 2-continued

The results of the ultra high molecular weight polyethylene preparation
obtained with the supported nonmetallocene catalysts

| Experiment No. | Catalyst No. | Content of the active metal in Catalyst (wt %) | Co-catalyst | Ratio by molar of co-catalyst to active metal in Catalyst | Polymerization activity (kgPE/gCat) | Bulk density (g/cm³) | Mv (10⁴ g/mol) |
|---|---|---|---|---|---|---|---|
| 9 | CAT-D | 2.24 | triethyl aluminum | 70 | 8.92 | 0.36 | 275 |

As can be seen from the Table 1, the polymer obtained from the polymerization by using the supported nonmetallocene catalyst produced in line with the process of this disclosure exhibits a narrow molecular weight distribution. It is well known in this field that polyethylene produced from the polymerization by using a Ziegler-Natta catalyst usually exhibits a molecular weight distribution of greater than 5.

As can be seen from the experiment Nos. 2 and 3, Nos. 5 and 7, Nos. 8 and 10 in the Table 1, and the experiment Nos. 3 and 4 in the Table 2, increasing the amount of the co-catalyst to be used (i.e. increasing the ratio by molar of the co-catalyst to the active metal in the catalyst) will not significantly change the polymerization activity and the bulk density of the polymer. This fact indicates that a high activity for olefin polymerization can be obtained with a relatively less amount of the co-catalyst when the supported nonmetallocene catalyst produced in line with the process of this disclosure is used, and the resulting polymer product (for example polyethylene) exhibits superior polymer morphology and a high polymer bulk density.

Upon comparison of the experiment Nos. 1 with 2, Nos. 5 with 6, Nos. 8 with 9 in the Table 1, it is clear that in case of copolymerization, the polymerization activity increases significantly. This fact indicates that the supported nonmetallocene catalyst produced in line with the process of this disclosure exhibits a relatively significant co-monomer effect.

Upon comparison of the experiment Nos. 1 with 16 in the Table 1 or the experiment Nos. 1 with 6 in the Table 2, it is clear that if no silicon compound is co-used during preparation of the supported nonmetallocene catalyst, the content of the active metal in the catalyst increases, while both the polymerization activity of the catalyst and the bulk density of the resultant polymer decrease, the molecular weight distribution of the polymer gets broad and the viscosity averaged molecular weight Mv of the resultant ultra high molecular weight polyethylene significantly decreases.

Upon comparison of the experiment Nos. 1 with 17 and 18 in the Table 1 or the experiment Nos. 1 with 7 and 8 in the Table 2, it is clear that as the amount of the silicon compound to be used increases during preparation of the supported nonmetallocene catalyst, the content of the active metal in the catalyst is effectively decreased, while both the polymerization activity of the catalyst and the bulk density of the resultant polymer increase, the molecular weight distribution of the polymer gets narrowed and the viscosity averaged molecular weight Mv of the resultant ultra high molecular weight polyethylene increases. This fact indicates that the silicon compound, if introduced by this invention, shows the effects of effectively decreasing the content of the (inactive) active metal in the catalyst, increasing the polymerization activity of the catalyst and the bulk density of the resultant polymer, narrowing the molecular weight distribution of the polymer and increasing the viscosity averaged molecular weight Mv of the resultant ultra high molecular weight polyethylene.

Upon comparison of the experiment Nos. 1 with 19 in the Table 1 or the experiment Nos. 1 with 9 in the Table 2, it is clear that if no nonmetallocene complex is used during preparation of the catalyst, which corresponds to a multiple site catalyst of Ziegler-Natta type, the polymerization activity of the catalyst and the bulk density of the resultant polymer are relatively low, the molecular weight distribution of the polymer is relatively broad, and the viscosity averaged molecular weight Mv of the resultant ultra high molecular weight polyethylene is relatively low.

Examples from the Second Embodiment

Example 1

The magnesium compound was anhydrous magnesium chloride, the first solvent was tetrahydrofuran, the alcohol was n-butanol, the silicon compound was tetraethoxy silicon, the chemical treating agent was titanium tetrachloride, the precipitating agent was hexane, the nonmetallocene complex has the structure of

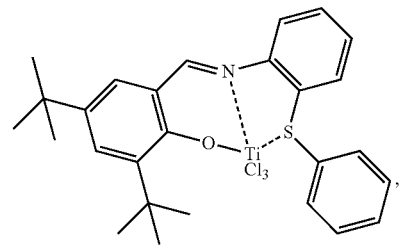

the second solvent was dichloromethane.

5 g of the magnesium compound was weighed, the first solvent and the alcohol were added thereto, after completely dissolved at the room temperature, the magnesium compound solution was obtained. Then, the precipitating agent was added to the magnesium compound solution, after completely precipitated, filtered, washed with the precipitating agent for 3 times (60 ml for each time), evenly heated to 60° C. and vacuum dried to obtain the Mg-containing carrier.

The thus obtained Mg-containing carrier was added to hexane, then, at the room temperature, the silicon compound was dropwise added thereto over a period of 10 min and then the chemical treating agent was dropwise added thereto over a period of 30 min, then evenly heated to 60° C. to react at this temperature for 2 hours, then filtered, washed with hexane for 3 times with the same amount of hexane for each time, and eventually vacuum dried at 60° C., to obtain the modified Mg-containing carrier.

At the room temperature, the nonmetallocene complex was added to the second solvent to form a solution, then the modified Mg-containing carrier was added thereto, after stirred for 6 hours, vacuum dried at the room temperature, to obtain the supported nonmetallocene catalyst.

In this example, the ratio of the magnesium compound to the first solvent is 1 mol:210 ml, the ratio by molar of the magnesium compound to the alcohol is 1:0.5, the ratio by molar of the Mg-containing carrier (based on Mg) to the nonmetallocene complex is 1:0.08, the ratio by volume of the precipitating agent to the first solvent is 1:1, the ratio by molar of the Mg-containing carrier (based on Mg) to the silicon compound (based on Si) is 1:0.1, the ratio by molar of the Mg-containing carrier (based on Mg) to the chemical treating agent (based on the Group IVB metal) is 1:0.15, the ratio of the nonmetallocene complex to the second solvent is 0.1 g/ml.

The thus obtained supported nonmetallocene catalyst was named as CAT-1.

Example 2

Substantially the same as Example 1, except for the following changes:

Before contacting with the silicon compound and the chemical treating agent, the Mg-containing carrier was pre-treated by the assistant chemical treating agent (triethyl aluminum) to obtain the pre-treated Mg-containing carrier.

Specifically, the Mg-containing carrier was added to hexane, the assistant chemical treating agent triethyl aluminum (at a concentration of 0.88 mol/L, in a hexane solution) was slowly dropwise added thereto, after stirred at 60° C. for 2 hours, filtered, washed with hexane for 3 times with the same amount of hexane for each time, eventually vacuum dried at 60° C., to obtain the pre-treated Mg-containing carrier.

The ratio by molar of the Mg-containing carrier (based on Mg) to the assistant chemical treating agent (based on Al) is 1:0.2.

The thus obtained supported nonmetallocene catalyst was named as CAT-2.

Example 3

Substantially the same as Example 1, except for the following changes:

Before contacting with the silicon compound and the chemical treating agent, the Mg-containing carrier was pre-treated by the assistant chemical treating agent (methyl aluminoxane) to obtain the pre-treated Mg-containing carrier.

Specifically, the Mg-containing carrier was added to toluene, the assistant chemical treating agent (methyl aluminoxane) (at a concentration of 10 wt %, in a toluene solution) was slowly dropwise added thereto, after stirred at 60° C. for 2 hours, filtered, washed with toluene for 3 times with the same amount of toluene for each time, eventually vacuum dried at 100° C., to obtain the pre-treated Mg-containing carrier.

The ratio by molar of the Mg-containing carrier (based on Mg) to the assistant chemical treating agent (based on Al) is 1:0.4.

The thus obtained supported nonmetallocene catalyst was named as CAT-3.

Example 4

Substantially the same as Example 1, except for the following changes:

The magnesium compound was changed to ethyl magnesium ($Mg(C_2H_5)_2$), the alcohol was ethanol, the first solvent was changed to toluene, the silicon compound was changed to tetra iso-butoxy silicon, the chemical treating agent was changed to zirconium tetrachloride ($ZrCl_4$), the precipitating agent was changed to cyclohexane, the nonmetallocene complex was

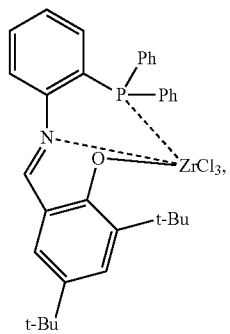

the second solvent was changed to toluene.

In this example, the ratio of the magnesium compound to the first solvent is 1 mol:150 ml, the ratio by molar of the magnesium compound to the alcohol is 1:1.64, the ratio by molar of the Mg-containing carrier (based on Mg) to the nonmetallocene complex is 1:0.15, the ratio by volume of the precipitating agent to the first solvent is 1:2, the ratio by molar of the Mg-containing carrier (based on Mg) to the silicon compound (based on Si) is 1:0.05, the ratio by molar of the Mg-containing carrier (based on Mg) to the chemical treating agent (based on the Group IVB metal) is 1:0.20, the ratio of the nonmetallocene complex to the second solvent is 0.06 g/ml.

The thus obtained supported nonmetallocene catalyst was named as CAT-4.

Example 5

Substantially the same as Example 1, except for the following changes:

The magnesium compound was changed to anhydrous magnesium bromide ($MgBr_2$), the alcohol was changed to trichloro methanol, the nonmetallocene complex was

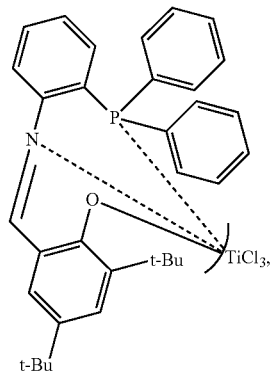

the first solvent was changed to ethyl benzene, the silicon compound was changed to triethoxy chlorosilicon, the chemical treating agent was changed to titanium tetrabromide ($TiBr_4$), the second solvent was tetrahydrofuran.

The magnesium compound solution was directly vacuum dried at 110° C. to obtain Mg-containing carrier.

In this example, the ratio of the magnesium compound to the first solvent is 1 mol:250 ml, the ratio by molar of the magnesium compound to the alcohol is 1:1, the ratio by molar of the Mg-containing carrier (based on Mg) to the nonmetallocene complex is 1:0.20, the ratio by molar of the Mg-containing carrier (based on Mg) to the silicon compound (based on Si) is 1:0.25, the ratio by molar of the Mg-containing carrier (based on Mg) to the chemical treating agent (based on the Group IVB metal) is 1:0.30, the ratio of the nonmetallocene complex to the second solvent is 0.05 g/ml.

The thus obtained supported nonmetallocene catalyst was named as CAT-5.

Example 6

Substantially the same as Example 1, except for the following changes:

The magnesium compound was changed to ethoxy magnesium chloride (MgCl(OC$_2$H$_5$)), the alcohol was changed to 2-ethyl hexanol, the nonmetallocene complex was

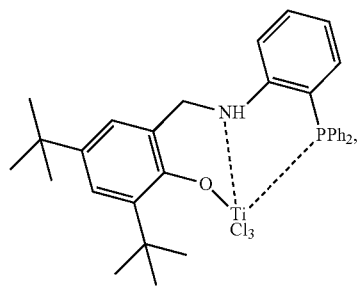

the first solvent was changed to xylene, the silicon compound was changed to silicon tetrachloride, the chemical treating agent was changed to tetraethyl titanium (Ti(CH$_3$CH$_2$)$_4$), the precipitating agent was changed to decane.

In this example, the ratio of the magnesium compound to the first solvent is 1 mol:300 ml, the ratio by molar of the magnesium compound to the alcohol is 1:0.25, the ratio by molar of the Mg-containing carrier (based on Mg) to the nonmetallocene complex is 1:0.04, the ratio by volume of the precipitating agent to the first solvent is 1:1.5, the ratio by molar of the Mg-containing carrier (based on Mg) to the silicon compound (based on Si) is 1:0.14, the ratio by molar of the Mg-containing carrier (based on Mg) to the chemical treating agent (based on the Group IVB metal) is 1:0.05.

The thus obtained supported nonmetallocene catalyst was named as CAT-6.

Example 7

Substantially the same as Example 1, except for the following changes:

The magnesium compound was changed to ethoxy magnesium (Mg(OC$_2$H$_5$)$_2$), the alcohol was changed to phenyl ethanol, the nonmetallocene complex was

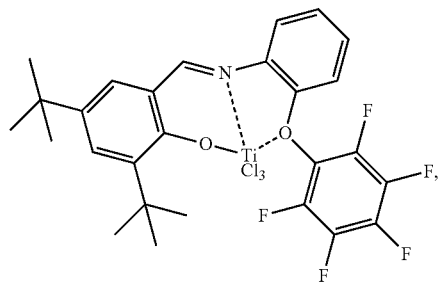

the first solvent was changed to diethyl benzene, the silicon compound was changed to tetramethoxy silicon, the chemical treating agent was changed to tetra n-butyl titanium (Ti(C$_4$H$_9$)$_4$), the precipitating agent was changed to pentane.

In this example, the ratio of the magnesium compound to the first solvent is 1 mol:400 ml, the ratio by molar of the magnesium compound to the alcohol is 1:2.5, the ratio by molar of the Mg-containing carrier (based on Mg) to the nonmetallocene complex is 1:0.30, the ratio by volume of the precipitating agent to the first solvent is 1:0.5, the ratio by molar of the Mg-containing carrier (based on Mg) to the silicon compound (based on Si) is 1:0.45, the ratio by molar of the Mg-containing carrier (based on Mg) to the chemical treating agent (based on the Group IVB metal) is 1:0.50.

The thus obtained supported nonmetallocene catalyst was named as CAT-7.

Example 8

Substantially the same as Example 1, except for the following changes:

The magnesium compound was changed to methyl magnesium chloride (Mg(CH$_3$)Cl), the alcohol was changed to cyclohexanol, the nonmetallocene complex was

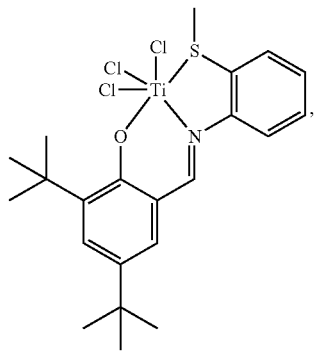

the silicon compound was changed to a mixture consisting of tetraethoxy silicon and tetrachloro silicon with a ratio by molar of 1:1, the first solvent was changed to chlorotoluene.

In this example, the ratio by molar of the magnesium compound to the alcohol is 1:3.0, the ratio by molar of the Mg-containing carrier (based on Mg) to the nonmetallocene complex is 1:0.10, the ratio by molar of the Mg-containing carrier (based on Mg) to the silicon compound (based on Si) is 1:0.02, the ratio by molar of the Mg-containing carrier (based on Mg) to the chemical treating agent (based on the Group IVB metal) is 1:0.10.

The thus obtained supported nonmetallocene catalyst was named as CAT-8.

Comparative Example A

Substantially the same as Example 1, except for the following changes:

During preparation of the catalyst, the Mg-containing carrier was not treated by the silicon compound, but merely treated by the chemical treating agent.

The thus obtained catalyst was named as CAT-A.

Comparative Example B

Substantially the same as Example 1, except for the following changes:
The ratio by molar of the Mg-containing carrier (based on Mg) to the silicon compound (based on Si) is 1:0.05.
The thus obtained catalyst was named as CAT-B.

Comparative Example C

Substantially the same as Example 1, except for the following changes:
The ratio by molar of the Mg-containing carrier (based on Mg) to the silicon compound (based on Si) is 1:0.20.
The thus obtained catalyst was named as CAT-C.

Comparative Example D

Substantially the same as Example 1, except for the following changes:
No nonmetallocene complex was supported.
The thus obtained catalyst was named as CAT-D.

Application Example

The catalysts CAT-1 to CAT-8, CAT-A to CAT-D obtained were used for ethylene homopolymerization and copolymerization under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. After heated to 60° C., ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table 2.

TABLE 1

The results of the olefin polymerization obtained with the supported nonmetallocene catalysts

| Experiment No. | Catalyst No. | Content of the active metal in Catalyst (wt %) | Co-catalyst | Ratio by molar of co-catalyst to active metal in Catalyst | Type | Polymerization activity (kgPE/gCat) | Bulk density (g/cm$^3$) | Molecular weight distribution |
|---|---|---|---|---|---|---|---|---|
| 1 | CAT-1 | 2.23 | triethyl aluminum | 70 | homopolymerization | 27.04 | 0.35 | 3.15 |
| 2 | CAT-1 | 2.23 | triethyl aluminum | 70 | copolymerization | 39.54 | 0.36 | 3.44 |
| 3 | CAT-1 | 2.23 | triethyl aluminum | 200 | copolymerization | 40.81 | 0.37 | 3.62 |
| 4 | CAT-1 | 2.23 | methyl aluminoxane | 70 | homopolymerization | 30.26 | 0.36 | 2.84 |
| 5 | CAT-2 | 2.16 | triethyl aluminum | 70 | homopolymerization | 32.44 | 0.36 | 3.30 |
| 6 | CAT-2 | 2.16 | triethyl aluminum | 70 | copolymerization | 47.75 | 0.37 | 3.47 |
| 7 | CAT-2 | 2.16 | triethyl aluminum | 200 | homopolymerization | 33.60 | 0.36 | 3.50 |
| 8 | CAT-3 | 2.08 | triethyl aluminum | 70 | homopolymerization | 31.86 | 0.37 | 2.93 |
| 9 | CAT-3 | 2.08 | triethyl aluminum | 70 | copolymerization | 43.62 | 0.37 | 3.04 |

TABLE 1-continued

The results of the olefin polymerization obtained with the supported nonmetallocene catalysts

| Experiment No. | Catalyst No. | Content of the active metal in Catalyst (wt %) | Co-catalyst | Ratio by molar of co-catalyst to active metal in Catalyst | Type | Polymerization activity (kgPE/gCat) | Bulk density (g/cm$^3$) | Molecular weight distribution |
|---|---|---|---|---|---|---|---|---|
| 10 | CAT-3 | 2.08 | triethyl aluminum | 200 | homopolymerization | 31.75 | 0.37 | 3.00 |
| 11 | CAT-4 | 2.42 | triethyl aluminum | 70 | homopolymerization | 40.38 | 0.34 | 3.57 |
| 12 | CAT-5 | 1.85 | triethyl aluminum | 70 | homopolymerization | 16.95 | 0.35 | 3.38 |
| 13 | CAT-6 | 1.74 | triethyl aluminum | 70 | homopolymerization | 12.64 | 0.36 | 3.61 |
| 14 | CAT-7 | — | triethyl aluminum | 70 | homopolymerization | 28.51 | 0.33 | 3.71 |
| 15 | CAT-8 | — | triethyl aluminum | 70 | homopolymerization | 29.38 | 0.35 | 2.74 |
| 16 | CAT-A | 6.56 | triethyl aluminum | 70 | homopolymerization | 22.57 | 0.30 | 4.27 |
| 17 | CAT-B | 3.72 | triethyl aluminum | 70 | homopolymerization | 25.49 | 0.33 | 3.65 |
| 18 | CAT-C | 1.84 | triethyl aluminum | 70 | homopolymerization | 30.16 | 0.36 | 2.78 |
| 19 | CAT-D | 1.92 | triethyl aluminum | 70 | homopolymerization | 19.11 | 0.31 | 5.84 |

TABLE 2

The results of the ultra high molecular weight polyethylene preparation obtained with the supported nonmetallocene catalysts

| Experiment No. | Catalyst No. | Content of the active metal (wt %) | Co-catalyst | Ratio by molar of co-catalyst to active metal | Polymerization activity (kgPE/gCat) | Bulk density (g/cm$^3$) | Mv ($10^4$ g/mol) |
|---|---|---|---|---|---|---|---|
| 1 | CAT-1 | 2.23 | triethyl aluminum | 70 | 30.13 | 0.39 | 390 |
| 2 | CAT-1 | 2.23 | methyl aluminoxane | 70 | 33.72 | 0.40 | 450 |
| 3 | CAT-2 | 2.16 | triethyl aluminum | 70 | 36.15 | 0.40 | 415 |
| 4 | CAT-2 | 2.16 | triethyl aluminum | 200 | 37.44 | 0.40 | 400 |
| 5 | CAT-3 | 2.08 | triethyl aluminum | 70 | 35.50 | 0.41 | 375 |
| 6 | CAT-A | 6.56 | triethyl aluminum | 70 | 25.15 | 0.34 | 305 |
| 7 | CAT-B | 3.72 | triethyl aluminum | 70 | 28.40 | 0.37 | 350 |
| 8 | CAT-C | 1.84 | triethyl aluminum | 70 | 33.61 | 0.40 | 465 |
| 9 | CAT-D | 1.92 | triethyl aluminum | 70 | 21.30 | 0.35 | 260 |

As can be seen from the Table 1, the polymer obtained from the polymerization by using the supported nonmetallocene catalyst produced in line with the process of this disclosure exhibits a narrow molecular weight distribution. It is well known in this field that polyethylene produced from the polymerization by using a Ziegler-Natta catalyst usually exhibits a molecular weight distribution of greater than 5.

As can be seen from the experiment Nos. 2 and 3, Nos. 5 and 7, Nos. 8 and 10 in the Table 1, and the experiment Nos. 3 and 4 in the Table 2, increasing the amount of the co-catalyst to be used (i.e. increasing the ratio by molar of the co-catalyst to the active metal in the catalyst) will not significantly change the polymerization activity and the bulk density of the polymer. This fact indicates that a high activity for olefin polymerization can be obtained with a relatively less amount of the co-catalyst when the supported nonmetallocene catalyst produced in line with the process of this disclosure is used, and the resultant polymer product (for example polyethylene) exhibits superior polymer morphology and a high polymer bulk density.

Upon comparison of the experiment Nos. 1 with 2, Nos. 5 with 6, Nos. 8 with 9 in the Table 1, it is clear that in case of copolymerization, the polymerization activity increases significantly. This fact indicates that the supported nonmetallocene catalyst produced in line with the process of this disclosure exhibits a relatively significant co-monomer effect.

Upon comparison of the experiment Nos. 1 with 16 in the Table 1 or the experiment Nos. 1 with 6 in the Table 2, it is clear that if no silicon compound is co-used during preparation of the supported nonmetallocene catalyst, the content of the active metal in the catalyst increases, while both the polymerization activity of the catalyst and the bulk density of the resultant polymer decrease, the molecular weight distribution of the polymer gets broad and the viscosity averaged molecular weight Mv of the resultant ultra high molecular weight polyethylene significantly decreases.

Upon comparison of the experiment Nos. 1 with 17 and 18 in the Table 1 or the experiment Nos. 1 with 7 and 8 in the Table 2, it is clear that as the amount of the silicon compound to be used increases during preparation of the supported nonmetallocene catalyst, the content of the active metal in the catalyst is effectively decreased, while both the polymerization activity of the catalyst and the bulk density of the resultant polymer increase, the molecular weight distribution of the polymer gets narrowed and the viscosity averaged molecular weight Mv of the resultant ultra high molecular weight polyethylene increases. This fact indicates that the silicon compound, if introduced by this disclosure, shows the effects of effectively decreasing the content of the (inactive) active metal in the catalyst, increasing the polymerization activity of the catalyst and the bulk density of the resultant polymer, narrowing the molecular weight distribution of the polymer and increasing the viscosity averaged molecular weight Mv of the resultant ultra high molecular weight polyethylene.

Upon comparison of the experiment Nos. 1 with 19 in the Table 1 or the experiment Nos. 1 with 9 in the Table 2, it is clear that if no nonmetallocene complex is used during preparation of the catalyst, which corresponds to a multiple site catalyst of Ziegler-Natta type, the polymerization activity of the catalyst and the bulk density of the resultant polymer are relatively low, the molecular weight distribution of the polymer is relatively broad, and the viscosity averaged molecular weight Mv of the resultant ultra high molecular weight polyethylene is relatively low.

We claim:

1. A process for producing a supported nonmetallocene catalyst, comprising the steps of: dissolving a magnesium compound in a first solvent in the presence of an alcohol to obtain a magnesium compound solution; obtaining a Mg-containing carrier by (1) mixing a porous carrier with the magnesium compound solution to obtain a first slurry, and drying the first slurry, or introducing into the first slurry a precipitating agent to obtain a Mg-containing carrier, or (2) drying the magnesium compound solution, or introducing into the magnesium compound solution a precipitating agent to obtain a Mg-containing carrier; contacting the Mg-containing carrier with a silicon compound represented by the following formula (X) and a chemical treating agent selected from the group consisting of a Group IVB metal compound, to obtain a modified Mg-containing carrier;

$$Si(OR)_mX_{4-m} \quad (X)$$

wherein each R may be identical to or different from one another, each independently selected from a $C_1$-$C_8$ straight chain or branched alkyl, m is 0, 1, 2, 3, or 4, each X may be identical to or different from one another, each independently selected from a halogen atom, and, contacting the modified Mg-containing carrier with a nonmetallocene complex in the presence of a second solvent, to obtain the supported nonmetallocene catalyst, optionally further comprising the step of pre-contacting the Mg-containing carrier with an assistant chemical treating agent selected from the group consisting of an aluminoxane, an alkylaluminum and any combination thereof, before contacting the Mg-containing carrier with the silicon compound and the chemical treating agent.

2. The process according to claim 1, wherein the porous carrier is one or more selected from the group consisting of olefin homopolymers or copolymers, vinyl alcohol homopolymers or copolymers, cyclodextrins, polyesters or co-polyesters, polyamides or co-polyamides, vinyl chloride homopolymers or copolymers, acrylic ester homopolymers or copolymers, methacrylic ester homopolymers or copolymers, styrene homopolymers or copolymers, partly crosslinked products of these homopolymers or copolymers, refractory oxides or refractory composite oxides of a Group IIA, IIIA, IVA or IVB metal in the Periodic Table of Elements, clay, molecular sieve, mica, montmorillonite, bentonite and kieselguhr, the porous carrier being optionally thermally activated and/or chemically activated by the Group IVB metal compound, while the magnesium compound is one or more selected from the group consisting of a magnesium halide, an alkoxy magnesium halide, an alkoxy magnesium, an alkyl magnesium, an alkyl magnesium halide and an alkyl alkoxy magnesium.

3. The process according to claim 1, wherein the first solvent is one or more selected from the group consisting of a $C_{6-12}$ aromatic hydrocarbon and tetrahydrofuran, the second solvent is one or more selected from the group consisting of a $C_{6-12}$ aromatic hydrocarbon, dichloromethane and tetrahydrofuran, and the alcohol is one or more selected from the group consisting of an aliphatic alcohol, wherein the alcohol is optionally substituted by a substituent selected from the group consisting of a halogen atom and a $C_{1-6}$ alkoxy group.

4. The process according to claim 1, wherein the nonmetallocene complex is one or more selected from the group consisting of the compounds having the following structure,

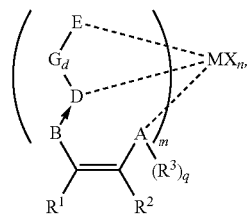

wherein, q is 0 or 1;

d is 1;

m is 1, 2 or 3;

M is a central metal atom selected from the group consisting of a Group III to XI metal atom in the Periodic Table of Elements;

n is 1, 2, 3 or 4, depending on the valence of the central metal atom M;

X is selected from the group consisting of a halogen atom, a hydrogen atom, a $C_1$-$C_{30}$ hydrocarbyl, a substituted $C_1$-$C_{30}$ hydrocarbyl, an oxygen-containing group, a nitrogen-containing group, a sulfur-containing group, a boron-containing group, an aluminium-containing group, a phosphorus-containing group, a silicon-containing group, a germanium-containing group, and a tin-containing group, when multiple X's exist, the X's may be the same as or different from one another, and may form a bond or a ring with one another;

A is selected from the group consisting of an oxygen atom, a sulfur atom, a selenium atom,

—$NR^{23}R^{24}$, —$N(O)R^{25}R^{26}$,

—$PR^{28}R^{29}$, $P(O)R^{30}OR^{31}$, a sulfone group, a sulfoxide group and —$Se(O)R^{39}$, wherein N, O, S, Se and P each represents a coordination atom;

B is selected from the group consisting of a nitrogen atom, a nitrogen-containing group, a phosphorus-containing group and a $C_1$-$C_{30}$ hydrocarbyl;

D is selected from the group consisting of a nitrogen atom, an oxygen atom, a sulfur atom, a selenium atom, a phosphorus atom, a nitrogen-containing group, a phosphorus-containing group, a $C_1$-$C_{30}$ hydrocarbyl, a sulfone group or a sulfoxide group,

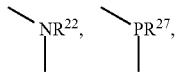

and —$P(O)R^{32}OR^{33}$, wherein N, O, S, Se and P each represents a coordination atom;

E is selected from the group consisting of a nitrogen-containing group, an oxygen-containing group, a sulfur-containing group, a selenium-containing group, a phosphorus-containing group and a cyano group, wherein N, O, S, Se and P each represents a coordination atom;

G is selected from the group consisting of a $C_1$-$C_{30}$ hydrocarbylene group, a substituted $C_1$-$C_{30}$ hydrocarbylene group and an inert functional group;

→ represents a single bond or a double bond;

— represents a covalent bond or an ionic bond;

--- represents a coordination bond, a covalent bond or an ionic bond;

R' to $R^3$, $R^{22}$ to $R^{33}$ and $R^{39}$ are each independently selected from the group consisting of a hydrogen atom, a $C_1$-$C_{30}$ hydrocarbyl, a substituted $C_1$-$C_{30}$ hydrocarbyl and an inert functional group, wherein these groups may be identical to or different from one another, and any adjacent groups may form a bond or a ring with one another.

5. The process according to claim 1, wherein ratio of the magnesium compound to the first solvent is 1 mol 75-400 ml, ratio by molar of the magnesium compound (based on Mg) to the alcohol is 1:0.02-4.00, ratio by weight of the magnesium compound (on a solid basis) to the porous carrier is 1:0.1-20, ratio by volume of the precipitating agent to the first solvent is 1:0.2-5, ratio by molar of the Mg-containing carrier (based on Mg) to the silicon compound (based on Si) is 1:0.01-1, ratio by molar of the Mg-containing carrier (based on Mg) to the chemical treating agent (based on the Group IVB metal) is 1:0.01-1, ratio by molar of the Mg-containing carrier (based on Mg) to the nonmetallocene complex is 1:0.01-1, and ratio by molar of the Mg-containing carrier (based on Mg) to the assistant chemical treating agent (based on Al) is 1:0-1.0.

6. The process according to claim 1, wherein the precipitating agent is one or more selected from the group consisting of pentane, hexane, heptane, octane, nonane, decane, cyclohexane, cyclopentane, cycloheptane, cyclodecane, cyclononane, dichloromethane, dichloro hexane, dichloro heptane, trichloro methane, trichloro ethane, trichloro butane, dibromo methane, dibromo ethane, dibromo heptane, tribromo methane, tribromo ethane, tribromo butane, chlorinated cyclopentane, chlorinated cyclohexane, chlorinated cycloheptane, chlorinated cyclooctane, chlorinated cyclononane, chlorinated cyclodecane, brominated cyclopentane, brominated cyclohexane, brominated cycloheptane, brominated cyclooctane, brominated cyclononane and brominated cyclodecane.

7. The process according to claim 1, wherein the Group IVB metal compound is one or more selected from the group consisting of a Group IVB metal halide, while the aluminoxane is one or more selected from the group consisting of methyl aluminoxane, ethyl aluminoxane, isobutyl aluminoxane and n-butyl aluminoxane, and the alkylaluminum is one or more selected from the group consisting of trimethyl aluminum, triethyl aluminum, tripropyl aluminum, triisobutyl aluminum, tri-n-butyl aluminum, triisoamyl aluminum, tri-n-amyl aluminum, trihexyl aluminum, tri-iso-hexyl aluminum, diethyl methyl aluminum and ethyl dimethyl aluminum.

8. The process according to claim 1, wherein in the formula (X), each R may be identical to or different from one another, each independently selected from a $C_1$-$C_4$ straight chain or branched alkyl, and each X each represents Cl.

9. The process according to claim 2, wherein the porous carrier is one or more selected from the group consisting of partly crosslinked styrene polymers, silica, alumina, magnesia, silica-alumina, magnesia-alumina, titanium oxide, molecular sieve and montmorillonite, the porous carrier being optionally thermally activated and/or chemically activated by the Group IVB metal compound, while the magnesium compound is one or more selected from the group consisting of magnesium halides.

10. The process according to claim 4, wherein the nonmetallocene complex is one or more selected from the group consisting of the following compound (A) and the following compound (B),

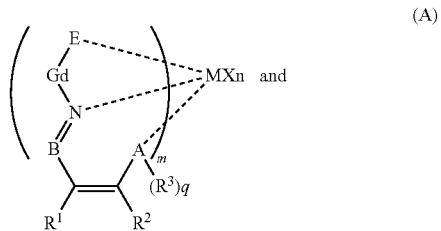

(A)

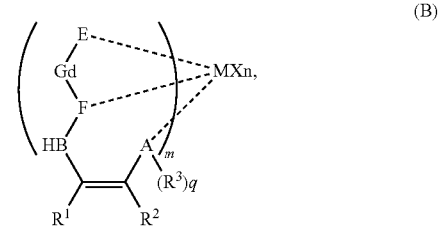

(B)

wherein,

F is selected from the group consisting of a nitrogen atom, a nitrogen-containing group, an oxygen-containing group, a sulfur-containing group, a selenium-containing group and a phosphor-containing group, wherein N, O, S, Se and P each represents a coordination atom.

11. The process according to claim 10, wherein the nonmetallocene complex is one or more selected from the group consisting of the following compound (A-1), the following compound (A-2), the following compound (A-3), the following compound (A-4), the following compound (B-1), the following compound (B-2), the following compound (B-3), and the following compound (B-4),

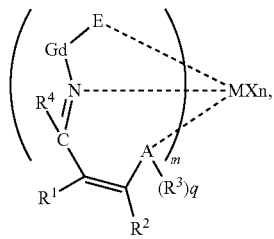
(A-1)

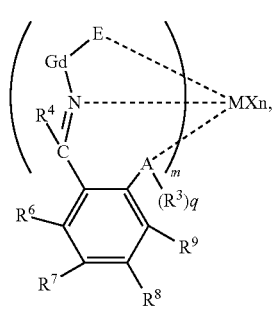
(A-2)

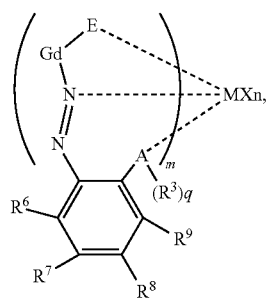
(A-3)

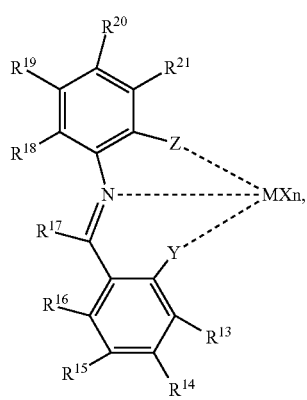
(A-4)

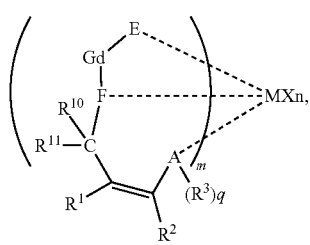
(B-1)

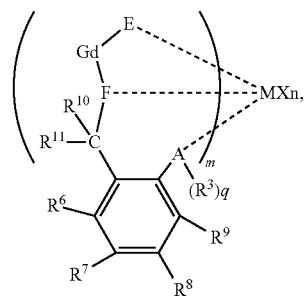
(B-2)

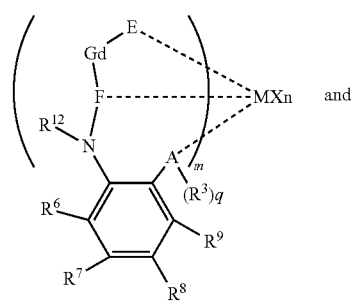
(B-3)

and

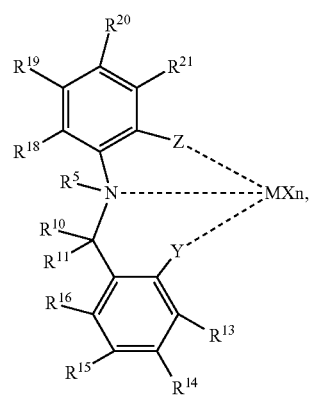
(B-4)

wherein,

Y is selected from the group consisting of an oxygen atom, a nitrogen-containing group, an oxygen-containing group, a sulfur-containing group, a selenium-containing group and a phosphorus-containing group, wherein N, O, S, Se and P each represents a coordination atom;

Z is selected from the group consisting of a nitrogen-containing group, an oxygen-containing group, a sulfur-containing group, a selenium-containing group, a phosphorus-containing group and a cyano group, wherein N, O, S, Se and P each represents a coordination atom;

$R^4$ and $R^6$ to $R^{21}$ are each independently selected from the group consisting of a hydrogen atom, a $C_1$-$C_{30}$ hydrocarbyl, a substituted $C_1$-$C_{30}$ hydrocarbyl and an inert functional group, wherein these groups may be identical to or different from one another, and any adjacent groups may form a bond or a ring with one another; and $R^5$ is selected from the group consisting of the lone pair electron on a nitrogen atom, a hydrogen atom, a $C_1$-$C_{30}$ hydrocarbyl, a substituted $C_1$-$C_{30}$ hydrocarbyl, an oxygen-containing group, a sulfur-containing group, a nitrogen-containing group, a selenium-containing group, and a phosphorus-containing group, with the proviso that when $R^5$ is the oxygen-containing group, the sulfur-containing group, the nitrogen-containing group, the selenium-containing group or the phosphorus-containing group, N, O, S, P and Se in the group $R^5$ each can act as a coordination atom to coordinate with the central metal atom.

12. The process according to claim 11, wherein, the halogen atom is selected from the group consisting of F, Cl, Br and I, the nitrogen-containing group is selected from the group consisting of

—$NR^{23}R^{24}$, and -T-$NR^{23}R^{24}$, the phosphorus-containing group is selected from the group consisting of

—$PR^{28}R^{29}$, —$P(O)R^{30}R^{31}$ and —$P(O)R^{32}(OR^{33})$, the oxygen-containing group is selected from the group consisting of hydroxy, —$OR^{34}$ and -T-$OR^{34}$, the sulfur-containing group is selected from the group consisting of —$SR^{35}$, -T-$SR^{35}$, —$S(O)R^{36}$ and -T-$SO_2R^{37}$, the selenium-containing group is selected from the group consisting of —$SeR^{38}$, -T-$SeR^{38}$, —$Se(O)R^{39}$ and -T-$Se(O)R^{39}$, the group T is selected from the group consisting of a $C_1$-$C_{30}$ hydrocarbylene, a substituted $C_1$-$C_{30}$ hydrocarbylene and an inert functional group, $R^{37}$ is selected from the group consisting of a hydrogen atom, a $C_1$-$C_{30}$ hydrocarbyl, a substituted $C_1$-$C_{30}$ hydrocarbyl, and an inert functional group, the $C_1$-$C_{30}$ hydrocarbyl is selected from the group consisting of a $C_1$-$C_{30}$ alkyl group, a $C_7$-$C_{30}$ alkylaryl group, a $C_7$-$C_{30}$ aralkyl group, a $C_3$-$C_{30}$ cyclic alkyl group, a $C_2$-$C_{30}$ alkenyl group, a $C_2$-$C_{30}$ alkynyl group, a $C_6$-$C_{30}$ aryl group, a $C_8$-$C_{30}$ fused-ring group and a $C_4$-$C_{30}$ heterocycle group, wherein the heterocycle group contains 1 to 3 hetero atom(s) selected from the group consisting of a nitrogen atom, an oxygen atom and a sulfur atom, the substituted $C_1$-$C_{30}$ hydrocarbyl is selected from the group consisting of the $C_1$-$C_{30}$ hydrocarbyl having one or more substituent(s) selected from the halogen atom and the $C_1$-$C_{30}$ alkyl group, the inert functional group is selected from the group consisting of the halogen atom, the oxygen-containing group, the nitrogen-containing group, a silicon-containing group, a germanium-containing group, the sulfur-containing group, a tin-containing group, a $C_1$-$C_{10}$ ester group and a nitro group, the boron-containing group is selected from the group consisting of $BF_4^-$, $(C_6F_5)_4B^-$ and $(R^{40}BAr_3)^-$, the aluminium-containing group is selected from the group consisting $AlPh_4^-$, $AlF_4^-$, $AlCl_4^-$, $AlBr_4^-$, $AlI_4^-$ and $R^{41}AlAr_3^-$, the silicon-containing group is selected from the group consisting of —$SiR^{42}R^{43}R^{44}$, and -T-$SiR^{45}$, the germanium-containing group is selected from the group consisting of —$GeR^{46}R^{47}R^{48}$, and -T-$GeR^{49}$, the tin-containing group is selected from the group consisting of —$SnR^{50}R^{51}R^{52}$, -T-$SnR^{53}$ and -T-$Sn(O)R^{54}$, the Ar group represents a $C_6$-$C_{30}$ aryl group, $R^{34}$ to $R^{36}$, $R^{38}$ and $R^{40}$ to $R^{54}$ are each independently selected from the group consisting of a hydrogen atom, the $C_1$-$C_{30}$ hydrocarbyl, the substituted $C_1$-$C_{30}$ hydrocarbyl and the inert functional group, wherein these groups may be identical to or different from one another, and any adjacent groups may form a bond or a ring with one another, and the group T is defined as aforesaid.

13. The process according to claim 4, wherein the nonmetallocene complex is one or more selected from the group consisting of the following compounds,

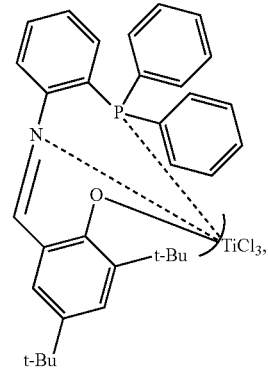

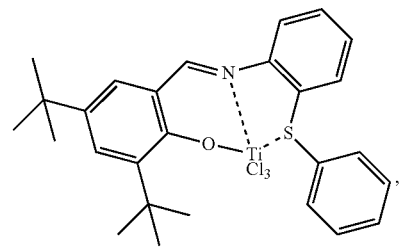

-continued
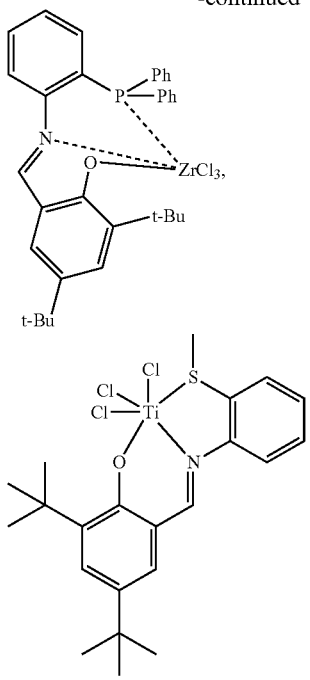
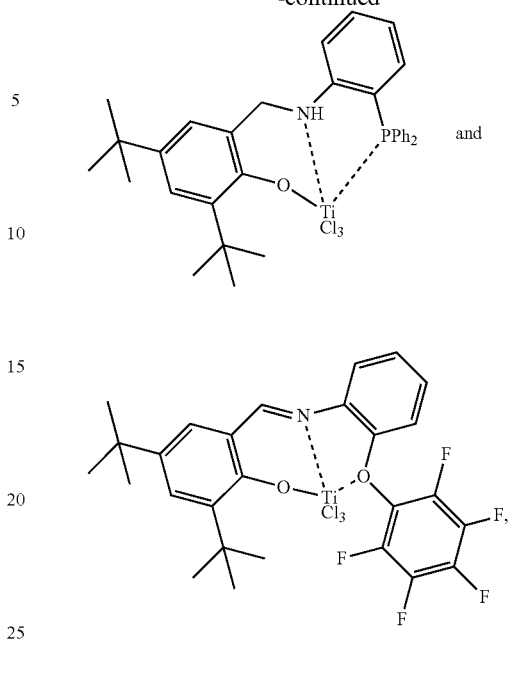
and
* * * * *